(12) United States Patent
Nakamura

(10) Patent No.: US 9,004,950 B2
(45) Date of Patent: Apr. 14, 2015

(54) CARD DEVICE AND SOCKET

(75) Inventor: Yutaka Nakamura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 282 days.

(21) Appl. No.: 13/697,636

(22) PCT Filed: May 26, 2011

(86) PCT No.: PCT/JP2011/002947
§ 371 (c)(1),
(2), (4) Date: Nov. 13, 2012

(87) PCT Pub. No.: WO2011/155142
PCT Pub. Date: Dec. 15, 2011

(65) Prior Publication Data
US 2013/0059452 A1 Mar. 7, 2013

(30) Foreign Application Priority Data
Jun. 8, 2010 (JP) .................................. 2010-130707

(51) Int. Cl.
*H01R 31/06* (2006.01)
*H01R 9/00* (2006.01)
*G06K 19/077* (2006.01)

(52) U.S. Cl.
CPC .... *G06K 19/07743* (2013.01); *G06K 19/07732* (2013.01)

(58) Field of Classification Search
USPC ........... 439/630, 628, 629, 631, 188, 218, 59, 439/60, 632, 633, 635, 638–640, 166, 53, 439/645, 646, 945, 119, 324, 325; 361/772, 361/754, 736–737
See application file for complete search history.

(56) References Cited

U.S. PATENT DOCUMENTS 6,976,879 B2 * 12/2005 Shishikura et al. ........... 439/630
6,988,668 B2    1/2006 Osako et al.
(Continued)

FOREIGN PATENT DOCUMENTS

JP    2003-91700    3/2003
JP    2004-133516   4/2004
(Continued)

OTHER PUBLICATIONS

International Search Report issued Jun. 28, 2011 in International (PCT) Application No. PCT/JP2011/002947.

*Primary Examiner* — Abdullah Riyami
*Assistant Examiner* — Harshad Patel
(74) *Attorney, Agent, or Firm* — Wenderoth, Lind & Ponack, L.L.P.

(57) ABSTRACT

A card device for insertion into and ejection from a host device. The card device includes a first electrode array including first electrodes linearly aligned in a second direction along the leading edge, and a second electrode array including second electrodes aligned in the second direction between the first electrode array and the trailing edge. A first concave region includes electrodes from the first and second electrode array. A second concave region, adjacent to the first concave region, includes a first region, which is adjacent to the first electrodes in the first concave region, and a second region, which is adjacent to the second electrodes in the first concave region. At least one of the first electrodes is situated in the first region of the second concave region, and no electrodes are situated in the second region of the second concave region.

13 Claims, 44 Drawing Sheets

(56) References Cited

U.S. PATENT DOCUMENTS

| | | |
|---|---|---|
| 7,009,846 B1 | 3/2006 | Wang et al. |
| 7,044,797 B1* | 5/2006 | Lai ................................ 439/630 |
| 7,247,054 B2* | 7/2007 | Kuo et al. .................... 439/630 |
| 7,382,045 B2 | 6/2008 | Osako et al. |
| 7,615,855 B2 | 11/2009 | Osako et al. |
| 2001/0009505 A1* | 7/2001 | Nishizawa et al. ........... 361/737 |
| 2004/0066693 A1 | 4/2004 | Osako et al. |
| 2005/0281010 A1* | 12/2005 | Wang et al. .................. 361/752 |
| 2006/0054711 A1 | 3/2006 | Osako et al. |
| 2006/0220202 A1 | 10/2006 | Osako et al. |
| 2008/0211074 A1 | 9/2008 | Osako et al. |

FOREIGN PATENT DOCUMENTS

| | | |
|---|---|---|
| JP | 2006-11725 | 1/2006 |
| JP | 2006-79185 | 3/2006 |
| JP | 2006-252862 | 9/2006 |
| WO | 2010/018816 | 2/2010 |

* cited by examiner (L2＞L1)

FIG.5A
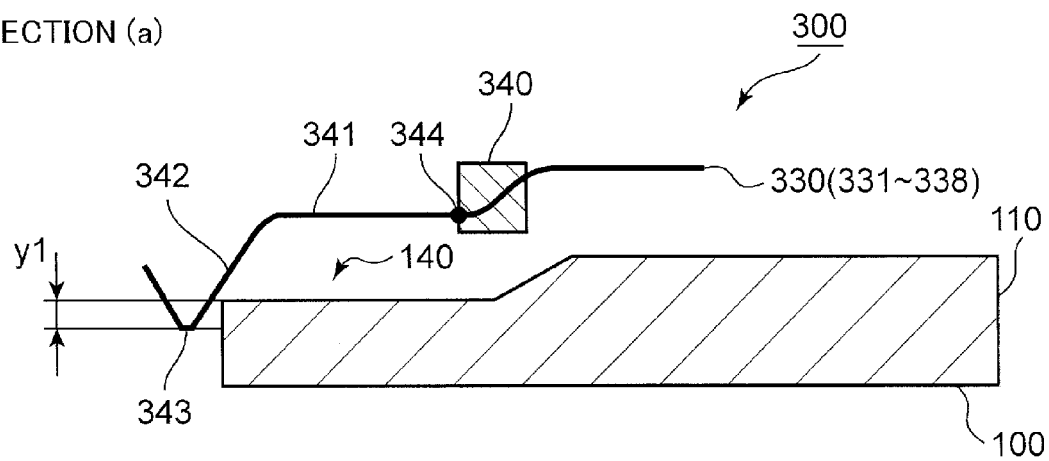
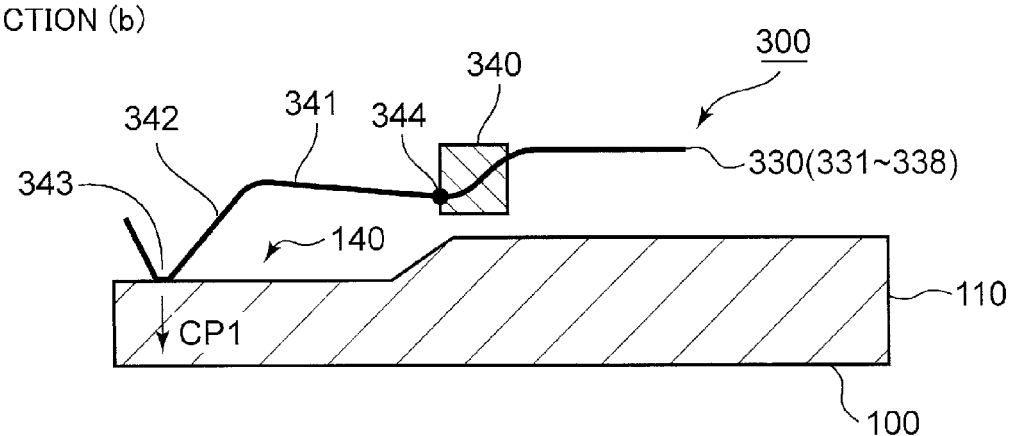
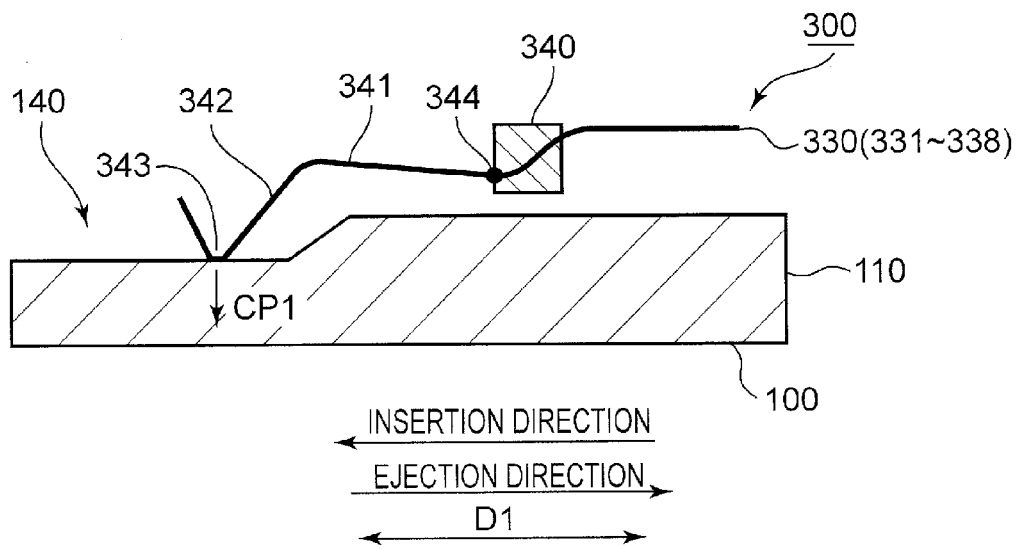

FIG.5B
SECTION (a)
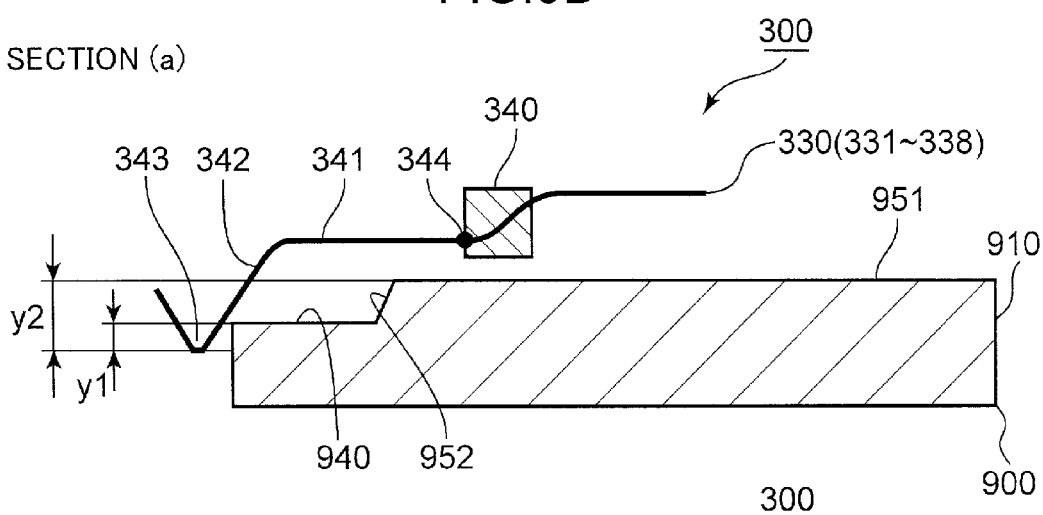
SECTION (b)
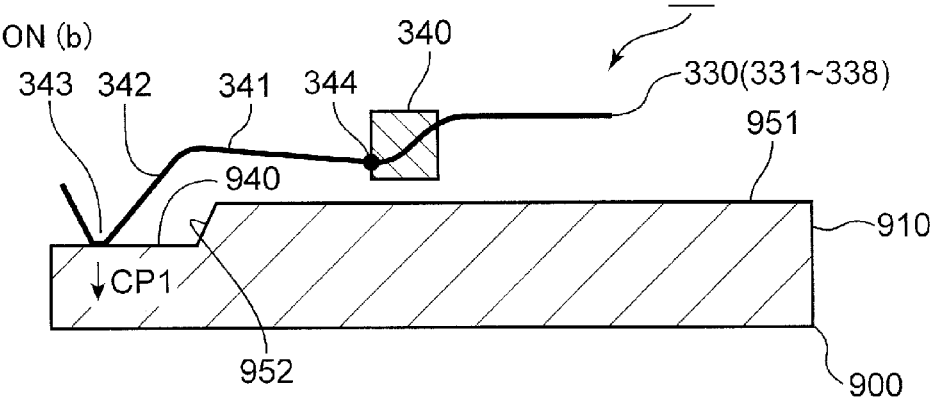
SECTION (c)
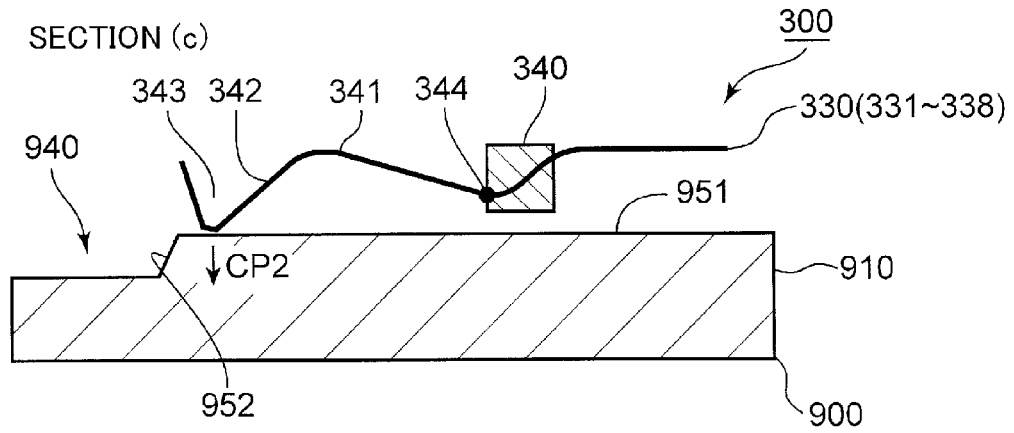

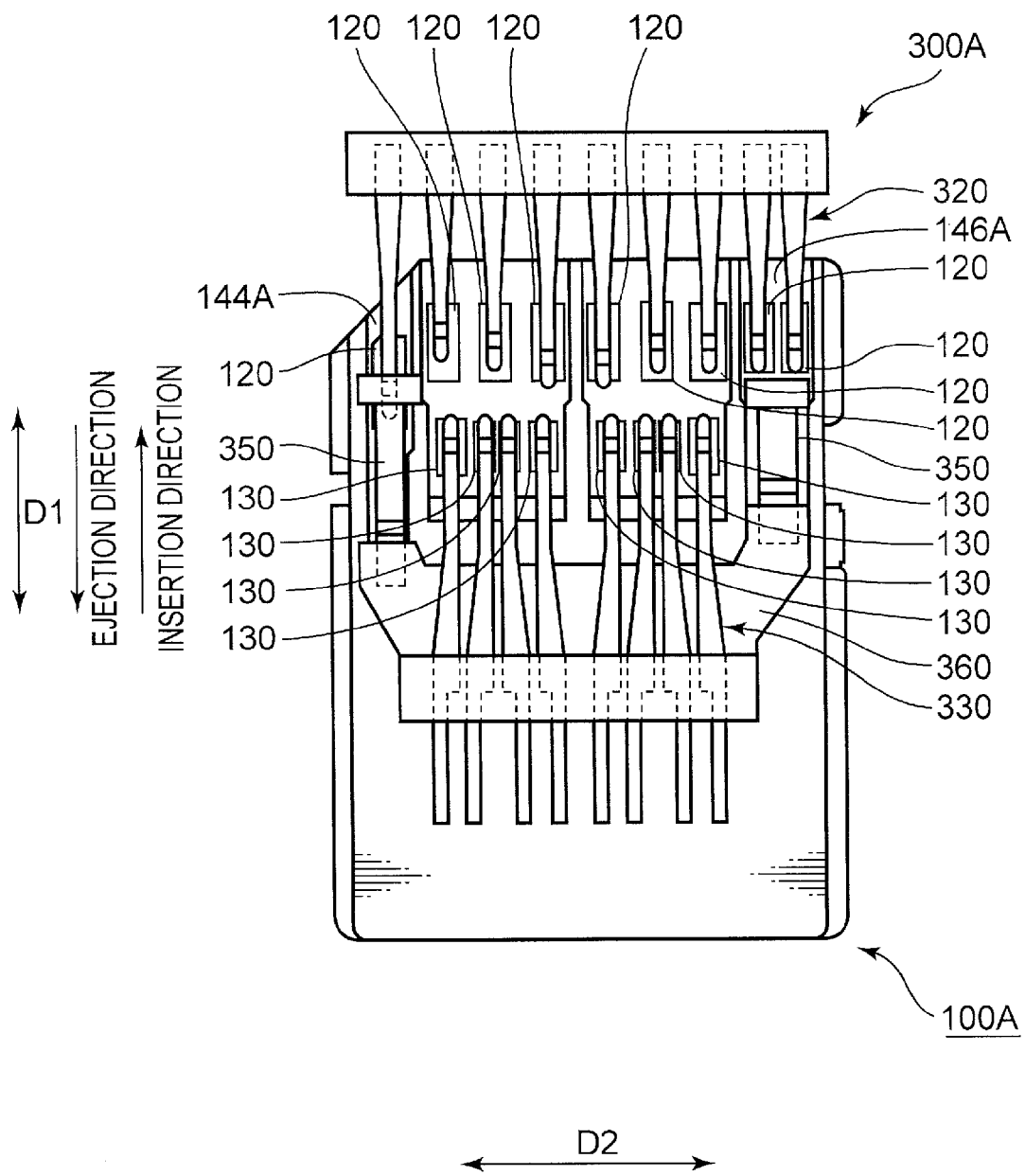

(L3＞L1)

FIG.10A
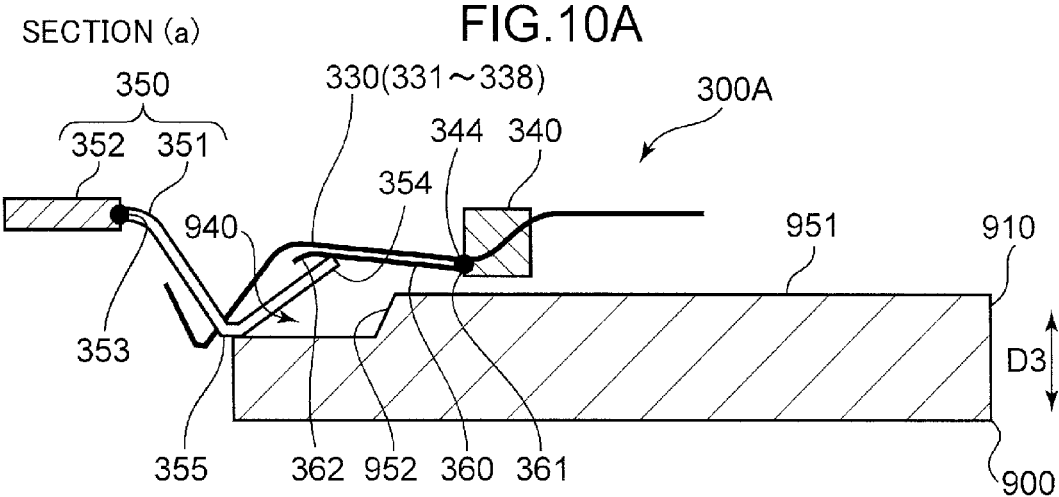
SECTION (a)
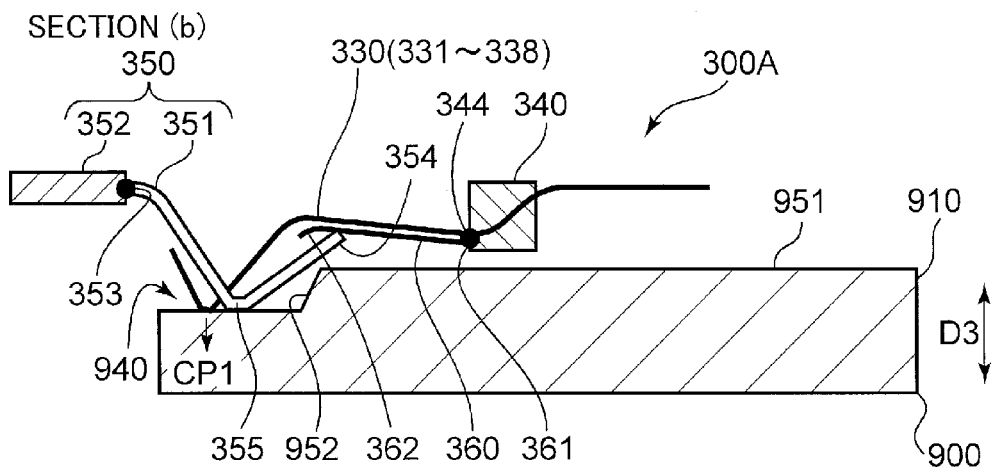
SECTION (b)
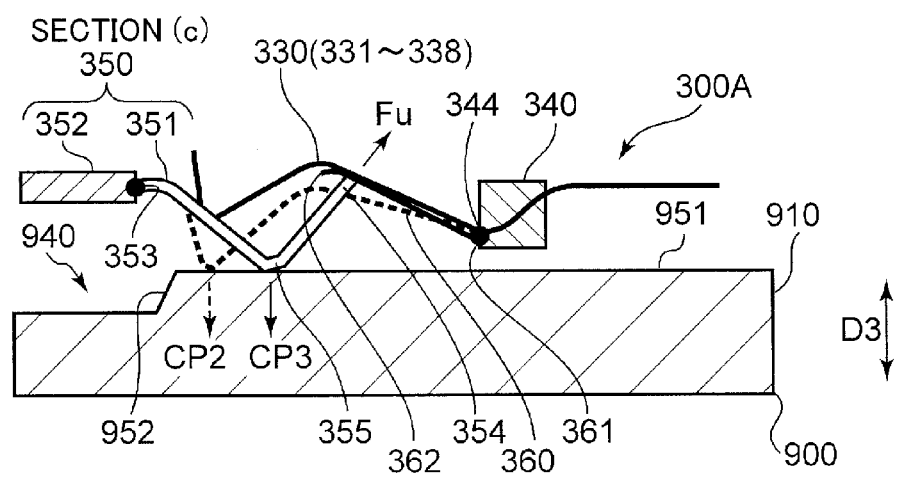
SECTION (c)
INSERTION DIRECTION ←
EJECTION DIRECTION →
← D1 →

FIG.10B
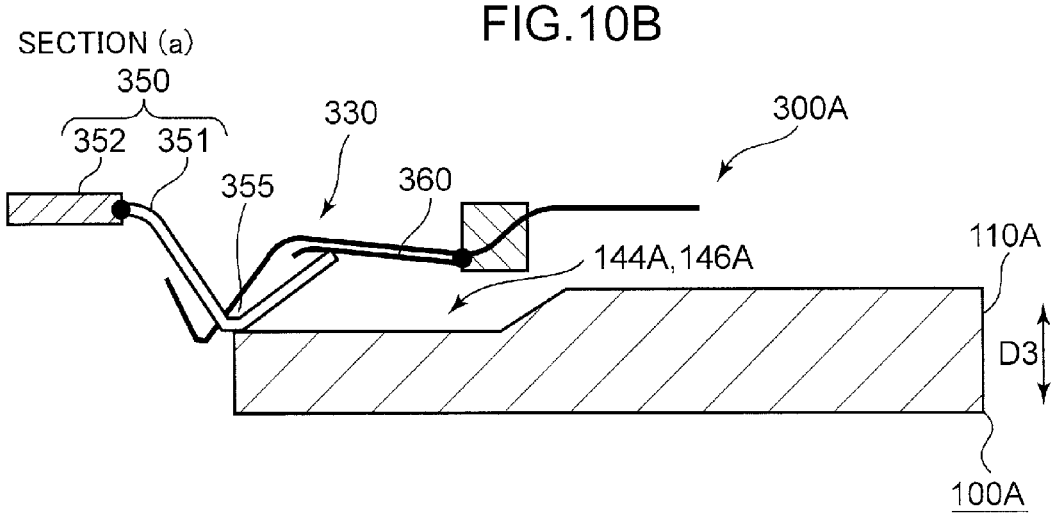
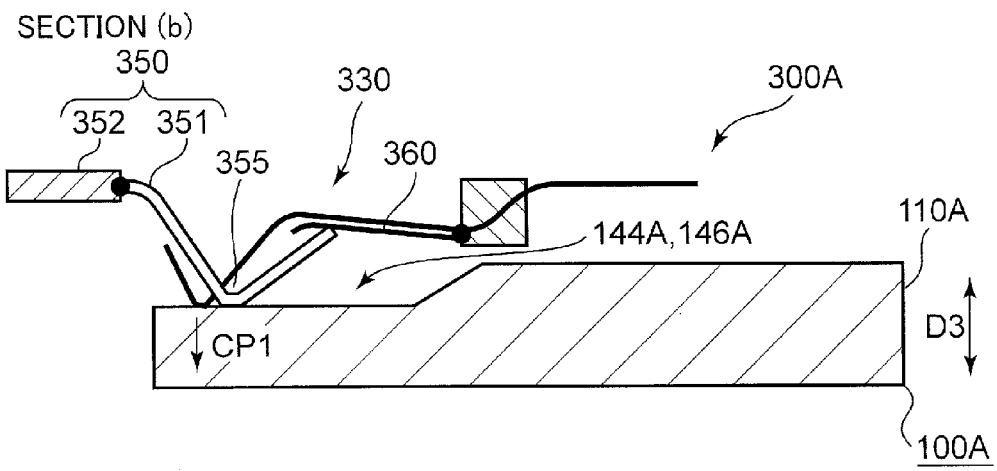
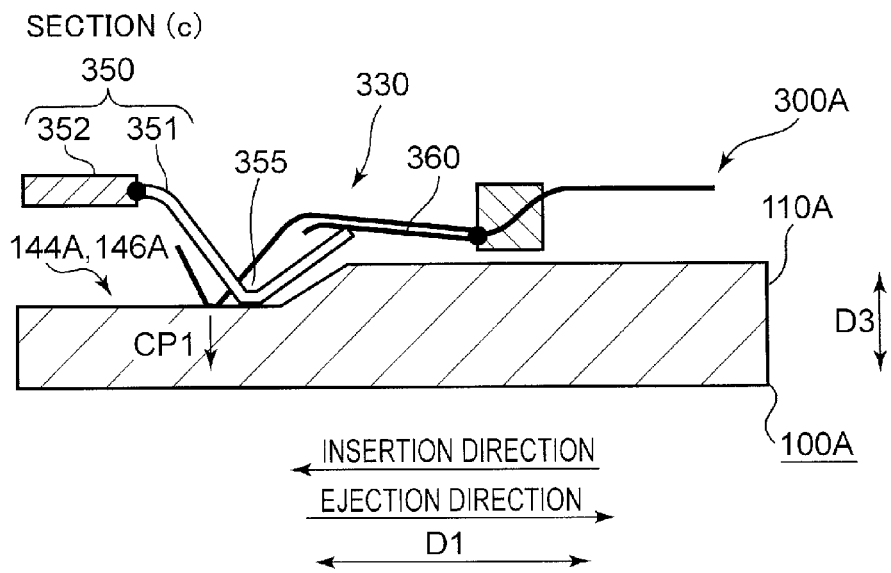

FIG.13A
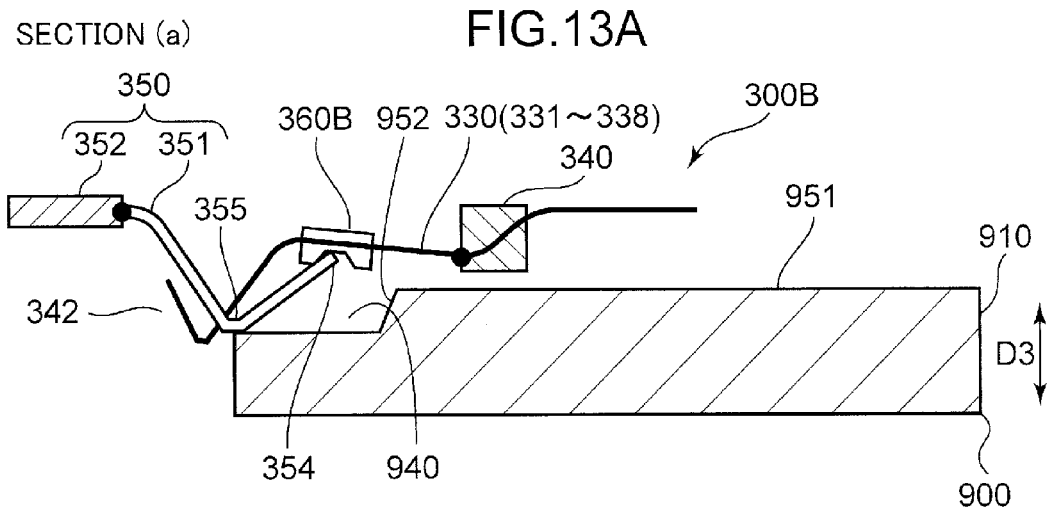
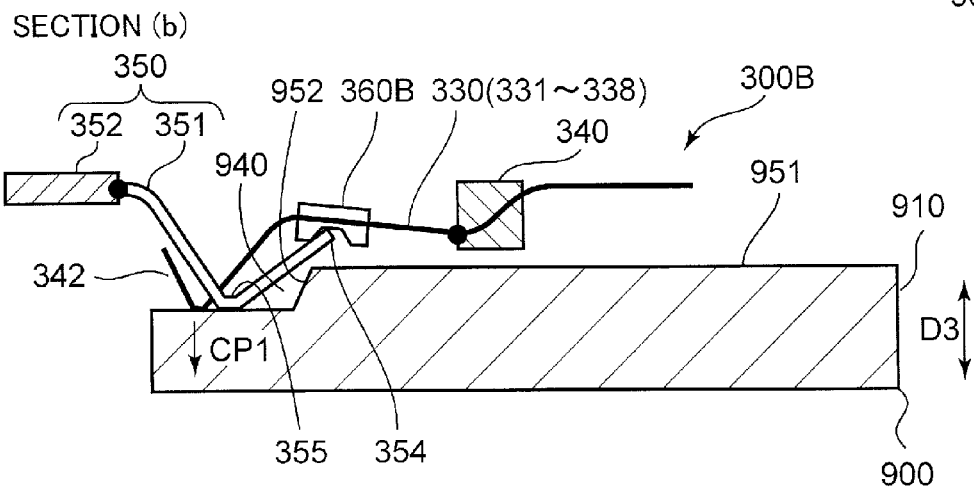
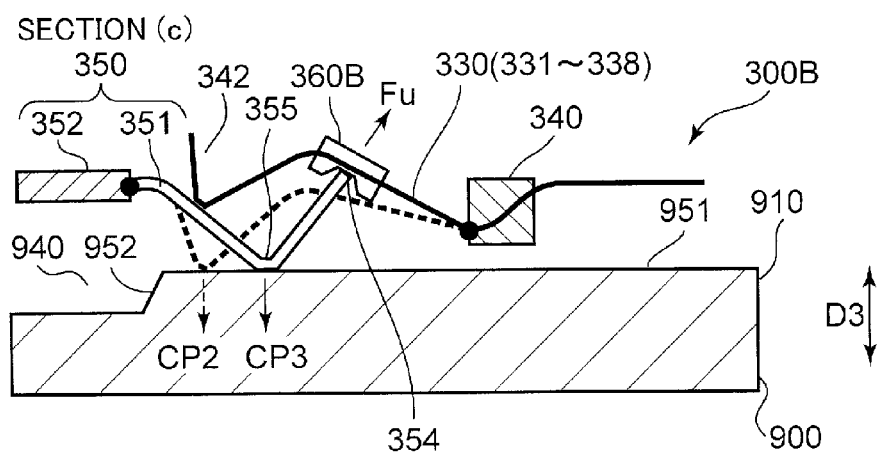

FIG.13B
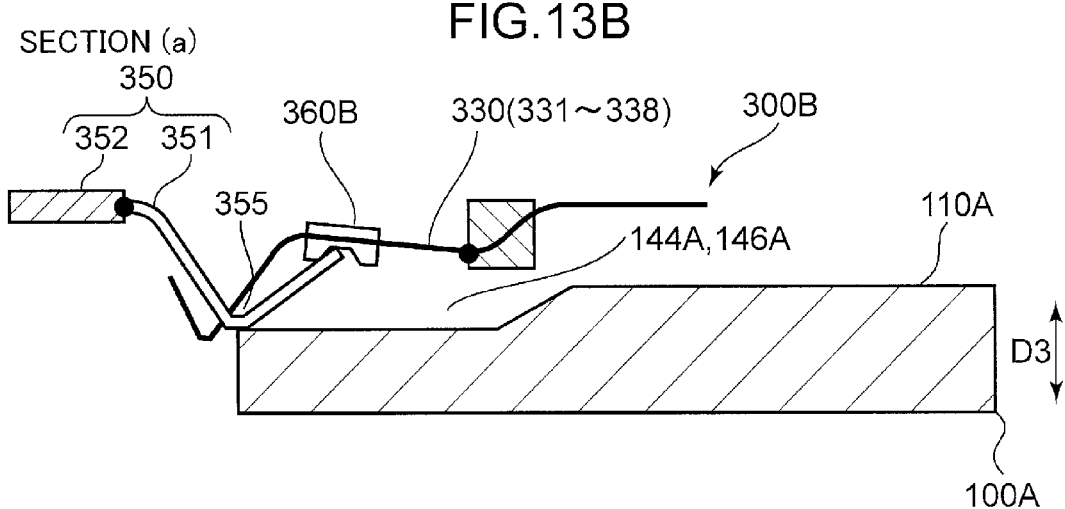
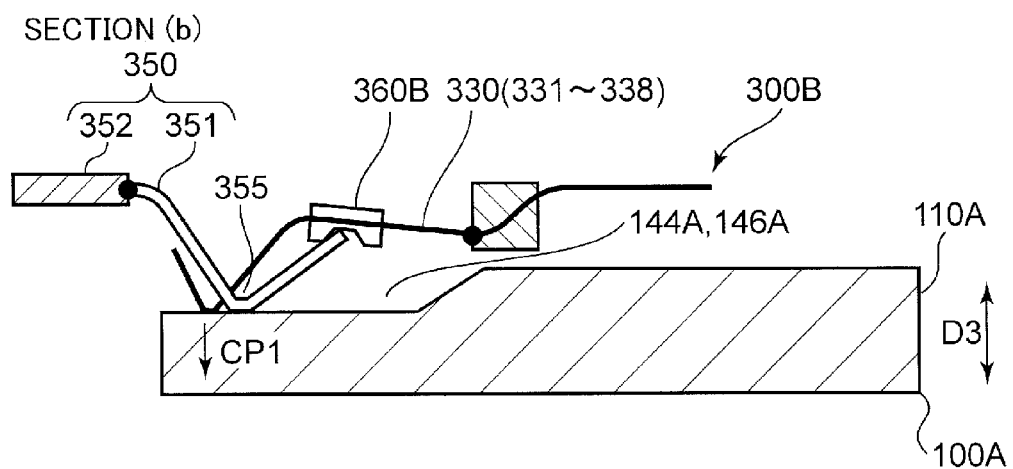
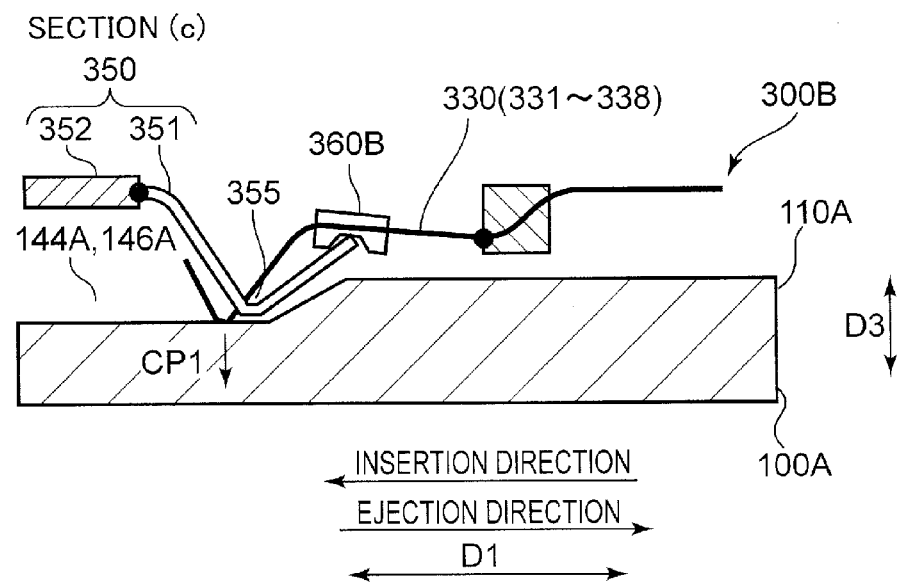

FIG.16A
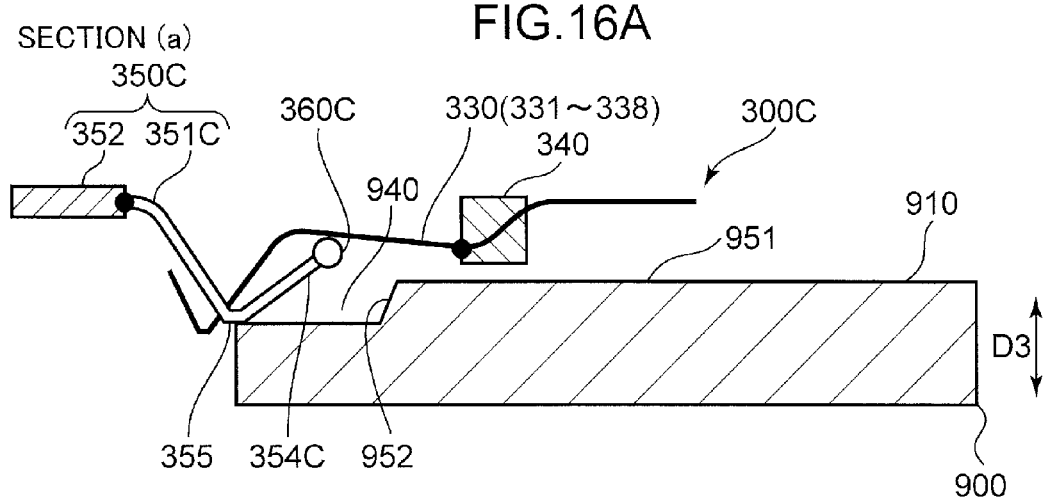
SECTION (a)
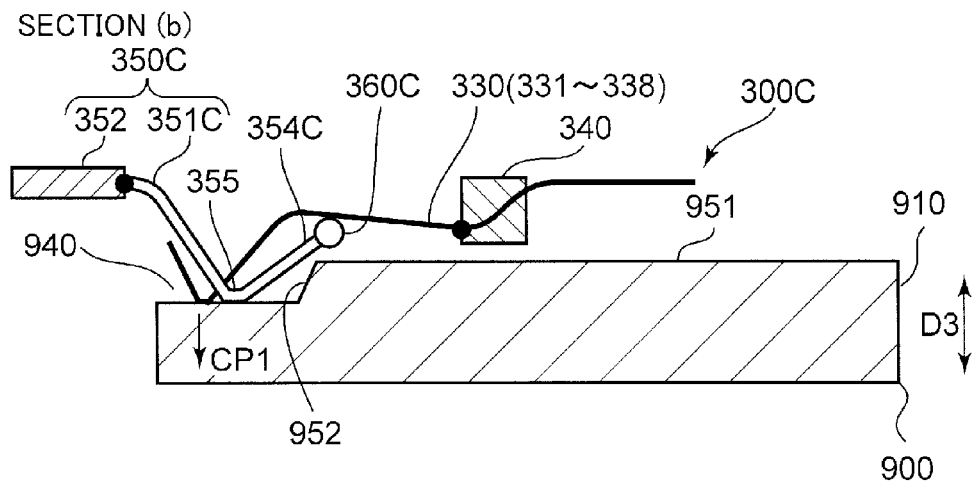
SECTION (b)
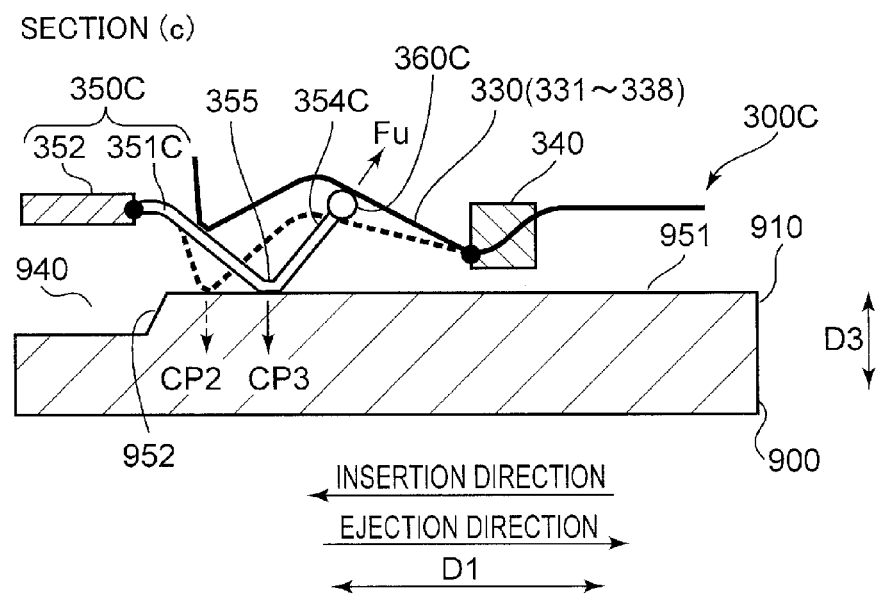
SECTION (c)

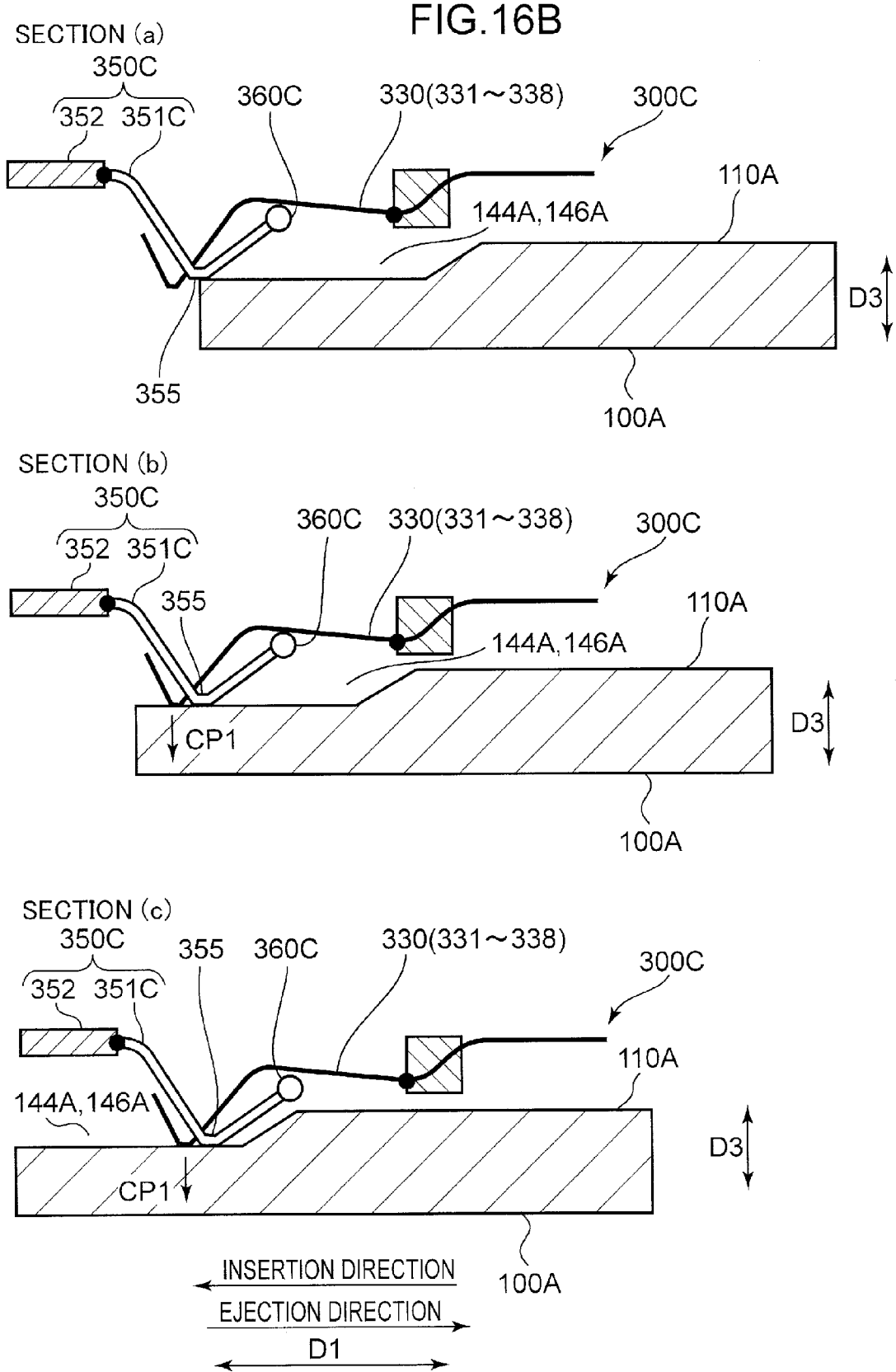

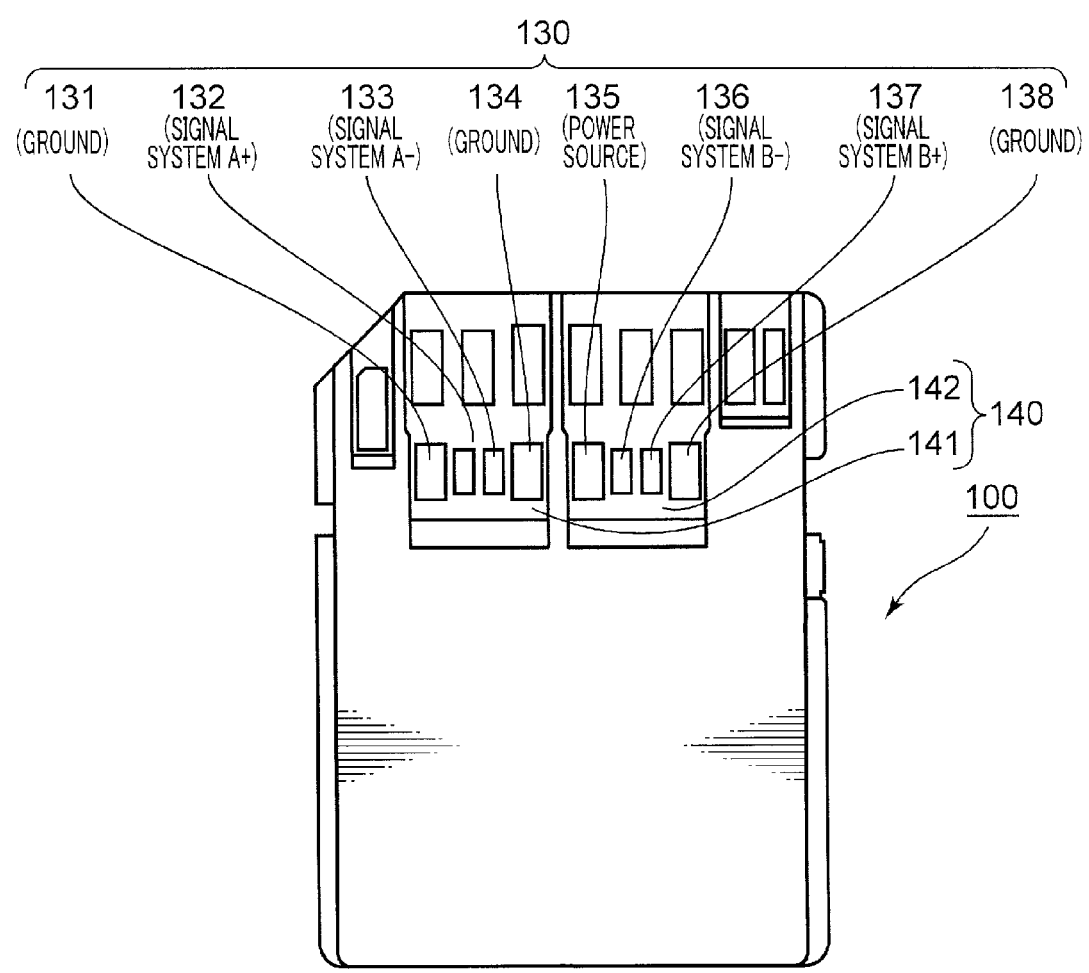

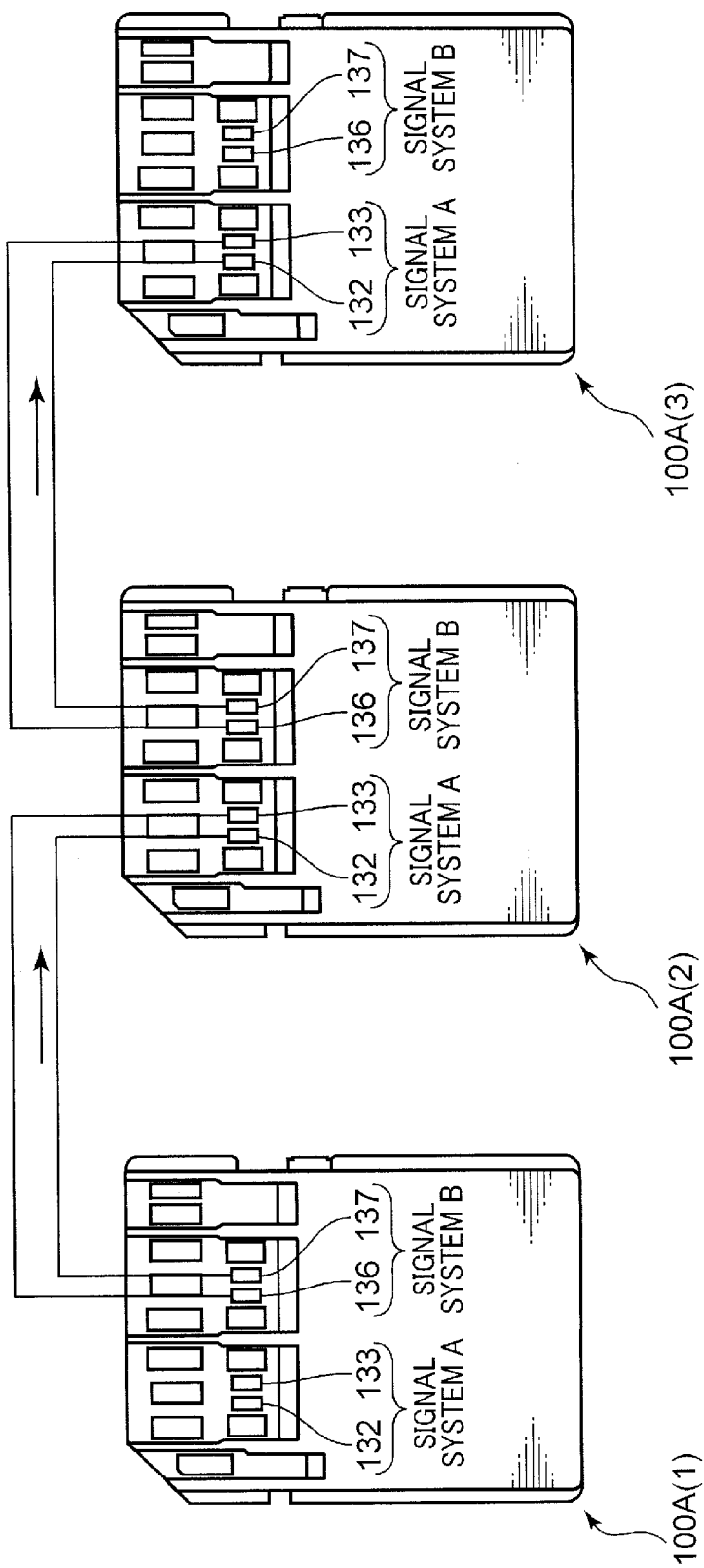

FIG.23A
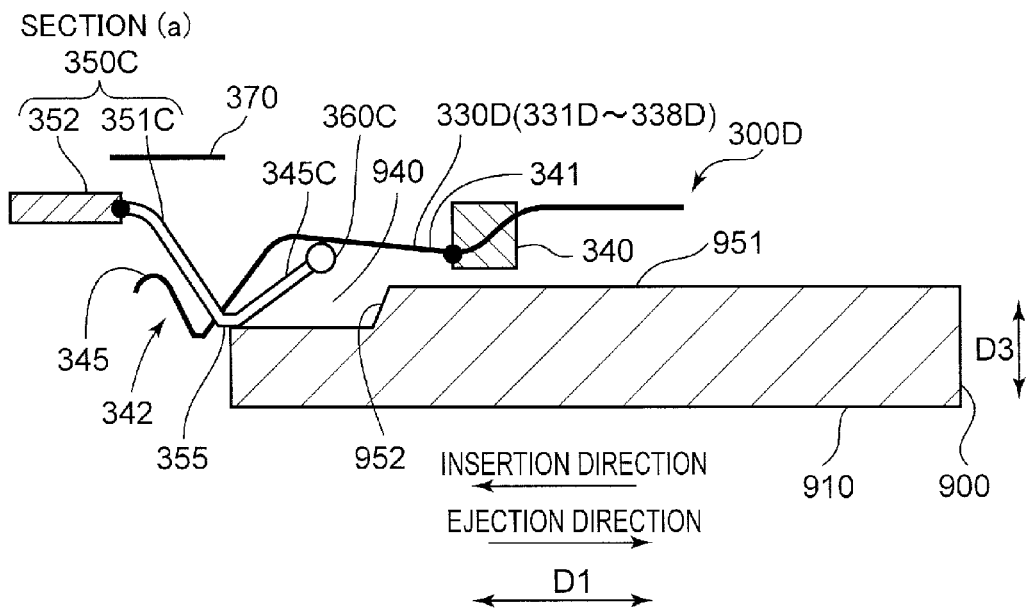
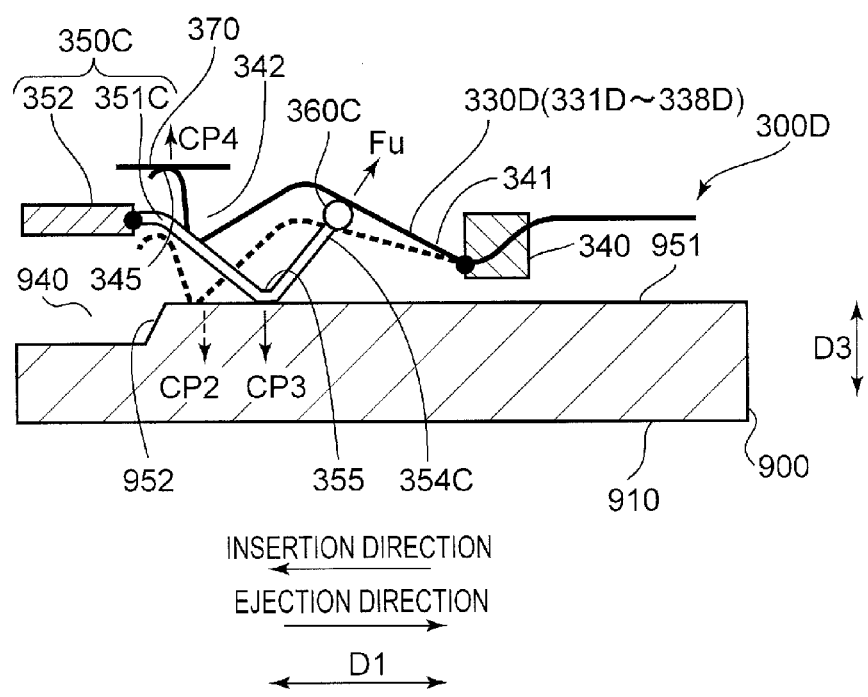

FIG.23B
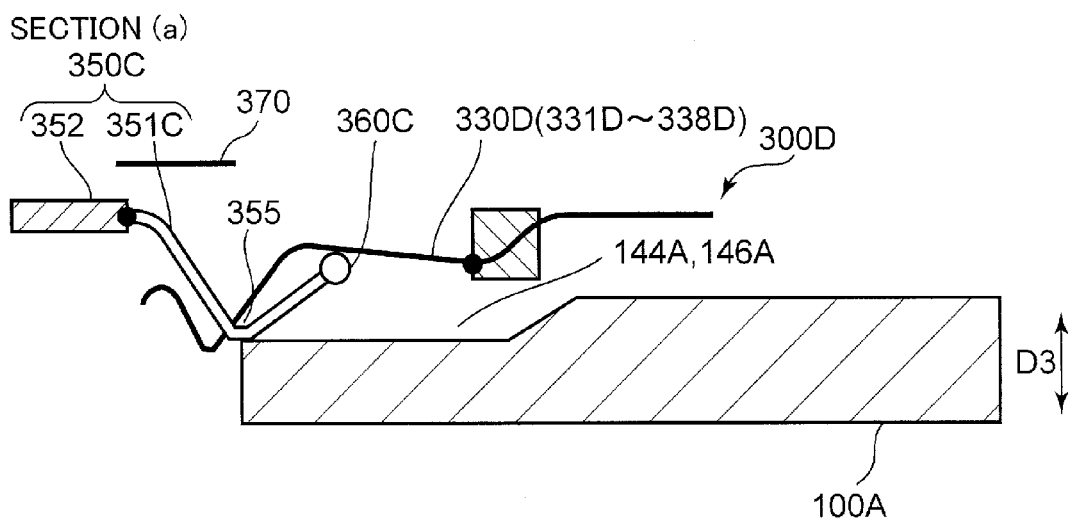
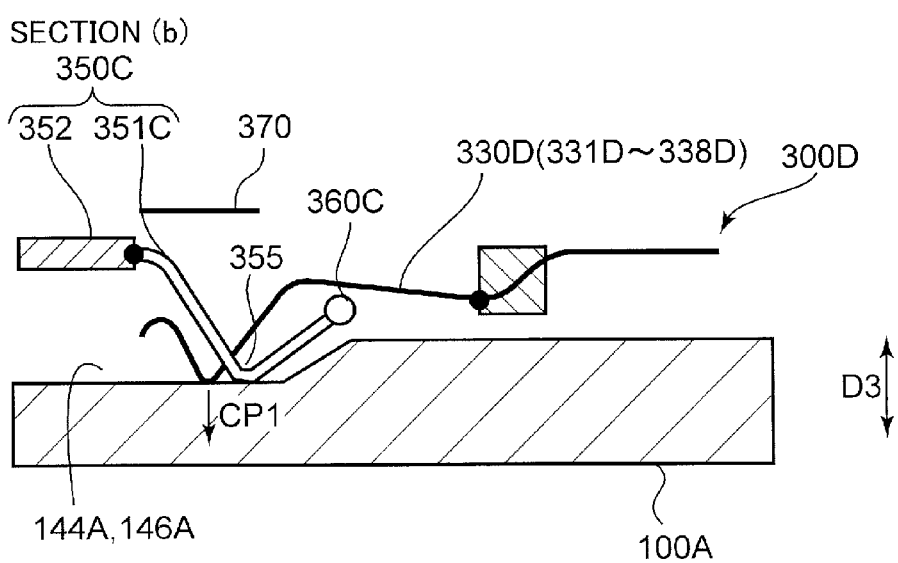

FIG.26
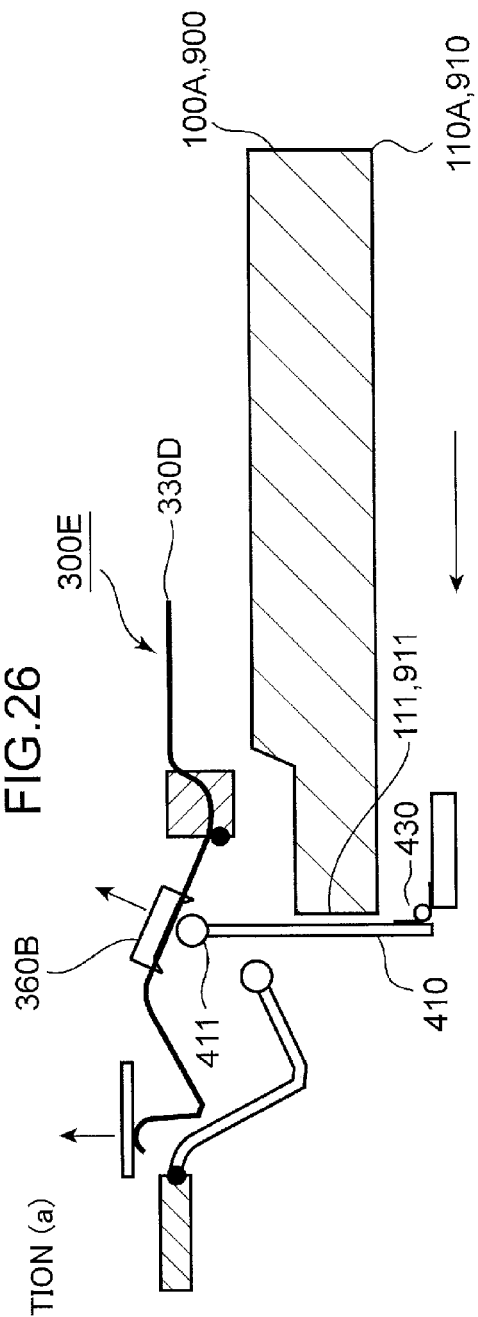
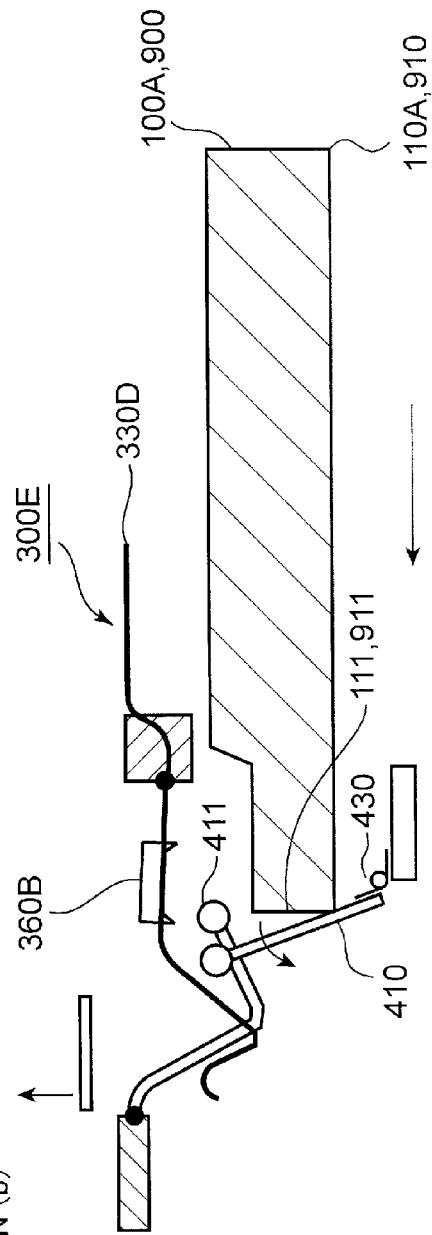

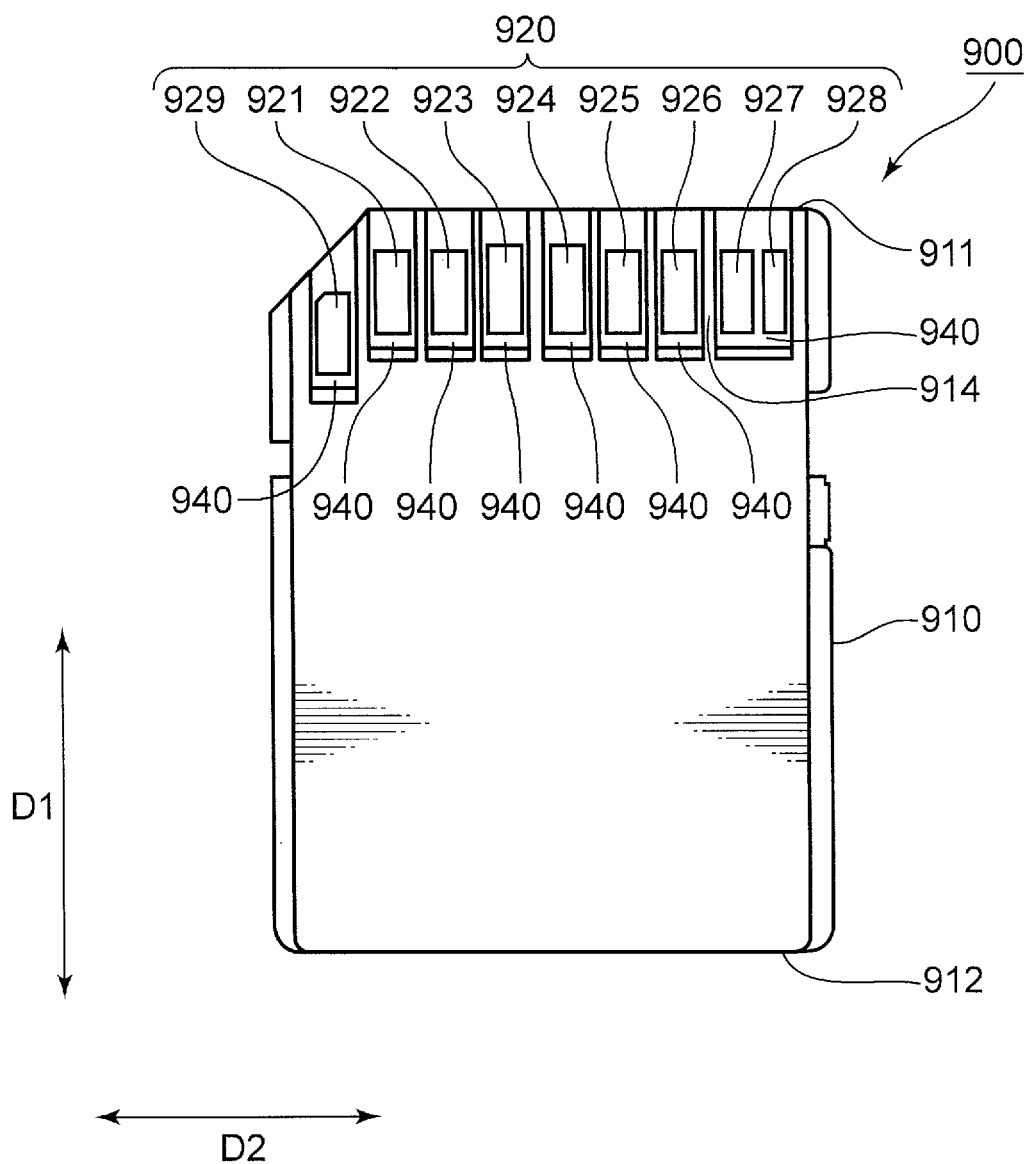

CARD DEVICE AND SOCKET

TECHNICAL FIELD

The present invention relates to a card device suitable for high frequency signal transmission, and a socket into which the card device is inserted.

BACKGROUND ART

For example, a compact card device (e.g., a memory card), which uses a mass storage flash device formed from a semiconductor material, is broadly used in recent years not only in a field of information processing apparatuses which process digital information, but also in various industrial applications such as in-car equipment mounted in vehicles. In particular, an SD memory card is one of the most popular card devices.

FIG. 27A is a schematic plan view of a conventional SD memory card. FIG. 27B is a schematic top perspective view of the conventional SD memory card. FIG. 27C is a schematic bottom perspective view of the conventional SD memory card. The conventional SD memory card is described with reference to FIGS. 27A to 27C.

The conventional SD memory card 900, which is used as a removable medium, typically has external dimensions of 32 mm×24 mm×2.1 mm. The SD memory card 900 is inserted into and ejected from a host device such as a personal computer in a first direction D1 (i.e., the longitudinal direction of the SD memory card 900). FIGS. 27A to 27C show a second direction D2 (i.e., the width direction of the SD memory card 900), which is orthogonal to the first direction D1, and a third direction D3 (i.e., the thickness direction of the SD memory card 900), which is orthogonal to the first and second directions D1, D2.

Definitions and terms about the aforementioned directions are commonly used in a series of the following embodiments. The definitions about the aforementioned directions do not in any way limit principles of a series of the following embodiments.

The SD memory card 900 includes a housing 910. The housing 910 includes a leading edge 911, which is inserted into the host device on ahead, and a trailing edge 912 opposite to the leading edge 911. The housing 910 includes recesses 940, which extend from the leading edge 911 toward the trailing edge 912, and ribs 914, which compartmentalize the recesses 940. Each of the ribs 914 which compartmentalize the recesses 940 also extends from the leading edge 911 toward the trailing edge 912, like the recesses 940.

As shown in FIGS. 27A and 27B, the SD memory card 900 further includes a single electrode array 920 arranged along the leading edge 911. The electrode array 920 includes electrodes 921 to 929 situated in the recesses 940, respectively. The electrodes 921 to 929 are aligned in the second direction D2.

The SD memory card 900 electrically communicates with a host device, which uses the SD memory card 900, via the electrode array 920. Therefore, data may be read from and written into the SD memory card 900.

Recent technical developments allow fast communication between the SD memory card and the host device. Consequently, it becomes faster to read and write data between the SD memory card and the host device.

Patent Documents 1 and 2 disclose a memory card having two electrode arrays. Since the SD memory card with the two electrode arrays has more electrodes than the SD memory card 900 described with reference to FIGS. 27A to 27C, such a SD memory card with the two electrode arrays may be suitably used for high frequency signal transmission.

If the SD memory card with the two electrode arrays disclosed in the Patent Documents and the SD memory card 900 described with reference to FIGS. 27A to 27C may be accommodated in a common housing space, the SD memory card with the two electrode arrays may become compatible with the SD memory card 900. However, since the SD memory card with the two electrode arrays has a different contact configuration from the SD memory card 900, an insertion distance of the SD memory card with the two electrode arrays into the housing space is different from an insertion distance of the SD memory card 900. In order to achieve compatibility with the SD memory card 900, a position of the trailing edge of the SD memory card with the two electrode arrays with respect to the housing space has to coincide with the trailing edge of the SD memory card 900 with respect to the housing space. However, because of the difference in the insertion distance between the SD memory card with the two electrode arrays and the SD memory card 900, a length of the SD memory card with the two electrode arrays has to be different from the SD memory card 900 in order to match the positions of the trailing edges with respect to the housing space.

The SD memory card with the two electrode arrays may not be inserted into a host device with a socket corresponding to a conventional SD memory card (e.g., the SD memory card 900 described with reference to FIGS. 27A to 27C), which has one electrode array. If the second electrode array from the leading edge is connected to a contact pin array of the socket in the host device, electrodes of the second electrode array has to be set to the same signal arrangement as the conventional SD memory card with the one electrode array. In this case, the first electrode array has to be used as additional electrodes for other signals. Accordingly, since the socket corresponding to the conventional SD memory card with the one electrode array does not correspond to the memory card with the two electrode arrays, appropriate electrical connection may not be established between the SD memory card with the two electrode arrays and the conventional host device.

Even if the conventional socket is improved and if the electrical connection for the first and second electrode arrays is established, it is necessary to switch signal wiring inside the SD memory card. Alternatively or additionally, signal arrangement of the first electrode array has to be switched to correspond to the conventional socket. Even on the basis of the aforementioned improvements, the high frequency signal transmission between the conventional socket and the SD memory card with the two electrode arrays may not be optimized. In order to switch the signal arrangement of the electrodes, it is necessary to connect a circuit, which is not required for high frequency signal transmission, inside the SD memory card, which results in increased floating capacitance of the signal electrodes of the SD memory card. Consequently, the signal transmission speed may not go up sufficiently.

Patent Document 1: JP 2006-252862 A
Patent Document 2: JP 2003-91700 A

SUMMARY OF THE INVENTION

An object of the present invention is to provide a card device, which is suitable for high frequency signal transmission and appropriately used together with a host device corresponding to a card device with one electrode array, and a socket, which is used with the aforementioned card device.

The card device configured to be inserted into and ejected from a host device in a first direction according to one aspect of the present invention has a first housing including a leading edge, which is inserted into the host device on ahead, and a trailing edge opposite to the leading edge; a first electrode array including first electrodes aligned in a second direction along the leading edge; and a second electrode array including second electrodes aligned in the second direction between the first electrode array and the trailing edge. The second electrodes include an electrode shifted from the first electrodes in the second direction.

The socket for selectively receiving and ejecting the aforementioned card device, and another card device including a second housing, which is geometrically different from the first housing, and a single electrode array situated on the second housing according to another aspect of the present invention includes a detector configured to detect a shape of the first and second housings; a first contact pin array configured to come into contact with the first or single electrode array; a second contact pin array configured to come into contact with the second electrode array; and an adjuster configured to adjust a contact pressure, which is applied to the second contact pin array, in response to the shape detected by the detector. The detector includes a plate spring which slides on the second concave region. The second housing includes a third concave region, which is slid by the plate spring, and a main surface, which is raised from the third concave region. The second concave region is longer than the third concave region. The adjuster connected to the plate spring and the second contact pin array is displaced by the plate spring in a third direction away from the main surface to decrease the contact pressure of the second contact pin array while a contact of the plate spring with the second housing moves from the third concave region to the main surface.

BRIEF DESCRIPTION OF THE DRAWINGS

FIG. 5A is a schematic view showing deformation of the second contact pin array of the socket shown in FIG. 2A.

FIG. 5B is a schematic view showing deformation of the second contact pin array of the socket shown in FIG. 2A.

FIG. 8B is a schematic plan view of the SD memory card of the second embodiment inserted into the socket shown in FIG. 7.

FIG. 10A is a schematic view showing deformation of a detection mechanism, an adjustment plate and a second contact pin array of the socket shown in FIG. 7.

FIG. 10B is a schematic view showing deformation of the detection mechanism, the adjustment plate and the second contact pin array of the socket shown in FIG. 7.

FIG. 13A is a schematic view showing deformation of a detection mechanism, a connecting plate and a second contact pin array of the socket shown in FIG. 11.

FIG. 13B is a schematic view showing deformation of the detection mechanism, the connecting plate and the second contact pin array of the socket shown in FIG. 11.

FIG. 16A is a schematic view showing deformation of a detection mechanism, an arm member and a second contact pin array of the socket shown in FIG. 14.

FIG. 16B is a schematic view showing deformation of the detection mechanism, the arm member and the second contact pin array of the socket shown in FIG. 14.

FIG. 17A is a schematic plan view showing pin assignment of the SD memory card shown in FIG. 1A.

FIG. 18 is a schematic plan view of the SD memory cards of the second embodiment which are linked together.

FIG. 23A is a schematic view showing deformation of a detection mechanism, an arm member and a second contact pin array of the socket shown in FIG. 19.

FIG. 23B is a schematic view showing deformation of the detection mechanism, the arm member and the second contact pin array of the socket shown in FIG. 19.

FIG. 26 is a schematic side view of the socket shown in FIG. 24.

FIG. 27A is a schematic plan view of the conventional SD memory card.

DETAILED DESCRIPTION OF THE INVENTION

Figure 1A:
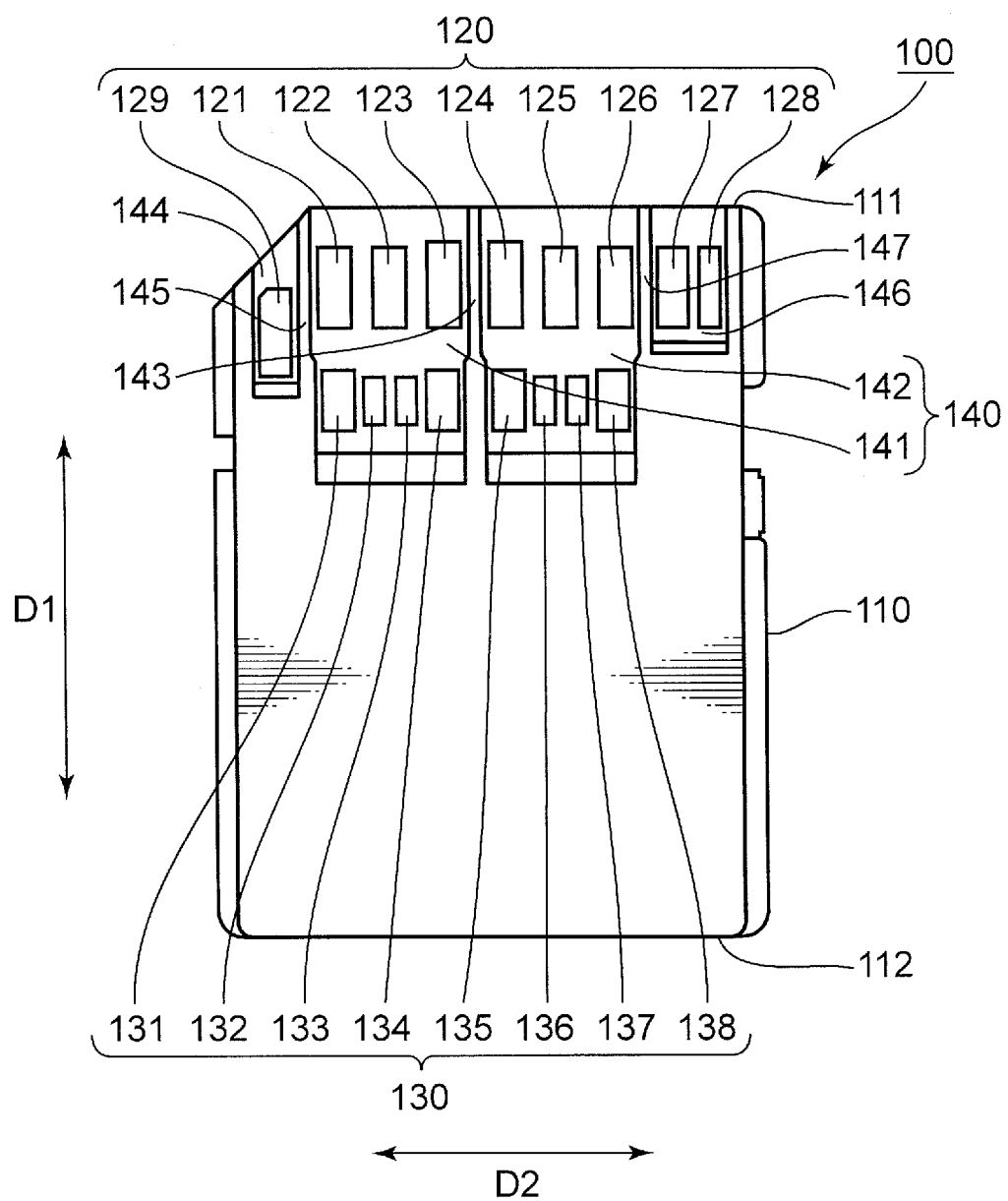
FIG. 1A is a schematic plan view of an SD memory card exemplified as the card device according to the first embodiment.

An SD memory card exemplified as the card device according to various embodiments and a socket, which is used with the SD memory card, are described with reference to the drawings. In the drawings, the same reference numerals are given to the constituent elements which have the same or similar effects or operations. In order to avoid redundant explanations, repetitive descriptions are omitted as appropriate. Directional terms such as "up", "down", "left" and "right" are used for clarification of the following description without limiting principles of a series of the following embodiments.

(First Embodiment)

Figure 1B:
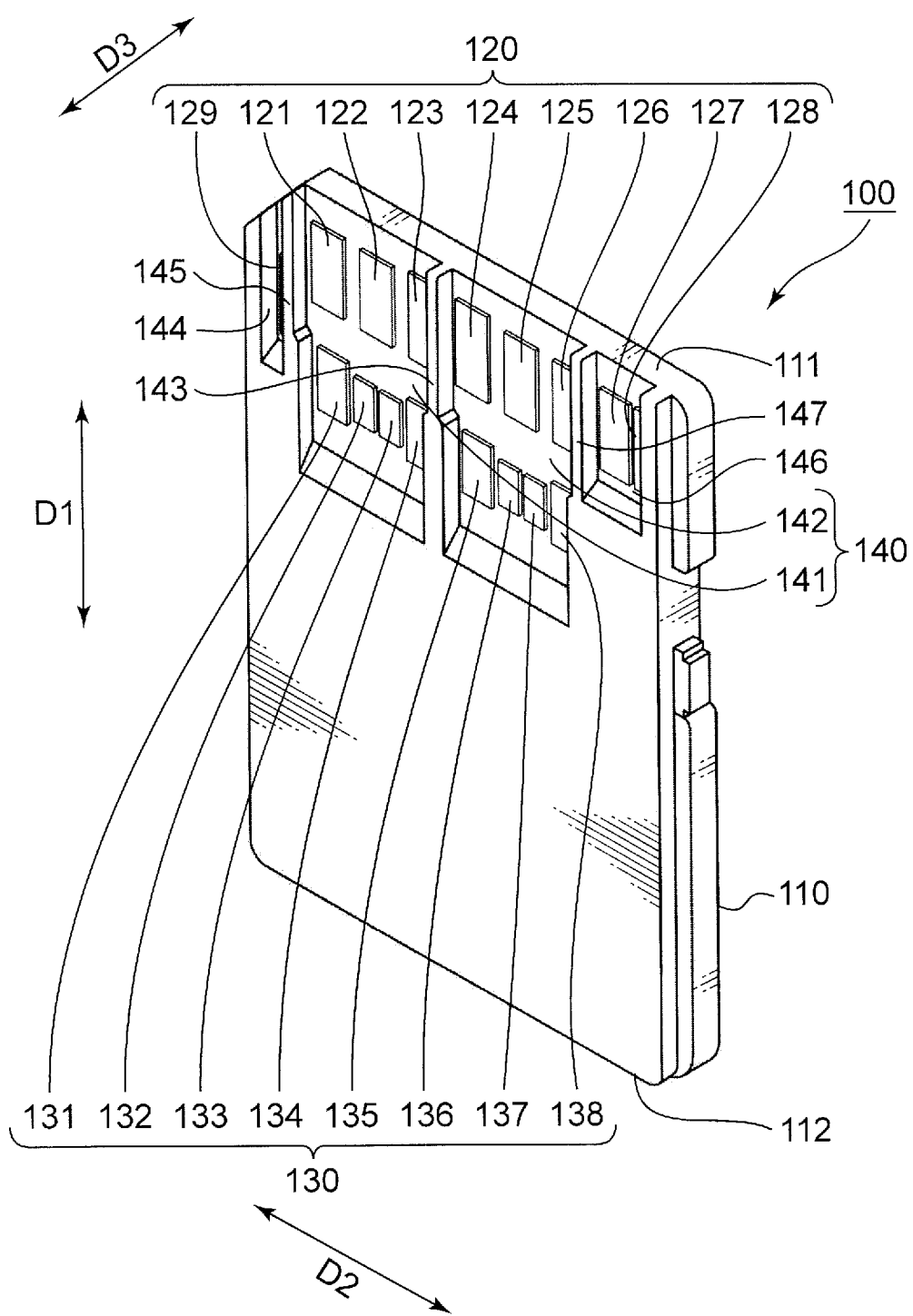
FIG. 1B is a schematic top perspective view of the SD memory card shown in FIG. 1A.
Figure 1C:
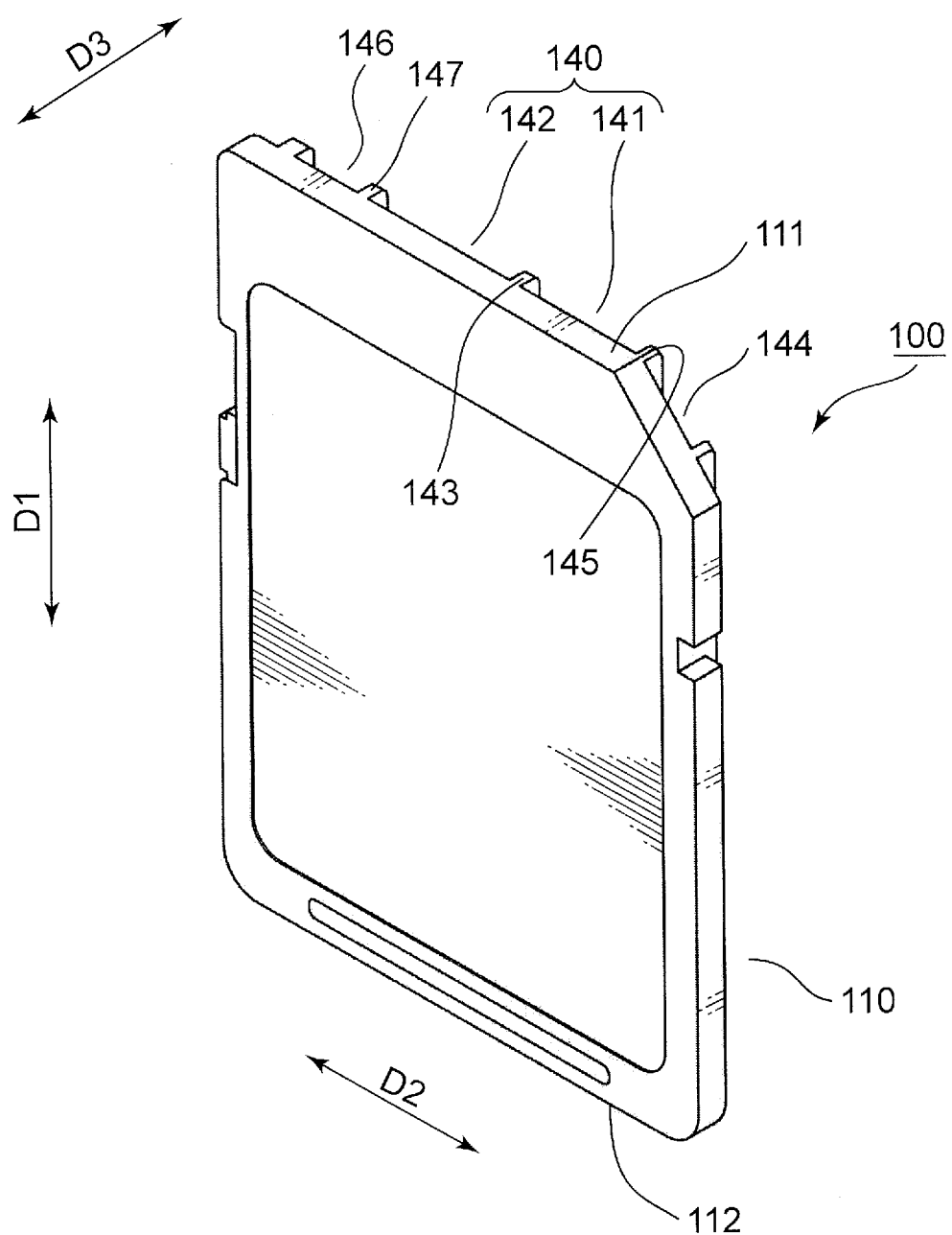
FIG. 1C is a schematic bottom perspective view of the SD memory card shown in FIG. 1A.

FIG. 1A is a schematic plan view of the SD memory card exemplified as the card device according to the first embodiment. FIG. 1B is a schematic top perspective view of the SD memory card shown in FIG. 1A. FIG. 1C is a schematic bottom perspective view of the SD memory card shown in FIG. 1A. The SD memory card is described with reference to FIGS. 1A to 1C and FIGS. 27A to 27C.

(SD Memory Card)

Figure 27B:
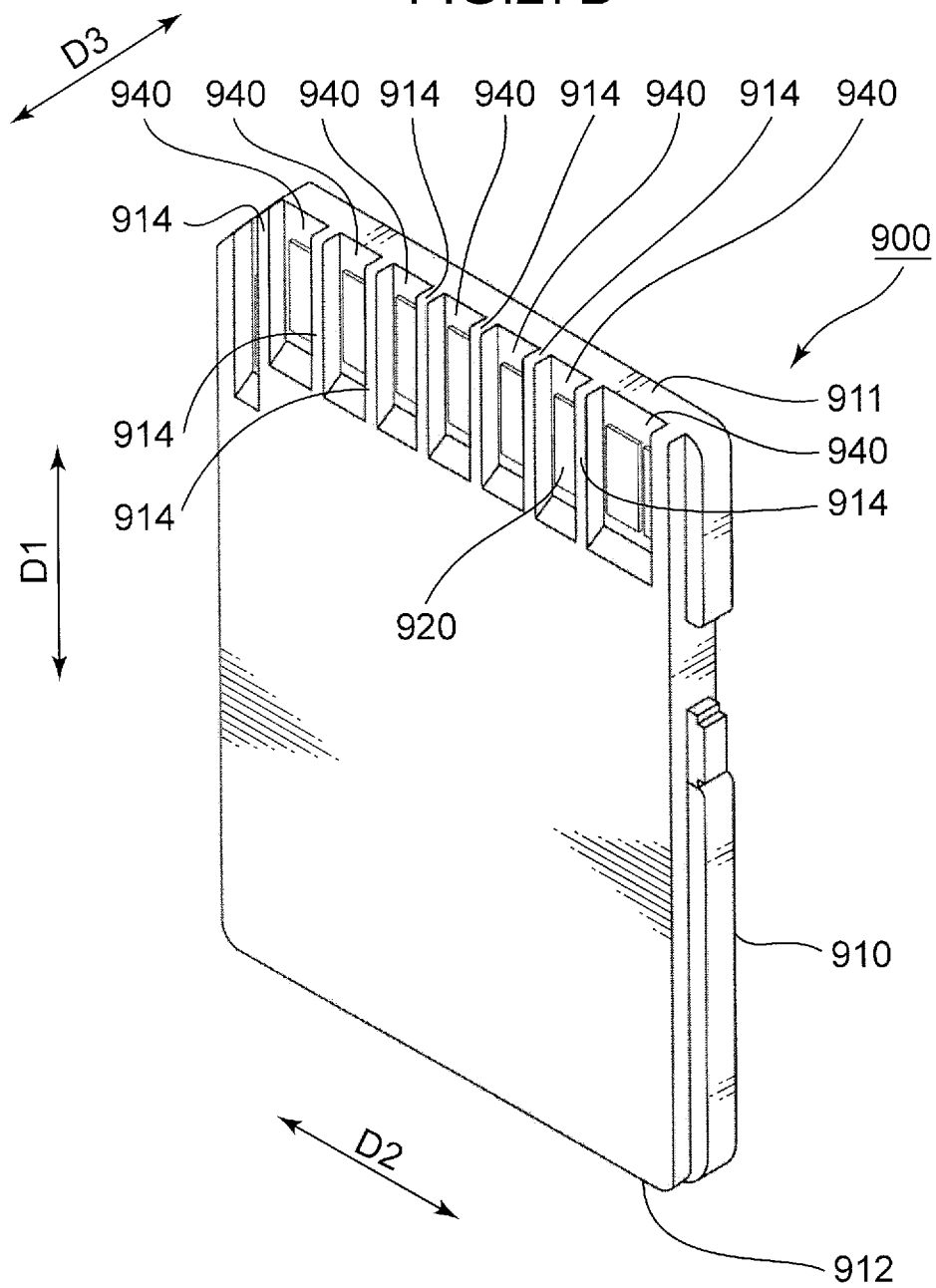
FIG. 27B is a schematic top perspective view of the SD memory card shown in FIG. 27A.
Figure 27C:
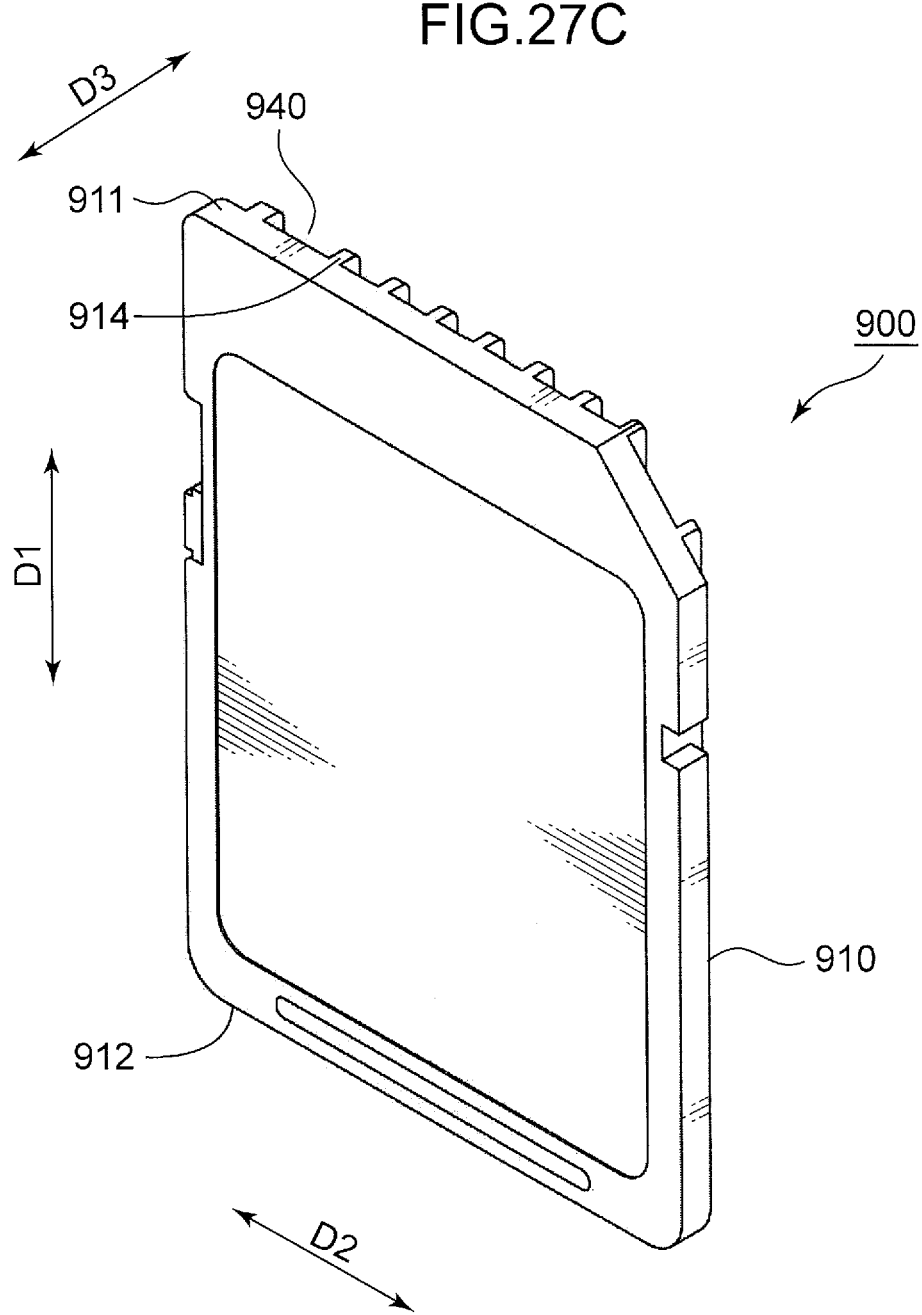
FIG. 27C is a schematic bottom perspective view of the SD memory card shown in FIG. 27A.

The SD memory card 100 shown in FIGS. 1A to 1C is inserted into and ejected from a host device (not shown) such as a personal computer in a first direction D1, like the conventional SD memory card 900 described with reference to FIGS. 27A to 27C. The SD memory card 100 includes a housing 110 which has a substantially rectangular box shape. The housing 110 includes a leading edge 111, which is inserted into the host device on ahead, and a trailing edge 112 opposite to the leading edge 111. In this embodiment, the housing 110 is exemplified as the first housing.

The SD memory card 100 further includes a first electrode array 120 which has first electrodes 121 to 129 aligned in the second direction D2 along the leading edge 111. As clearly shown in comparison between FIGS. 1A and 27A, an arrangement of each of the first electrodes 121 to 129 corresponds to an arrangement of each of the electrodes 921 to 929 of the conventional SD memory card 900. Accordingly, the SD memory card 100 is compatible with the conventional SD memory card 900.

The SD memory card 100 further includes a second electrode array 130, which has second electrodes 131 to 138 aligned in the second direction D2 between the first electrode array 120 and the trailing edge 112. The housing 110 includes a central recess 140 in which a part of the first electrode array 120 (i.e., the first electrodes 121 to 126) and the second electrode array 130 are situated. The central recess 140, which extends from the leading edge 111 toward the trailing edge 112, includes a left recess 141 and a right recess 142. The housing 110 further includes a central rib 143 configured to partition the left and right recesses 141, 142. In this embodiment, the central recess 140 is exemplified as the first concave region.

The housing 110 additionally includes a leftmost recess 144 formed on the left of the left recess 141, and a left rib 145 configured to partition the left recess 141 and the leftmost recess 144. The leftmost first electrode 129 among the first electrode array 120 is situated in the leftmost recess 144. Like the central recess 140, the leftmost recess 144 extends from the leading edge 111 toward the trailing edge 112.

The housing 110 further includes a rightmost recess 146 formed on the right of the right recess 142, and a right rib 147 configured to partition the right recess 142 and the rightmost recess 146. The rightmost electrode 128 among the first electrode array 120 and the first electrode 127 to the left of the first electrode 128 are situated in the rightmost recess 146.

Unlike the conventional SD memory card 900 described with reference to FIGS. 27A to 27C, there is no rib for partitioning the electrodes (the first electrodes 121 to 123 and the second electrodes 131 to 134) in the left recess 141. Accordingly, the arrangement and number of the second electrodes 131 to 134 are optimized about high frequency signal communication, independent of the arrangement and number of the first electrodes 121 to 123. Consequently, the second electrodes 131 to 134 of this embodiment may be situated so that the second electrodes 131 to 134 are shifted from the first electrodes 121 to 123 in the second direction D2. There are three electrodes of the first electrode array 120 situated in the left recess 141 whereas there are four electrodes of the second electrode array 130.

Unlike the conventional SD memory card 900 described with reference to FIGS. 27A to 27C, there is no rib for partitioning the electrodes (the first electrodes 124 to 126 and the second electrodes 135 to 138) in the right recess 142. Accordingly, the arrangement and number of the second electrodes 135 to 138 are optimized about high frequency signal communication, independently of the arrangement and number of the first electrodes 124 to 126. Consequently, the second electrodes 135 to 138 of this embodiment are situated so that the second electrodes 135 to 138 are shifted from the first electrodes 124 to 126 in the second direction D2. There are three electrodes of the first electrode array 120 situated in the right recess 142 whereas there are four electrodes of the second electrode array 130.

The second electrode array 130 is a dedicated electrode, which is mainly used for high frequency signal transmission without conjunctive circuit. Accordingly, floating capacitance of the electrodes of the second electrode array 130 for high frequency signals is minimized. In this embodiment, the second electrodes 132, 133, 136, 137 of the second electrode array 130 are used as the electrodes for high frequency signals. The second electrodes 131, 134, 135, 138 of the second electrode array 130 are used as the power source electrodes and the ground electrodes for matching impedance with high frequency signals. It is preferable that the floating capacitance of the SD memory card 100 is less likely to increase. In this embodiment, the second electrode array 130 is situated in the central recess 140 substantially at the center in the second direction D2. Since a conventional socket is disconnected from the second electrode array 130, floating capacitance of signal lines while the SD memory card 100 is inserted may not exceed floating capacitance of signal lines while the conventional SD memory card 900 is inserted.

A combo-type socket is typically used in various apparatuses such as existing printers. Another card device (e.g., a specific memory card), to which the combo-type socket is compatible with the conventional SD memory card 900, includes a power source electrode situated near the left and right edges of the housing. If the additional electrode array extends up to a position near the left and right edges of the housing, a contact pin for the power source electrode situated so as to come into contact with the power source electrode of conventional and other card devices may come into contact with the additional electrode array, which results in short-circuit between the contact pin for the power source electrode and the card device with the additional electrode array.

As shown in FIGS. 1A to 1C, the second electrode array 130 of the SD memory card 100 of this embodiment is accommodated in the central recess 140. Accordingly, the second electrode array 130 is less likely to come into contact with the contact pin for the power source electrode used in other card devices.

In order to shorten a transition time, in general, transmission of low-amplitude and high-frequency signals is advantageous. On the other hand, the low-amplitude and high-frequency signals are susceptible to noise caused by electromagnetic induction. Accordingly, signal lines are situated so as to reduce influence of noise caused by electromagnetic induction.

In order to reduce unnecessary radiation, it is advantageous to reduce a rate and high-frequency components during a state transition of signal lines. However, a reduction in the rate during the state transition of signal lines may degrade a noise margin during the state transition. Accordingly, in this embodiment, high frequency signals are transmitted and received by a differential I/O circuit which is well resistant to in-phase noise between the SD memory card 100 and the host device, via the second electrode array 130.

(Socket)

Figure 2A:
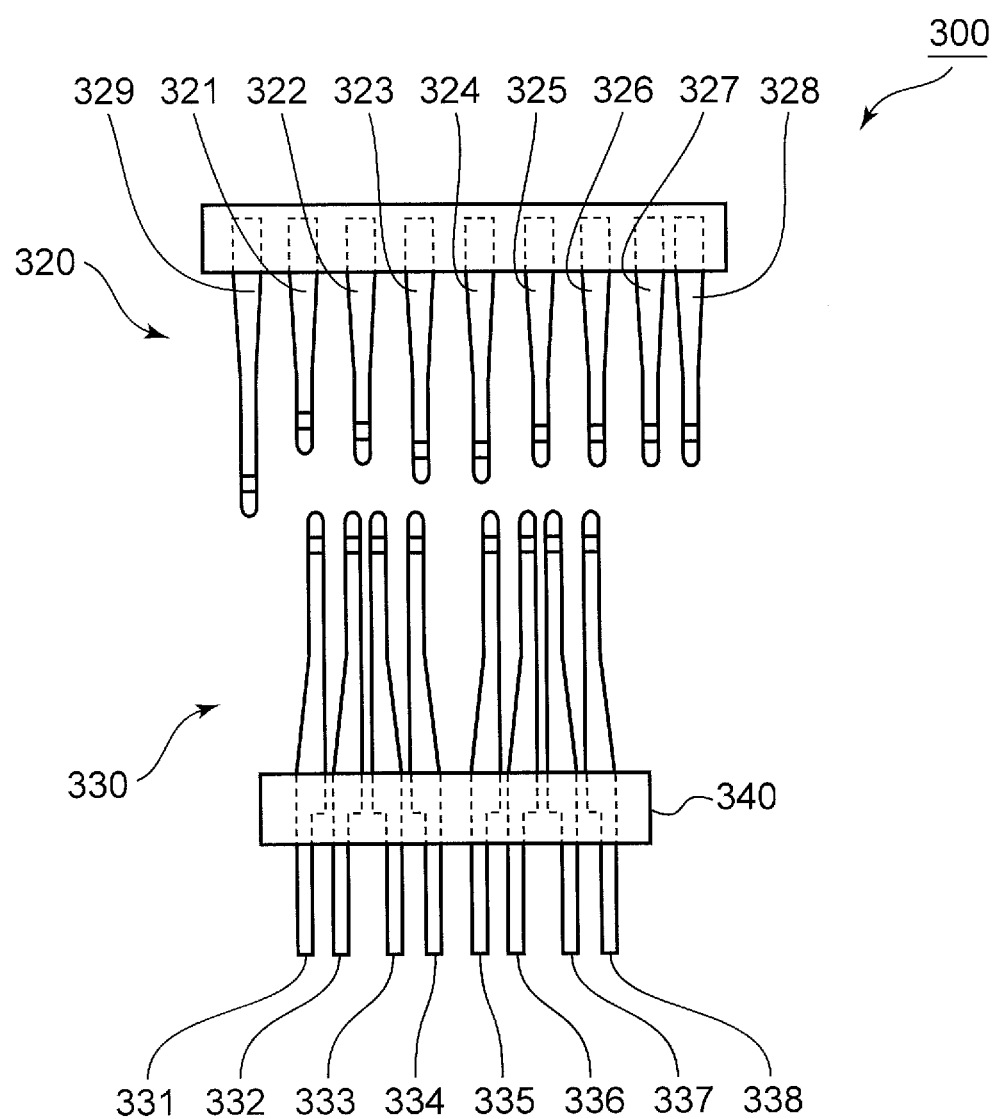
FIG. 2A is a schematic plan view of a socket configured to maintain compatibility between the SD memory card shown in FIG. 1A and a conventional SD memory card.
Figure 2B:
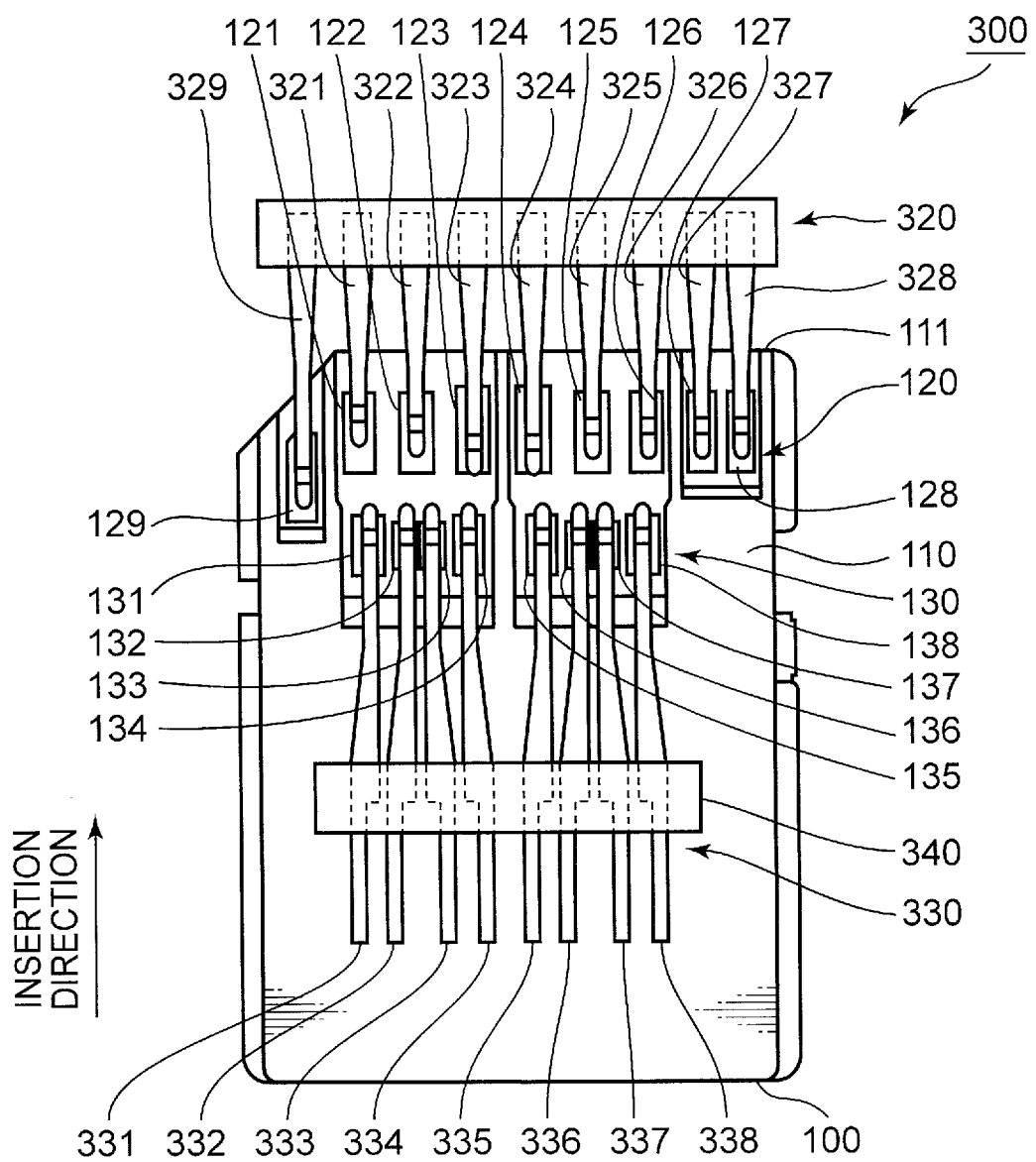
FIG. 2B is a schematic plan view of the socket into which the SD memory card shown in FIG. 1A is inserted.

FIGS. 2A and 2B show the socket configured to maintain compatibility between the SD memory cards 100, 900 described with reference to FIGS. 1A to 1C and FIGS. 27A to 27C. FIG. 2A is a schematic plan view of the socket without insertion of the SD memory cards 100, 900. The SD memory card 100 described with reference to FIGS. 1A to 1C is inserted into the socket shown in FIG. 2B. The socket is described with reference to FIGS. 1A, 2A, 2B and 27A.

The socket 300 includes a first contact pin array 320 situated so as to come into contact with the first electrode array 120 of the SD memory card 100 of this embodiment or the single electrode array 920 of the conventional SD memory card 900, and a second contact pin array 330 situated so as to come into contact with the second electrode array 130 of the SD memory card 100 of this embodiment.

The first contact pin array 320 includes first pins 321 to 329. The first pin 321 comes into contact with the first electrode 121 of the SD memory card 100 of this embodiment or the electrode 921 of the conventional SD memory card 900. The first pin 322 comes into contact with the first electrode 122 of the SD memory card 100 of this embodiment or the electrode 922 of the conventional SD memory card 900. The first pin 323 comes into contact with the first electrode 123 of the SD memory card 100 of this embodiment or the electrode 923 of the conventional SD memory card 900. The first pin 324 comes into contact with the first electrode 124 of the SD memory card 100 of this embodiment or the electrode 924 of the conventional SD memory card 900. The first pin 325 comes into contact with the first electrode 125 of the SD memory card 100 of this embodiment or the first electrode 925 of the conventional SD memory card 900. The first pin 326 comes into contact with the first electrode 126 of the SD memory card 100 of this embodiment or the electrode 926 of the conventional SD memory card 900. The first pin 327 comes into contact with the first electrode 127 of the SD memory card 100 of this embodiment or the electrode 927 of the conventional SD memory card 900. The first pin 328 comes into contact with the first electrode 128 of the SD memory card 100 of this embodiment or the electrode 928 of the conventional SD memory card 900. The first pin 329 comes into contact with the first electrode 129 of the SD memory card 100 of this embodiment or the first electrode 929 of the conventional SD memory card 900.

The second contact pin array 330 includes second pins 331 to 338. The second pin 331 comes into contact with the second electrode 131 of the SD memory card 100 of this embodiment. The second pin 332 comes into contact with the second electrode 132 of the SD memory card 100 of this embodiment. The second pin 333 comes into contact with the second electrode 133 of the SD memory card 100 of this embodiment. The second pin 334 comes into contact with the second electrode 134 of the SD memory card 100 of this embodiment. The second pin 335 comes into contact with the second electrode 135 of the SD memory card 100 of this embodiment. The second pin 336 comes into contact with the second electrode 136 of the SD memory card 100 of this embodiment. The second pin 337 comes into contact with the second electrode 137 of the SD memory card 100 of this embodiment. The second pin 338 comes into contact with the second electrode 138 of the SD memory card 100 of this embodiment.

As shown in FIG. 2B, the leading edge 111 of the housing 110 is inserted into the socket 300 first. Accordingly, the leading edge 111 comes into contact with the second contact pin array 330 first, and then comes into contact with the first contact pin array 320.

As shown in FIG. 27A, the housing 910 of the conventional SD memory card 900 includes recesses 940 for housing the electrodes 921 to 929. The recess 940 for housing the leftmost electrode 929 may have the same shape and size as the leftmost recess 144. The recess 940 for housing the rightmost electrode 928 and the electrode 927 to the left of the electrode 928 may have the same shape and size as the rightmost recess 146.

As clearly shown in comparison between FIGS. 1A and 27A, a length of the first direction D1 of the six recesses 940 for housing the electrodes 921 to 926 aligned between the electrodes 929, 927 is shorter than a length of the first direction D1 of the central recess 140. Accordingly, when the conventional SD memory card 900 is inserted into the socket 300, a contact pressure between the second contact pin array 330 and the housing 910 of the SD memory card 900 may become relatively high.

(Contact Pressure of Second Contact Pin)

Figure 3A:
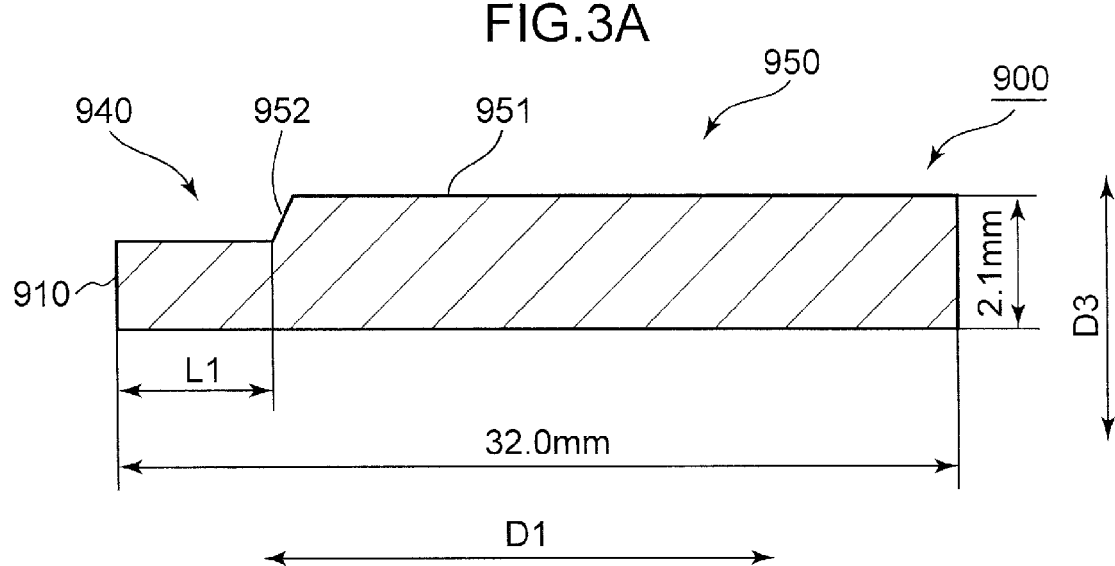
FIG. 3A is a schematic longitudinal cross section of the conventional SD memory card.
Figure 3B:
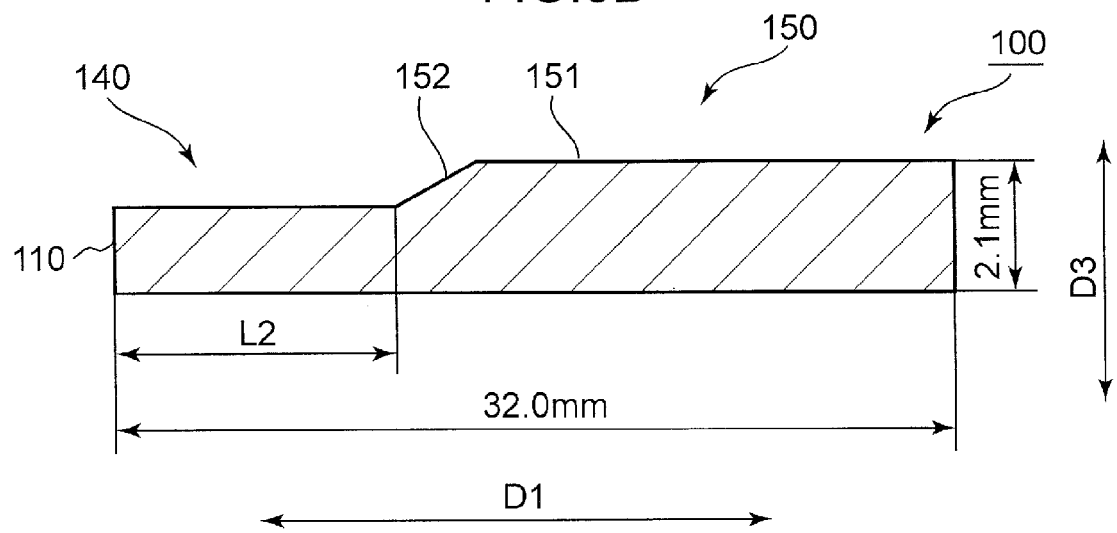
FIG. 3B is a schematic longitudinal cross section of the SD memory card shown in FIG. 1A.

FIG. 3A is a schematic longitudinal cross section of the conventional SD memory card 900. FIG. 3B is a schematic longitudinal cross section of the SD memory card 100 of this embodiment. Outer shapes of the SD memory cards 100, 900 are described with reference to FIGS. 2A to 3B. It should be noted that since an SD memory card generally has a smaller thickness dimension than the length dimension (e.g., approximately $1/15$ of the length dimension), a scale of the cross section shape shown in FIGS. 3A and 3B is different from actual dimensions for clarification. The thickness dimension is depicted under approximately 2.5 times as large scale as the length dimension.

The conventional SD memory card 900 typically has a length dimension (the first direction D1) of approximately 32.0 mm and a thickness dimension (the third direction D3) of approximately 2.1 mm. Likewise, the SD memory card 100 of this embodiment has a length dimension (the first direction D1) of approximately 32.0 mm and a thickness dimension (the third direction D3) of approximately 2.1 mm. Accordingly, both the conventional SD memory card 900 and the SD memory card 100 of this embodiment may be inserted into the socket 300 described with reference to FIGS. 2A and 2B.

As shown in FIG. 3A, the recess 940 of the conventional SD memory card 900 has a length dimension (first direction D1) of "L1". As shown in FIG. 3B, the central recess 140 of the SD memory card 100 of this embodiment has a length dimension of "L2" which is longer than "L1".

Figure 4A:
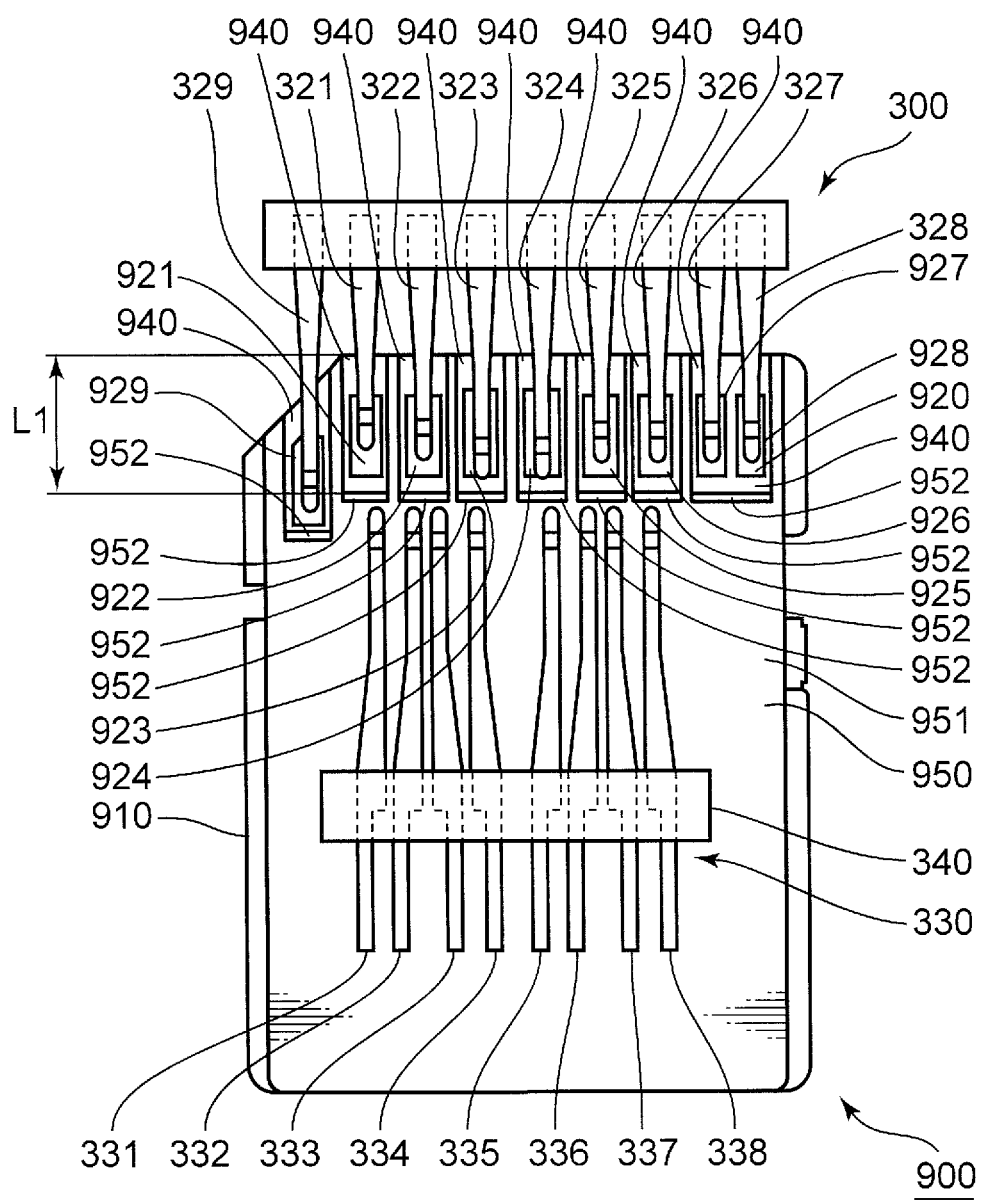
FIG. 4A is a schematic plan view of the conventional SD memory card inserted into the socket shown in FIG. 2A.
Figure 4B:
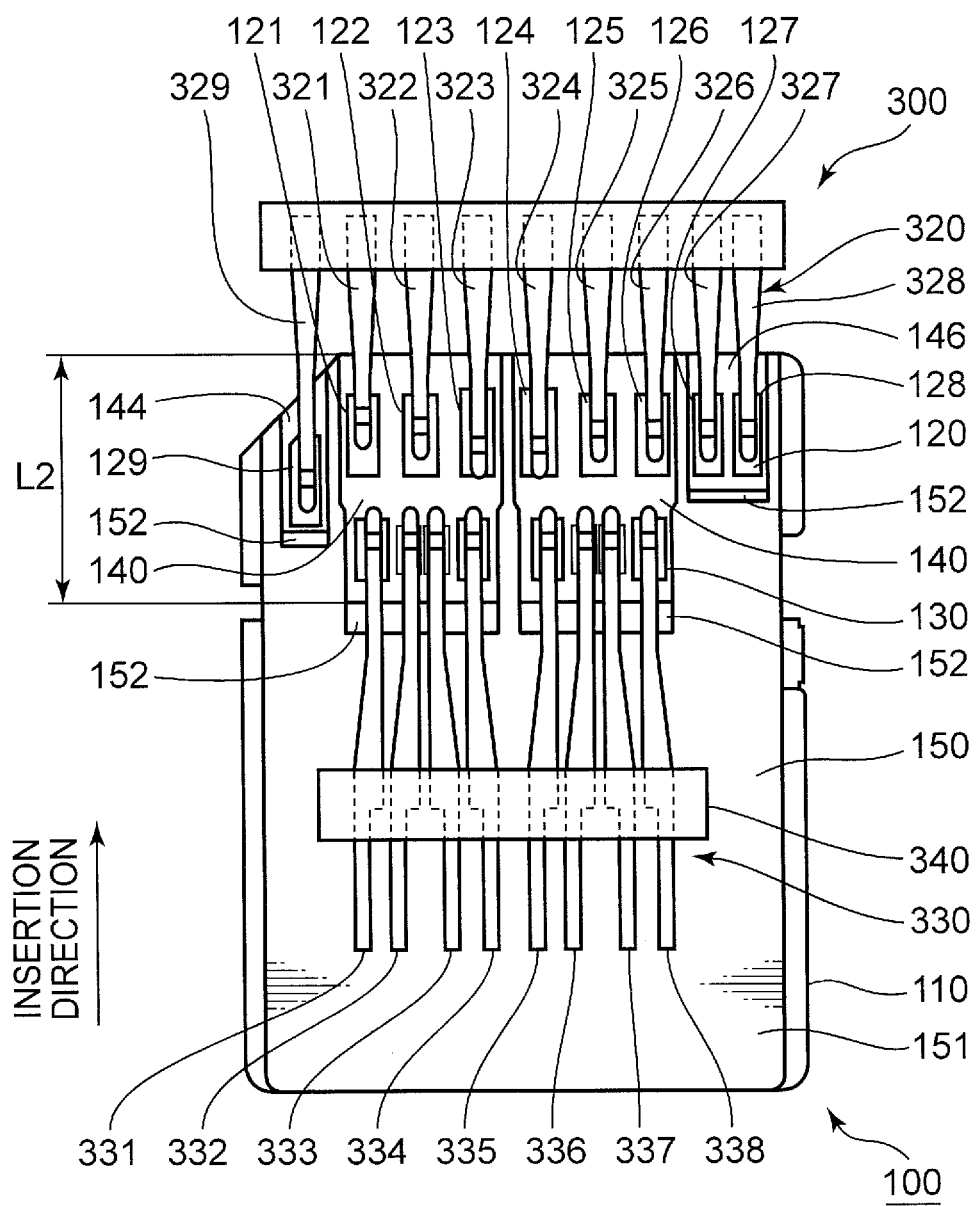
FIG. 4B is a schematic plan view of the SD memory card of the first embodiment inserted into the socket shown in FIG. 2A.

FIG. 4A is a schematic plan view of the conventional SD memory card 900 inserted into the socket 300. FIG. 4B is a schematic plan view of the SD memory card 100 of this embodiment inserted into the socket 300. The SD memory cards 100, 900 are further described with reference to FIGS. 3A to 4B.

As shown in FIG. 3A, the housing 910 of the conventional SD memory card 900 includes an upper surface 950 on which the recess 940 is formed. The upper surface 950 includes a main surface 951, which is raised from the recess 940, and an inclined surface 952, which is inclined between the recess 940 and the main surface 951, in addition to the recess 940.

As shown in FIG. 3B, the housing 110 of the SD memory card 100 of this embodiment includes an upper surface 150 on which the central, leftmost and rightmost recesses 140, 144, 146 are formed. In addition to the central, leftmost and rightmost recesses 140, 144, 146, the upper surface 150 includes a main surface 151, which is raised from each of the central, leftmost and rightmost recesses 140, 144, 146, and an inclined surface 152, which is inclined between the central, leftmost or rightmost recess 140, 144, 146 and the main surface 151.

As shown in FIG. 4B, when the SD memory card 100 is inserted into the socket 300, the second contact pin array 330 of the socket 300 comes into contact with the second electrode array 130 in the central recess 140. On the other hand, since the length dimension "L1" of the recess 940 is shorter than the length dimension "L2" of the central recess 140, the second contact pin array 330 runs upon the main surface 951 via the inclined surface 952 when the conventional SD memory card 900 is inserted into the socket 300, as shown in FIG. 4A.

As shown in FIG. 3A, the thickness dimension of the housing 910 on the main surface 951 is large in comparison to that on the recess 940. Accordingly, the contact pressure between the second contact pin array 330 and the main surface 951 becomes relatively large. On the other hand, since the second contact pin array 330 comes into contact with the second electrode array 130 on the central recess 140 where there is a relatively thin thickness dimension, the contact pressure of the second contact pin array 330 become relatively small when the SD memory card 100 is inserted.

FIG. 5A schematically shows deformation of the second contact pin array 330 while the SD memory card 100 of this embodiment is inserted into the socket 300. The deformation of the second contact pin array 330 is described with reference to FIGS. 4B and 5A.

The socket 300 includes a fixing member 340 configured to fix the second contact pin array 330, for example, to a housing (not shown) of a host device (not shown). Each of the second pins 331 to 338 of the second contact pin array 330 includes a horizontal portion 341 which extends substantially horizontally (the first direction D1) from the fixing member 340, and an elbow portion 342 which bends in a substantial V-shape from the horizontal portion 341.

Section (a) of FIG. 5A is a schematic cross section of the SD memory card 100 which reaches the elbow portion 342. As shown in section (a) of FIG. 5A, the apex 343 of the elbow portion 342 is positioned below the surface of the central recess 140 (the horizontal surface on which the second electrode array 130 is situated) by a value of "y1". The second contact pin array 330 shown in section (a) of FIG. 5A is not deformed. Accordingly, there is no contact pressure between the housing 110 and the second contact pin array 330.

Section (b) of FIG. 5A is a schematic cross section of the SD memory card 100 which is inserted into the socket 300 more deeply. When the SD memory card 100 is inserted into the socket 300 more deeply, the connection 344 between the horizontal portion 341 and the fixing member 340 is elastically bent, so that the second contact pin array 330 runs upon the surface of the central recess 140 (the horizontal surface on which the second electrode array 130 is situated). Therefore, the apex 343 of the elbow portion 342 comes into contact with the surface of the central recess 140.

As a result of the elastic bending (i.e., the deformation amount "y1") of the connection 344 between the horizontal portion 341 and the fixing member 340, a contact pressure CP1 occurs between the apex 343 of the elbow portion 342 and the surface of the central recess 140 (the horizontal surface on which the second electrode array 130 is situated).

Section (c) of FIG. 5A is a schematic cross section of the SD memory card 100 which is inserted into the socket 300 more deeply. When the SD memory card 100 is inserted into the socket 300 more deeply, as shown in FIG. 4B, the second contact pin array 330 comes into contact with the second electrode array 130. Since the surface of the central recess 140 (the horizontal surface on which the second electrode array 130 is situated) is substantially parallel to the insertion direction of the SD memory card 100, the contact pressure CP1 becomes substantially consistent between the apex 343 of the elbow portion 342 and the surface of the central recess 140 (the horizontal surface on which the second electrode array 130 is situated).

As shown in FIG. 4B, when the second contact pin array 330 comes into contact with the second electrode array 130, the first contact pin array 320 comes into contact with the first electrode array 120. In this embodiment, like the second contact pin array 330, the first contact pin array 320 is also deformed by the deformation amount "y1". Accordingly, the contact pressure CP1 occurs between each of the first pins 321 to 329 and each of the first electrodes 121 to 129.

If a value of all the contact pressures CP1 generated between the first contact pin array 320 and the first electrode array 120 is "αN (N is Newton)", the overall force applied by the first contact pin array 320 to the first electrode array 120 becomes "9×αN". If a value of all the contact pressures CP1 generated between the second contact pin array 330 and the second electrode array 130 is "αN (N is Newton)", the overall force applied by the second contact pin array 330 to the second electrode array 130 becomes "8×αN". Accordingly, in total, a force of "17×αN" is applied to the SD memory card 100.

FIG. 5B schematically shows deformation of the second contact pin array 330 while the conventional SD memory card 900 is inserted into the socket 300. The deformation of the second contact pin array 330 is described with reference to FIGS. 4A, 5A and 5B.

Section (a) of FIG. 5B is a schematic cross section of the SD memory card 900 which reaches the elbow portion 342. As shown in section (a) of FIG. 5B, the apex 343 of the elbow portion 342 is positioned below the surface of the recess 940 (the horizontal surface on which the single electrode array 920 is situated) by a value of "y1". The apex 343 of the elbow portion 342 is positioned below the main surface 951 by a value of "y2". The second contact pin array 330 shown in section (a) of FIG. 5B is not deformed. Accordingly, there is no contact pressure between the housing 910 and the second contact pin array 330.

Section (b) of FIG. 5B is a schematic cross section of the SD memory card 900 which is inserted into the socket 300 more deeply. When the SD memory card 900 is inserted into the socket 300 more deeply, the connection 344 between the horizontal portion 341 and the fixing member 340 is elastically bent, so that the second contact pin array 330 runs upon the surface of the recess 940 (the horizontal surface on which the single electrode array 920 is situated). Therefore, the apex 343 of the elbow portion 342 comes into contact with the surface of the recess 940.

As a result of the elastic bending (i.e., the deformation amount "y1") of the connection 344 between the horizontal portion 341 and the fixing member 340, a contact pressure CP1 occurs between the apex 343 of the elbow portion 342 and the surface of the recess 940 (the horizontal surface on which the single electrode array 920 is situated). It should be noted that since the resultant deformation amount of the second contact pin array 330 from the insertion of the SD memory card 900 is "y1" like the deformation amount described with reference to FIG. 5A, a value of the contact pressure CP1 becomes "αN".

Section (c) of FIG. 5B is a schematic cross section of the SD memory card 900 which is inserted into the socket 300 more deeply. The second contact pin array 330 runs upon the main surface 951 via the inclined surface 952 when the SD memory card 900 is inserted into the socket 300 more deeply. Consequently, since the elastic bending (i.e., the deformation amount "y2") of the connection 344 between the horizontal portion 341 and the fixing member 340 becomes further increased, a greater contact pressure CP2 than the contact pressure CP1 occurs between the second contact pin array 330 and the main surface 951.

As shown in FIG. 4A, when the second contact pin array 330 runs upon the main surface 951, the first contact pin array 320 comes into contact with the single electrode array 920. In this embodiment, the first contact pin array 320 is deformed by the deformation amount "y1". Accordingly, the contact pressure CP1 is generated between each of the first pins 321 to 329 and each of the electrodes 921 to 929.

If the value of all the contact pressures CP1 generated between the first contact pin array 320 and the single electrode array 920 is "αN (N is Newton)", the overall force applied by the first contact pin array 320 to the single electrode array 920 becomes "9×αN".

The deformation amount "y2" when the conventional SD memory card 900 is inserted typically becomes twice or more as great as the deformation amount "y1" (y2>2×y1). Accordingly, the value of all the contact pressures CP2 generated between the second contact pin array 330 and the main surface 951 becomes "2×αN" or more. In other words, the overall force applied by the second contact pin array 330 to the second electrode array 130 becomes "8×2×αN" or more. Therefore, the SD memory card 100 receives a total force greater than "25×αN".

Based on the aforementioned simple computation about the contact pressure, it may be understood that a contact pressure, which is 1.5 times or more as great as the contact pressure applied to the SD memory card 100 of this embodiment described with reference to FIG. 5A, is applied to the conventional SD memory card 900.

(Issues about Contact Pressure of Second Contact Pin)

A lot of existing sockets, into which an SD memory card is inserted, are of a push-push type. A push-push type socket typically includes a cam mechanism, which detects insertion of an SD memory card to control the insertion and ejection of the SD memory card, and a spring mechanism, which ejects the SD memory card. When a user inserts an SD memory card into the socket, the cam mechanism settles the SD memory card in a predetermined position. Subsequently, when the user inserts the SD memory card more deeply, the cam mechanism and the spring mechanism automatically eject the SD memory card settled in the predetermined position.

A push-push type socket is superior in terms of operability. The push-push type socket is relatively compact. Accordingly, The push-push type socket is widely used.

If an SD memory card with a single electrode array and an SD memory card with additional electrodes, which are exclusively used for high frequency signal transmission, are utilized in parallel, a push-push type socket needs a margin, that is 1.5 times or more, for the ejection force required to eject the SD memory card (if a coefficient of friction between the contact portion of the contact pin and the housing of the SD memory card is constant). This makes a design of the socket very complicated. For example, if a resilient force of the spring mechanism is increased in order to grow up the ejection force, the SD memory card may problematically jump out from the socket. The jumping problem may lead to a loss problem of the SD memory card jumped out from the socket.

Each of contact pins used in a socket are typically formed from a thin metal material such as a plate spring. The application of high contact pressure to the contact region of the thin contact pin may degrade plating which covers a surface of the contact pin. The degraded plating may make electrical connection much less reliable.

As described with reference to FIGS. 5A and 5B, the contact pressure CP2 between the conventional SD memory card 900 and each of the second pins 331 to 338 of the second contact pin array 330 is twice or more as great as the normal contact pressure CP1. Accordingly, the main surface 951 of the SD memory card 900 is rubbed with a relatively strong force. If the SD memory card 900 is repeatedly inserted and ejected, a plastic material forming the main surface 951 becomes scraped. In particular, since the second contact pin array 330 is formed from harder metal members than the plastic material, the main surface 951 may be seriously worn. Because of the wear of the main surface 951, scraped plastic dust may be accumulated on the surface of the SD memory card 900. Otherwise, the plastic dust may become adhered to the second and/or first contact pin arrays 330, 320.

The plastic dust accumulated on the surface of the SD memory card 900 may further grow up the wear of the main surface 951 upon subsequent insertion and ejection of the SD memory card 900. The plastic dust adhered to the second and/or first contact pin arrays 330, 320 may cause a failure in electrical connection of the second and/or first contact pin arrays 330, 320.

(Second Embodiment)

Figure 6A:
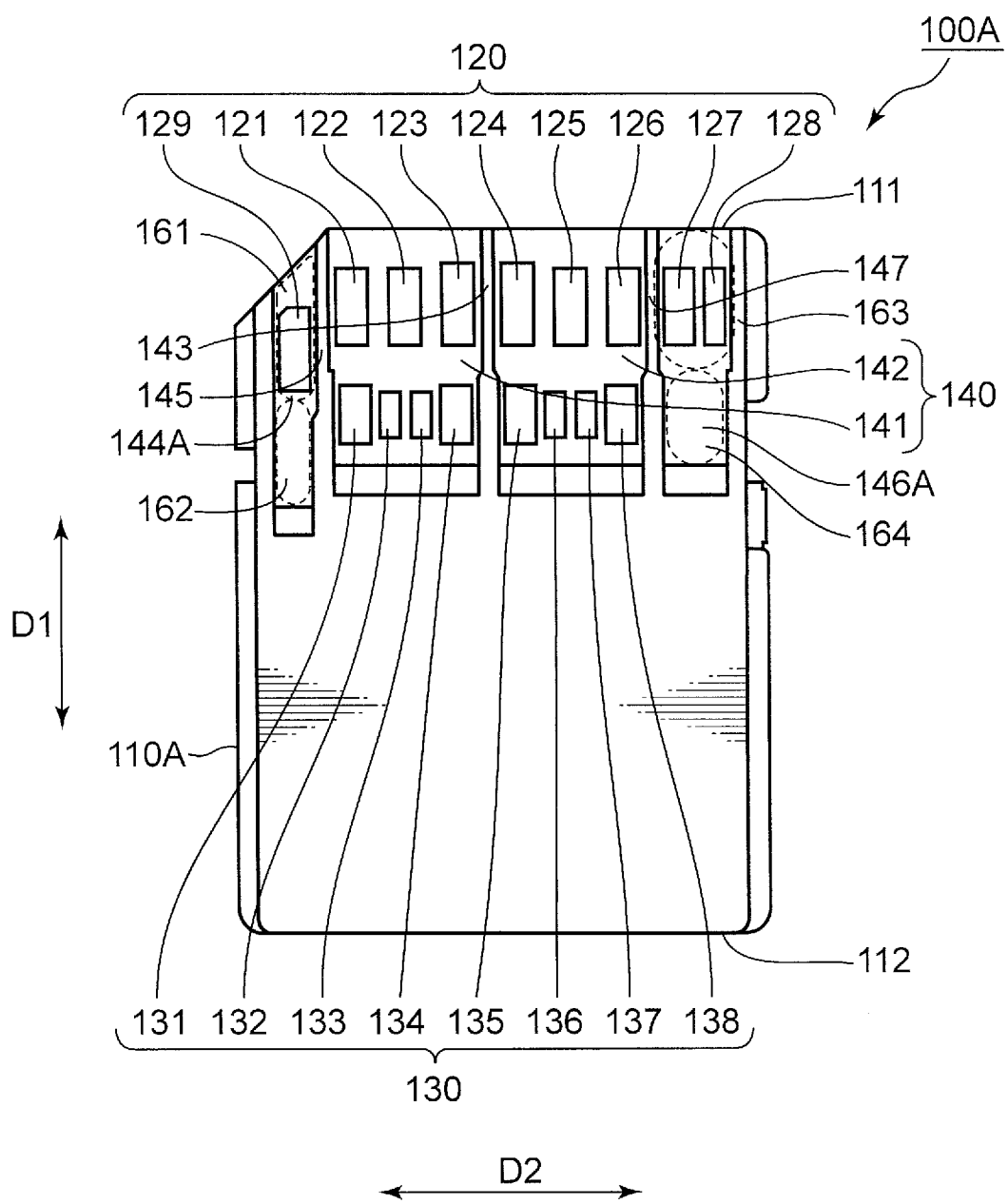
FIG. 6A is a schematic plan view of a SD memory card exemplified as the card device according to the second embodiment.
Figure 6B:
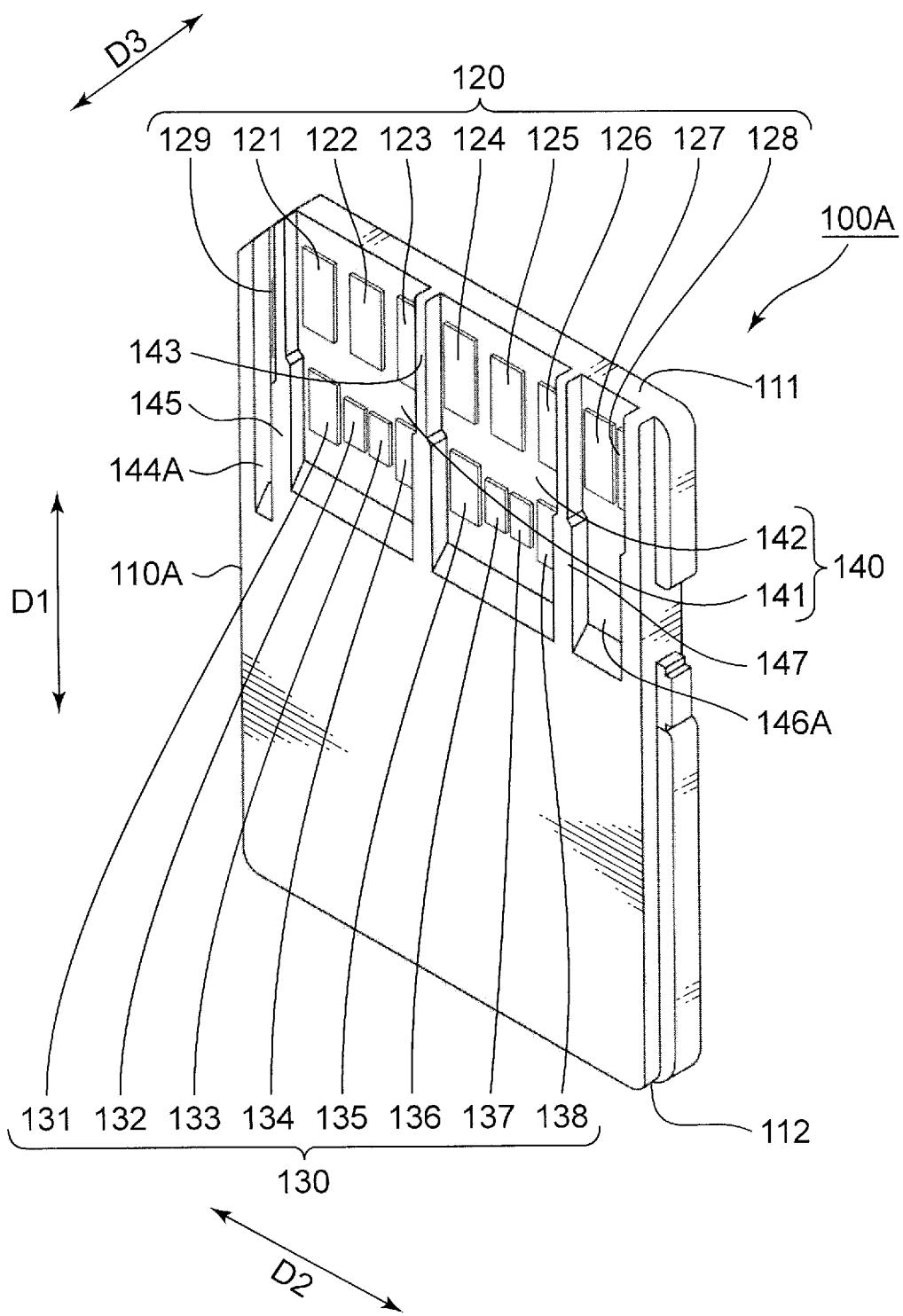
FIG. 6B is a schematic top perspective view of the SD memory card shown in FIG. 6A.
Figure 6C:
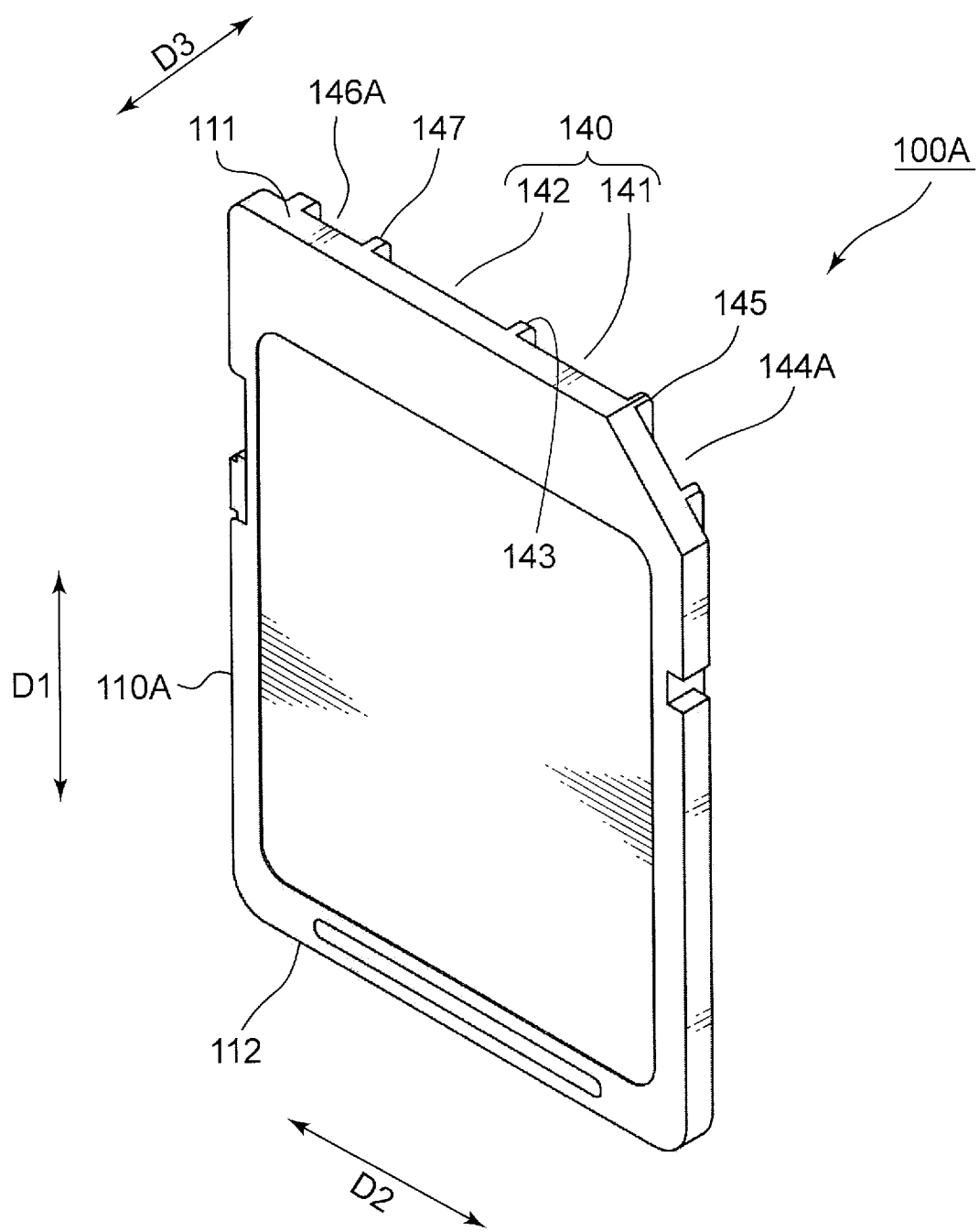
FIG. 6C is a schematic bottom perspective view of the SD memory card shown in FIG. 6A.

FIGS. 6A to 6C show an SD memory card exemplified as the card device according to the second embodiment. The SD memory card of the second embodiment may appropriately overcome the aforementioned problems.

FIG. 6A is a schematic plan view of the SD memory card which is exemplified as the card device according to the second embodiment. FIG. 6B is a schematic top perspective view of the SD memory card shown in FIG. 6A. FIG. 6C is a schematic bottom perspective view of the SD memory card shown in FIG. 6A. The SD memory card of the second embodiment is described with reference to FIGS. 1A to 1C, FIGS. 6A to 6C and FIGS. 27A to 27C.

The SD memory card 100A of the second embodiment includes a housing 110A in addition to the first and second electrode arrays 120, 130 like the SD memory card 100 of the first embodiment. It should be noted that the arrangement pattern of the first electrodes 121 to 129 of the first electrode array 120 and the arrangement pattern of the second electrodes 131 to 138 of the second electrode array 130 on the housing 110A are the same as the first embodiment.

The housing 110A includes the central recess 140 like the first embodiment. The central recess 140 extending from the leading edge 111 toward the trailing edge 112 includes the left and right recesses 141, 142. The housing 110A further includes the central rib 143 configured to partition the left and right recesses 141, 142.

The housing 110A further includes a leftmost recess 144A formed on the left of the left recess 141, and a left rib 145 configured to partition the left recess 141 and the leftmost recess 144A. The leftmost first electrode 129 among the first electrode array 120 is situated in the leftmost recess 144A. Like the central recess 140, the leftmost recess 144A extends from the leading edge 111 toward the trailing edge 112.

The housing 110A further includes a rightmost recess 146A formed on the right of the right recess 142, and a right rib 147 configured to partition the right recess 142 and the rightmost recess 146A. The rightmost first electrode 128 among the first electrode array 120 and the first electrode 127 to the left of the first electrode 128 are situated in the rightmost recess 146A. In this embodiment, the leftmost and rightmost recesses 144A, 146A are exemplified as the second concave region, respectively.

As shown in FIG. 6A, the leftmost recess 144A includes a leading region 161 adjacent to the first electrode 121 in the central recess 140, and a detection region 162 adjacent to the second electrode 131 in the central recess 140. The first electrode 129 is situated in the leading region 161 whereas no electrode is situated in the detection region 162.

As shown in FIG. 6A, the rightmost recess 146A includes a leading region 163 adjacent to the first electrode 126 in the central recess 140, and a detection region 164 adjacent to the second electrode 138 in the central recess 140. The first electrodes 127, 128 are situated in the leading region 163 whereas no electrode is situated in the detection region 164. In this embodiment, the leading regions 161, 163 are exemplified as the first region. The detection regions 162, 164 are exemplified as the second region.

The detection regions 162, 164 are used for detecting or identifying a shape of the housing 110A of the SD memory card 100A of this embodiment and a shape of the housing 910 of the conventional SD memory card 900, as described later.

In this embodiment, the detection regions 162, 164 are formed by lengthening the leftmost and rightmost recesses 144, 146 described in the context of the first embodiment toward the trailing edge 112. Alternatively, a region for detecting a shape of the housing may be formed between the central recess and the trailing edge. For example, a region for detecting a shape of the SD memory card may be created by further lengthening the central recess toward the trailing edge.

The detection regions 162, 164 formed by further lengthening the leftmost and rightmost recesses 144, 146 described in the context of the first embodiment toward the trailing edge 112 allow a socket with a relatively simple structure to detect the housings 110A, 910. If a detection region is created by further lengthening the central recess toward the trailing edge, it is necessary to provide a mechanism for detecting a housing shape between the second contact pin array and the housing of the memory card. On the other hand, if the detection regions 162, 164 are adjacently formed to the left and right (the second direction D2) of the central recess 140 like this embodiment, a mechanism for detecting a shape of the housing may be installed in an open space on the left and right of the second contact pin array.

In this embodiment, the detection regions 162, 164 are formed nearby the leading edge 111. Alternatively, a detection region may be formed at the center of the housing. However, if the detection region is provided as a recess up to the center of the housing, a volume of the housing may excessively go down, so that a number of electronic components situated in the housing may decrease. Since the detection regions 162, 164 of this embodiment are formed nearby the leading edge 111, the volume of the housing 110A may not decrease excessively.

Optionally, a detection region may be formed beside the trailing edge of the housing. However, if the detection region is formed beside the trailing edge of the housing, a mechanism for detecting a shape of the housing is departed from the first and second contact pin arrays. Therefore, the socket may become enlarged. On the other hand, in this embodiment, since the detection regions 162, 164 are formed near the leading edge 111, a mechanism for detecting a shape of the housing may be formed near the first and second contact pin arrays 320, 330, which results in a compact socket.

(Third Embodiment)

Figure 7:
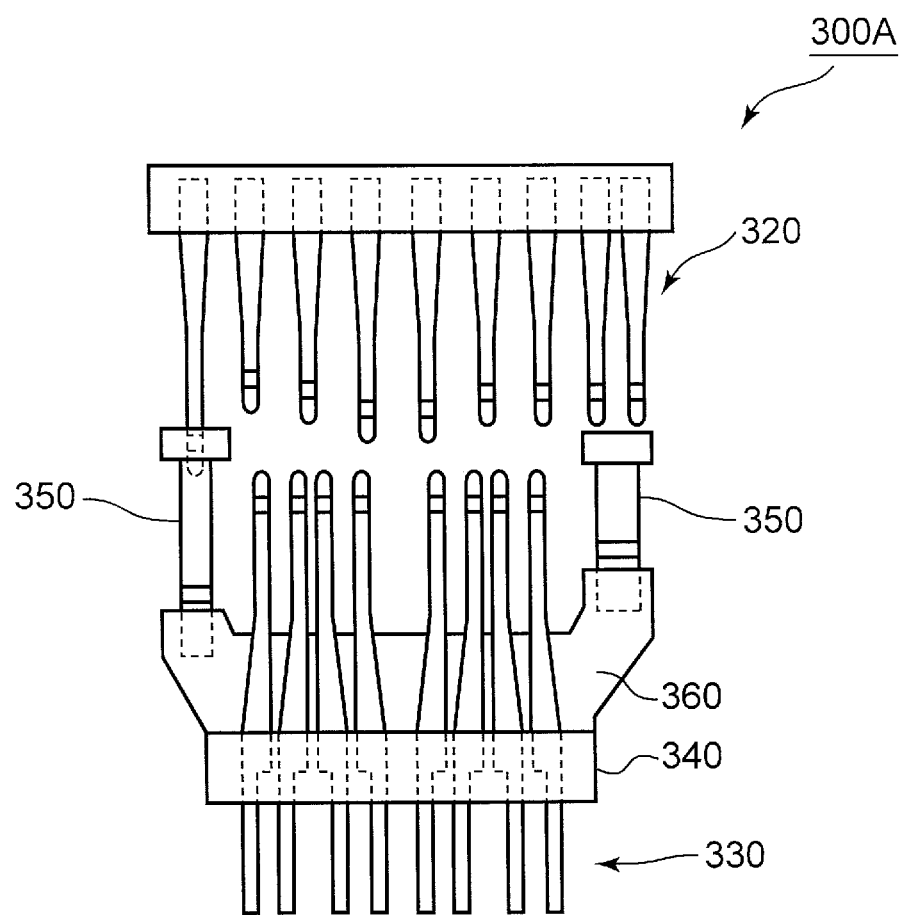
FIG. 7 is a schematic plan view of a socket according to the third embodiment.

FIG. 7 shows a socket configured to selectively receive and eject the SD memory card 100A described in the context of the second embodiment and the conventional SD memory card 900. The socket described in the context of the third embodiment uses the detection regions 162, 164 of the SD memory card 100A to identify a shape of the housings 110A, 910 of the SD memory cards 100A, 900. Consequently, the problem about the high contact pressure described in the context of the first embodiment may be appropriately overcome. In this embodiment, the housing 110A of the SD memory card 100A is exemplified as the first housing. The conventional SD memory card 900 is exemplified as another card device. The housing 910 of the SD memory card 900 is exemplified as the second housing. The socket is described with reference to FIGS. 6A, 7 and 27.

In addition to the first contact pin array 320, the second contact pin array 330 and the fixing member 340 like the socket 300 described in the context of the first embodiment, the socket 300A of the third embodiment includes a detection mechanism 350, which detects and identifies a shape of the housings 110A, 910 of the SD memory cards 100A, 900, and an adjustment plate 360, which adjusts an contact pressure applied to the second contact pin array 330 in response to the shape of the housings 110A, 910 detected by the detection mechanism 350. The adjustment plate 360 extends from the fixing member 340 toward the first contact pin array 320. In this embodiment, the detection mechanism 350 is exemplified as the detector. The adjustment plate 360 is exemplified as the adjuster.

Figure 8A:
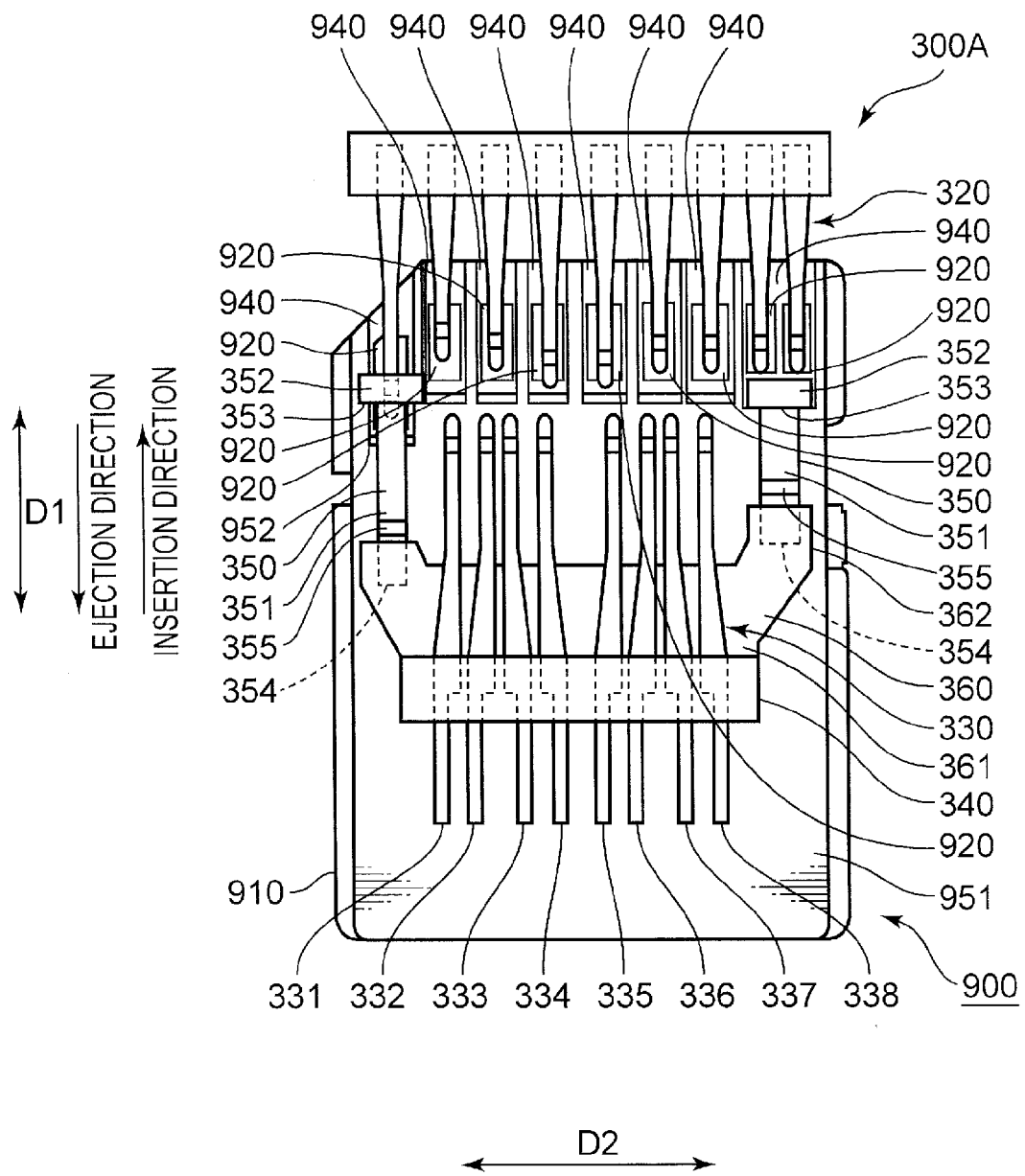
FIG. 8A is a schematic plan view of the conventional SD memory card inserted into the socket shown in FIG. 7.

FIG. 8A is a schematic plan view of the conventional SD memory card 900 inserted into the socket 300A. FIG. 8B is a schematic plan view of the SD memory card 100A inserted into the socket 300A. The socket 300A is further described with reference to FIGS. 8A and 8B.

As described above, the conventional SD memory card 900 includes the housing 910, and the single electrode array 920 situated on the upper surface of the housing 910. The leftmost and rightmost recesses 940 among the recesses 940 formed on the housing 910 are geometrically different from the leftmost and rightmost recesses 144A, 146A of the SD memory card 100A, respectively. The detection mechanism 350 detects the geometrical difference. In this embodiment, the upper surface of the housing 910, on which the single electrode array 920 is situated, is exemplified as the arrangement surface.

As shown in FIG. 8A, when the conventional SD memory card 900 is inserted into the socket 300A, the first contact pin array 320 comes into contact with the single electrode array 920 whereas the second contact pin array 330 is positioned on the main surface 951 of the housing 910. The adjustment plate 360 in conjunction with the detection mechanism 350 reduces a contact pressure between the second contact pin array 330 and the main surface 951.

As shown in FIG. 8B, when the SD memory card 100A described in the context of the second embodiment is inserted into the socket 300A, the first contact pin array 320 comes into contact with the first electrode array 120. The second contact pin array 330 comes into contact with the second electrode array 130.

Figure 9A:
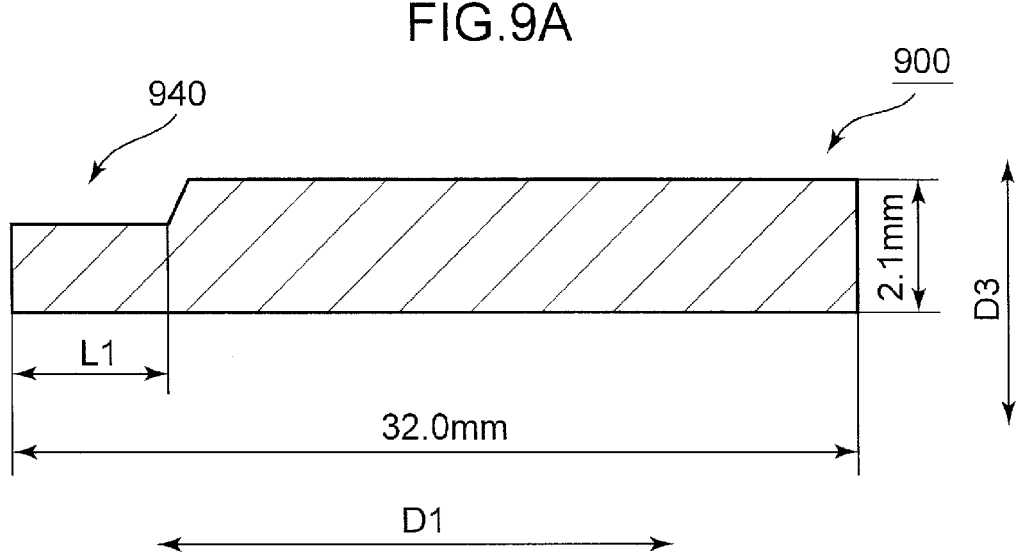
FIG. 9A is a schematic longitudinal cross section of the conventional SD memory card.
Figure 9B:
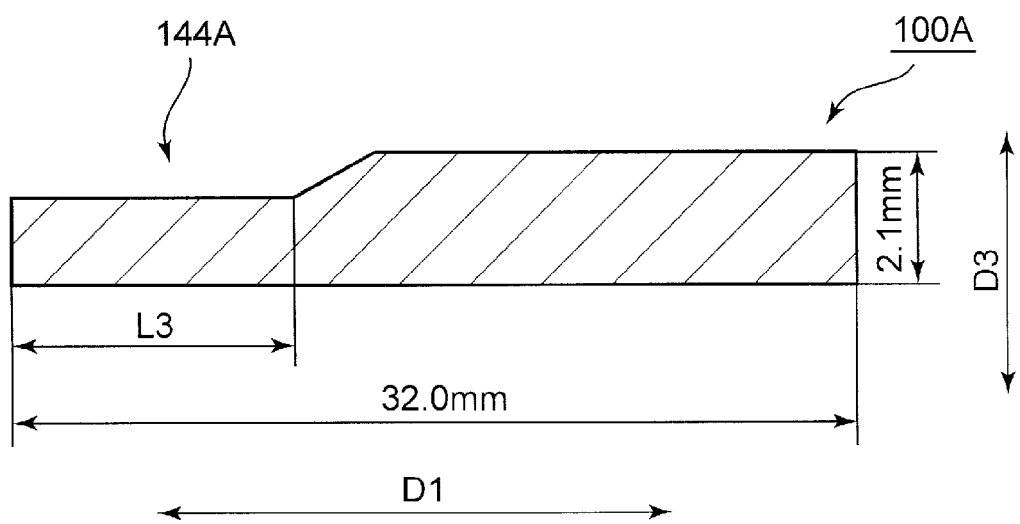
FIG. 9B is a schematic longitudinal cross section of the SD memory card shown in FIG. 6A.

FIG. 9A is a schematic longitudinal cross section of the SD memory card 900 at the leftmost recess 940. FIG. 9B is a schematic longitudinal cross section of the SD memory card 100A at the leftmost recess 144A. A geometrical difference between the leftmost recesses 940, 144A of the SD memory cards 900, 100A is described with reference to FIGS. 8A to 9B. It should be noted that the following description may be similarly applied to the rightmost recesses 940, 146A of the SD memory cards 900, 100A.

The conventional SD memory card 900 typically has a length dimension (the first direction D1) of around 32.0 mm and a thickness dimension (the third direction D3) of around 2.1 mm. Likewise, the SD memory card 100A of this embodiment has a length dimension (the first direction D1) of approximately 32.0 mm and a thickness dimension (the third direction D3) of around 2.1 mm.

As shown in FIG. 9A, the recess 940 of the conventional SD memory card 900 has a length dimension (the first direction D1) of "L1". As shown in FIG. 9B, the leftmost recess 144A of the SD memory card 100A of this embodiment has a length dimension of "L3" which is longer than "L1".

FIG. 10A schematically shows deformation of the detection mechanism 350, the adjustment plate 360 and the second contact pin array 330 while the conventional SD memory card 900 is inserted into the socket 300A. The deformation of the detection mechanism 350, the adjustment plate 360 and the second contact pin array 330 is described with reference to FIGS. 8A and 10A.

The detection mechanism 350 includes a plate spring 351 bent in a substantial V-shape, and a fixing mold 352 configured to fix the plate spring 351, for example, to a housing (not shown) of a host device (not shown). The plate spring 351 includes a proximal end 353 connected to the fixing mold 352, a distal end 354 opposite to the proximal end 353, and an apex 355, which is bent downward between the proximal and distal ends 353, 354.

Section (a) of FIG. 10A is a schematic cross section of the SD memory card 900 which reaches the apex 355. Section (b) of FIG. 10A is a schematic cross section of the SD memory card 900 which is inserted into the socket 300A more deeply. As shown in sections (a) and (b) of FIG. 10A, when the conventional SD memory card 900 is inserted into the socket 300A, the apex 355 slides on the upper surface of the leftmost and rightmost recesses 940. In this embodiment, the leftmost and rightmost recesses 940 of the SD memory card 900 are exemplified as the third concave region.

The adjustment plate 360 includes a proximal edge 361 connected to the fixing member 340, which extends in the second direction D2, and a leading edge 362 which traverses between the second contact pin array 330 and the distal end 354 of the plate spring 351. The distal end 354 of the plate spring 351 is situated below the adjustment plate 360 which extends from the fixing member 340 configured to fix the second contact pin array 330 between the second contact pin array 330 and the plate spring 351. The plate spring 351 extends in the ejection direction of the SD memory card 900 whereas the adjustment plate 360 extends in the insertion direction of the SD memory card 900. In this embodiment, the fixing member 340 is exemplified as the fixing element. The adjustment plate 360 is exemplified as the extension element.

Section (c) of FIG. 10A is a schematic cross section of the SD memory card 900 which is inserted into the socket 300A more deeply. As described above, the housing 910 of the conventional SD memory card 900 includes the main surface 951, which is raised from the recess 940, and the inclined surface 952, which is inclined between the recess 940 and the main surface 951. As shown in section (c) of FIG. 10A, when the SD memory card 900 is inserted into the socket 300A more deeply, the apex 355 of the plate spring 351 runs upon the main surface 951 via the inclined surface 952.

As shown in sections (a) and (b) of FIG. 10A, the adjustment plate 360 extends substantially horizontally while the apex 355 of the plate spring 351 contacts the recess 940. As shown in section (c) of FIG. 10A, when the apex 355 of the plate spring 351 runs upon the main surface 951, the distal end 354 of the plate spring 351 comes into contact with the adjustment plate 360, so that an upward force Fu works on the adjustment plate 360. Consequently, the proximal edge 361 of the adjustment plate 360 is elastically bent upward.

Each of the second pins 331 to 338 of the second contact pin array 330 extends from the fixing member 340 in the insertion direction of the SD memory card 900 on the adjustment plate 360. As shown in section (c) of FIG. 10A, the leading edge 362 of the adjustment plate 360 pressed upward by the plate spring 351 comes into contact with the second contact pin array 330. Consequently, the connection 344 of each of the second pins 331 to 338 is elastically bent upward. Consequently, while the contact of the apex 355 of the plate spring 351 moves from the corresponding recess 940 to the main surface 951, the adjustment plate 360 coming into contact with the plate spring 351 and the second contact pin array 330 is displaced in the third direction D3 away from the main surface 951 by the plate spring 351, which results in a decreased contact pressure between the second contact pin array 330 and the main surface 951.

In section (c) of FIG. 10A, the second contact pin array 330 under absence of the plate spring 351 and the adjustment plate 360 is depicted with a broken line. As described in the context of the first embodiment, since the second contact pin array 330 comes into contact with the main surface 951 under absence of the plate spring 351 and the adjustment plate 360, each of the second pins 331 to 338 applies the contact pressure CP2 to the main surface 951. As described above, since the plate spring 351 and the adjustment plate 360 make the second contact pin array 330 departed from the main surface 951, the aforementioned various problems caused by the contact pressure CP2 (e.g., less reliable electrical connection of the second and/or first contact pin arrays 330, 320, damage to the housing 910, a failure in connection caused by sheds arisen from scraping the surface of the housing 910) may be appropriately overcome.

In this embodiment, without contact between the second contact pin array 330 and the main surface 951, the apex 355 of the plate spring 351 comes into contact with the main surface 951. Accordingly, the plate spring 351 may apply a contact pressure CP3 to the main surface 951. Since the contact pressure CP3 working on the main surface 951 still remains, the surface of the apex 355 of the plate spring 351, which comes into contact with the main surface 951, is preferably coated with fluororesin or other lubricant materials to decrease a frictional force between the main surface 951 and the apex 355 of the plate spring 351. Consequently, even if the socket 300A is a push-push type socket, ejection performance of the SD memory card 900 is enhanced.

The plate spring 351 is formed from an arbitrary material capable of lifting up the adjustment plate 360. It may be preferable that the plate spring 351 is formed from an insulating material. Alternatively, the surface of the plate spring 351 may be coated with an insulating material.

FIG. 10B schematically shows deformation of the detection mechanism 350, the adjustment plate 360 and the second contact pin array 330 while the SD memory card 100A described in the context of the second embodiment is inserted into the socket 300A. Behavior of the detection mechanism 350, the adjustment plate 360 and the second contact pin array 330 is described with reference to FIGS. 8B, 10A and 10B.

The positions of the SD memory card 100A shown in each of sections (a), (b) and (c) of FIG. 10B correspond to the positions of the conventional SD memory card 900 shown in sections (a), (b) and (c) of FIG. 10A, respectively. It should be noted that the second contact pin array 330 comes in contact with the second electrode array 130 at the position of the SD memory card 100A shown in section (c) of FIG. 10B.

As shown in FIG. 10B, the apex 355 of the plate spring 351 extending from the fixing mold 352 in the ejection direction slides on the flat leftmost and rightmost recesses 144A, 146A from when the SD memory card 100A is inserted into the socket 300A to when the second contact pin array 330 comes into contact with the second electrode array 130. Since the detection mechanism 350 does not displace the adjustment plate 360 upward, the second contact pin array 330 comes into contact with the second electrode array 130 with the contact pressure CP1. Consequently, the adjustment plate 360 may adjust a position of the second contact pin array 330 in the third direction D3, which is substantially orthogonal to the upper surface of the housing 110A or the housing 910 in response to the shape of the housing 110A or 910 detected by the detection mechanism 350.

(Fourth Embodiment)

Figure 11:
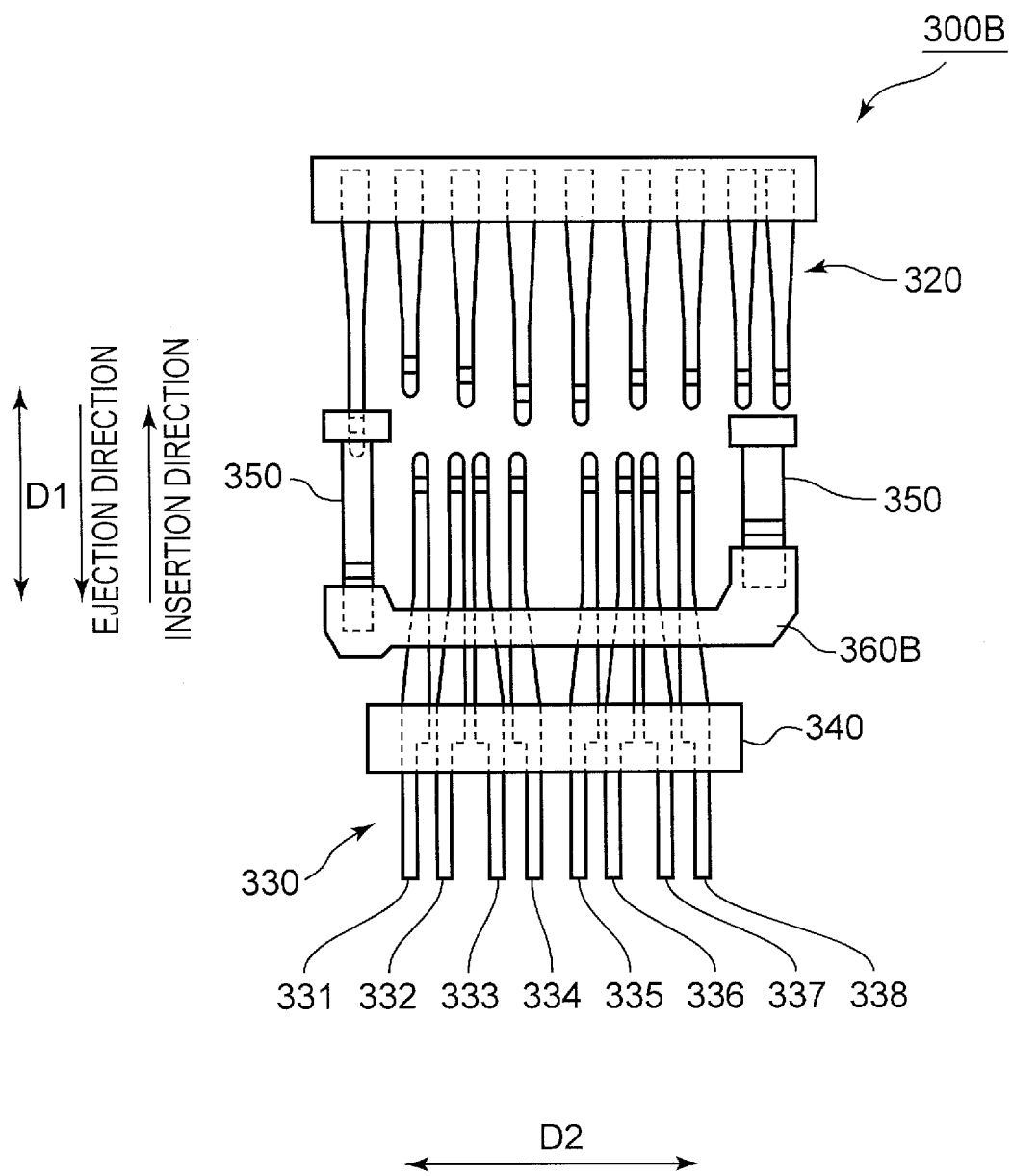
FIG. 11 is a schematic plan view of a socket according to the fourth embodiment.

FIG. 11 is a schematic plan view of the socket configured to selectively receive and eject the SD memory card 100A described in the context of the second embodiment and the conventional SD memory card 900. The socket of the fourth embodiment is described with reference to FIG. 11.

In addition to the first and second contact pin arrays 320, 330, the fixing member 340 and the detection mechanism 350 of the socket 300A according to the third embodiment, the socket 300B of the fourth embodiment includes a connecting plate 360B extending in the second direction D2 so as to connect the second pins 331 to 338 of the second contact pin array 330. The connecting plate 360B adjusts a contact pressure, which is applied to the second contact pin array 330, in conjunction with the detection mechanism 350 instead of the adjustment plate 360 described in the context of the third embodiment. Accordingly, the connecting plate 360B is exemplified as the adjuster in this embodiment.

Figure 12A:
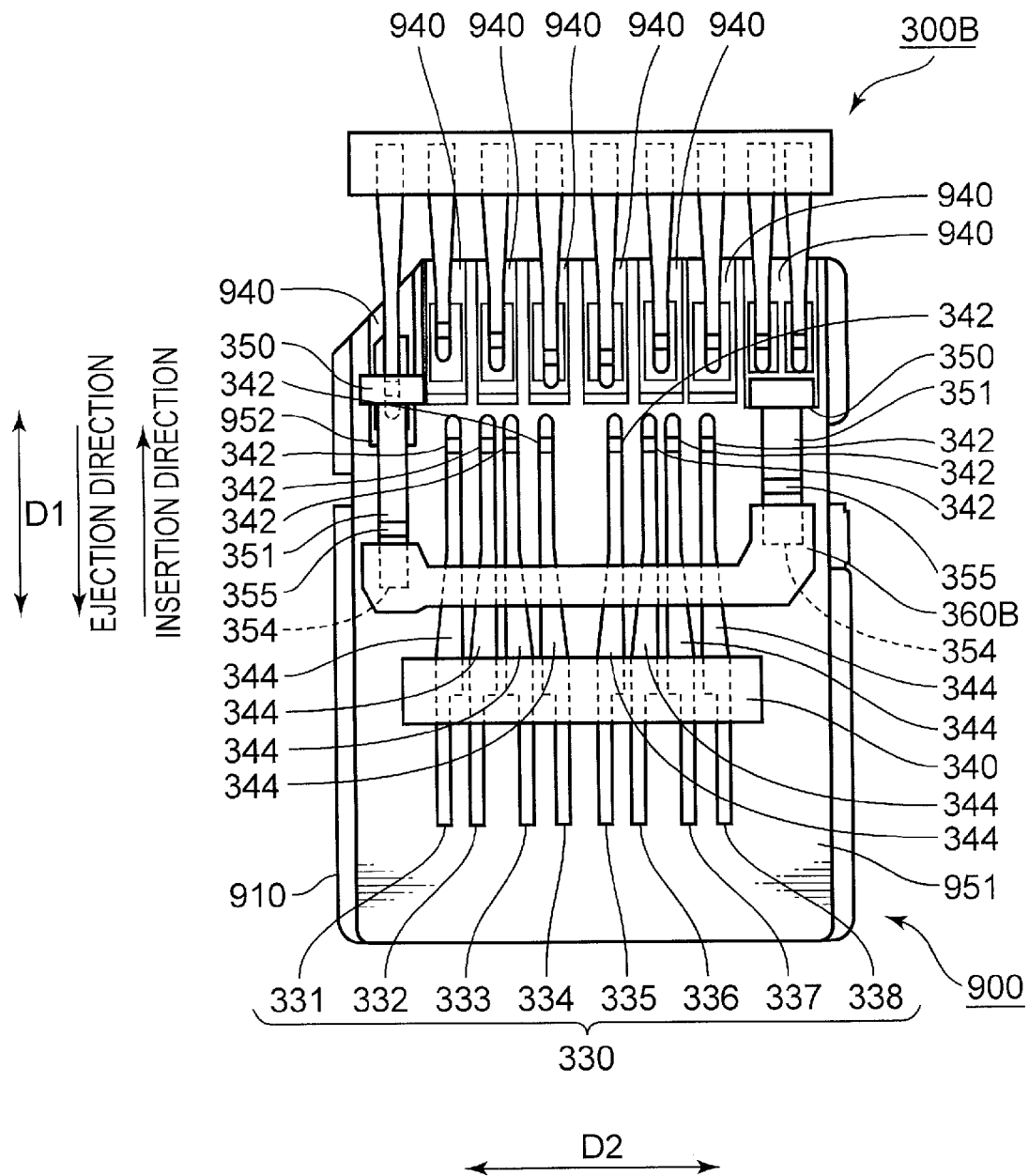
FIG. 12A is a schematic plan view of the conventional SD memory card inserted into the socket shown in FIG. 11.
Figure 12B:
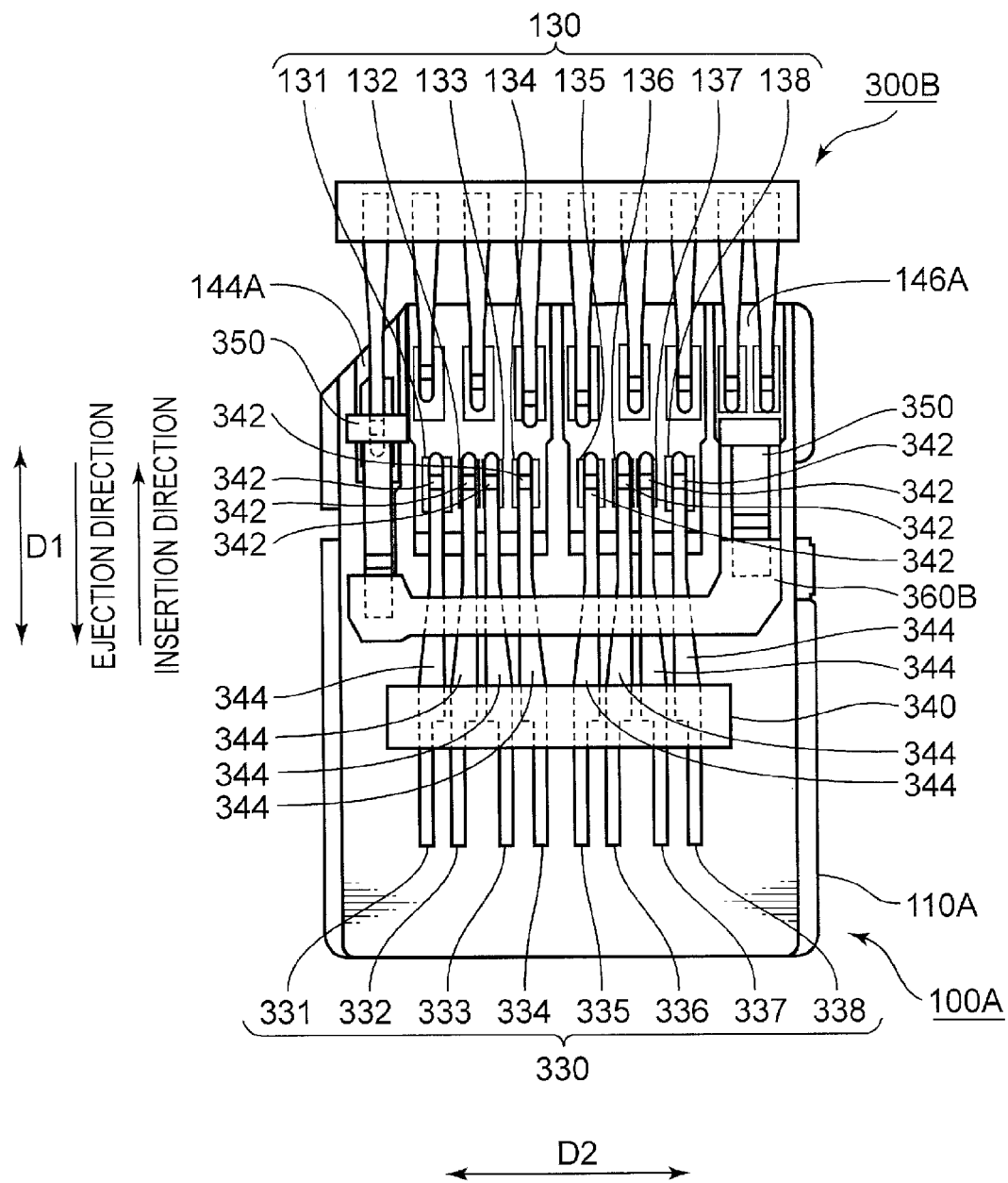
FIG. 12B is a schematic plan view of the SD memory card of the second embodiment inserted into the socket shown in FIG. 11.

FIG. 12A is a schematic plan view of the conventional SD memory card 900 inserted into the socket 300B. FIG. 12B is a schematic plan view of the SD memory card 100A inserted into the socket 300B. The socket 300B is further described with reference to FIGS. 12A and 12B.

Each of the connections 344 of the second pins 331 to 338 is fixed by the fixing member 340. As shown in FIG. 12A, when the conventional SD memory card 900 is inserted into the socket 300B, each of the elbow portions 342 of the second pins 331 to 338 distant from the connection 344 in the insertion direction is placed on the main surface 951 of the housing 910. As shown in FIG. 12B, when the SD memory card 100A of the second embodiment is inserted into the socket 300B, each of the elbow portions 342 of the second pins 331 to 338 comes into contact with the second electrodes 131 to 138 of the second electrode array 130. In this embodiment, the connection 344 is exemplified as the fixing portion. The elbow portion 342 is exemplified as the contact portion.

The connecting plate 360B is connected to the second pins 331 to 338 of the second contact pin array 330 between the connection 344 and the elbow portion 342. Accordingly, when the detection mechanism 350 applies a force upward to the connecting plate 360B, the second pins 331 to 338 of the second contact pin array 330 are integrally and elastically displaced upward. In this embodiment, the connecting plate 360B is exemplified as the connection element. One of the second pins 331 to 338 is exemplified as the first elastic pin. Adjacent one of the second pins 331 to 338 to the pins exemplified as the first elastic pin is exemplified as the second elastic pin.

FIG. 13A schematically shows deformation of the detection mechanism 350, the connecting plate 360B and the second contact pin array 330 while the conventional SD memory card 900 is inserted into the socket 300B. The deformation of the detection mechanism 350, the connecting plate 360B and the second contact pin array 330 is described with reference to FIGS. 12A and 13A.

Section (a) of FIG. 13A is a schematic cross section of the SD memory card 900 which reaches the apex 355 of the plate spring 351. Section (b) of FIG. 13A is a schematic cross section of the SD memory card 900 which is inserted into the socket 300B more deeply. As shown in sections (a) and (b) of FIG. 13A, when the conventional SD memory card 900 is inserted into the socket 300B, the apex 355 slides on the upper surface of the leftmost and rightmost recesses 940.

The connecting plate 360B is positioned above the distal end 354 of the plate spring 351. Accordingly, the upward deformation of the distal end 354 of the plate spring 351 is immediately transmitted to the connecting plate 360B.

Section (c) of FIG. 13A is a schematic cross section of the SD memory card 900 which is inserted into the socket 300B more deeply. As shown in section (c) of FIG. 13A, when the SD memory card 900 is inserted into the socket 300B more deeply, the apex 355 of the plate spring 351 runs upon the main surface 951 via the inclined surface 952.

As shown in section (c) of FIG. 13A, when the apex 355 of the plate spring 351 runs upon the main surface 951, the distal end 354 of the plate spring 351 comes into contact with the connecting plate 360B, so that an upward force Fu works on the connecting plate 360B. Unlike the fixing member 340, since the connecting plate 360B is not fixed to a housing (not shown) of a host device (not shown), the connecting plate 360B and the second pins 331 to 338 of the second contact pin array 330 are integrally and elastically displaced upward (i.e., in the third direction D3) while the contact of the apex 355 of the plate spring 351 moves from the corresponding recess 940 to the main surface 951. A portion of the second pins 331 to 338 between the connecting plate 360B and the fixing member 340 functions as a plate spring. Since the connecting plate 360B and the fixing member 340 bundle the second pins 331 to 338, the force working on the second pins 331 to 338 is likely to disperse. Accordingly, the portion of the second pins 331 to 338 between the connecting plate 360B and the fixing member 340 may be designed to be relatively thin. Consequently, the second pins 331 to 338 may be appropriately designed so as to obtain impedance matching for improving high frequency signal transmission characteristics. It should be noted that the elbow portion 342 forward from the connecting plate 360B functions like a standard contact pin.

In section (c) of FIG. 13A, the second contact pin array 330 under absence of the plate spring 351 and the connecting plate 360B is depicted with a broken line. As described in the context of the first embodiment, since the second contact pin array 330 comes into contact with the main surface 951 under absence of the plate spring 351 and the connecting plate 360B, each of the second pins 331 to 338 applies the contact pressure CP2 to the main surface 951. As described above, since the plate spring 351 and the connecting plate 360B make the second contact pin array 330 departed from the main surface 951, the aforementioned various problems caused by the contact pressure CP2 (e.g., less reliable electrical connection of the second and/or first contact pin array 330, 320, damage to the housing 910, a failure in connection due to sheds resulting from scraping the surface of the housing 910) may be appropriately overcome.

In this embodiment, without contact between the second contact pin array 330 and the main surface 951, the apex 355 of the plate spring 351 comes into contact with the main surface 951. Accordingly, the plate spring 351 may apply the contact pressure CP3 to the main surface 951. Since the contact pressure CP3 working on the main surface 951 still remains, it is preferable that the surface of the apex 355 of the plate spring 351 which comes into contact with the main surface 951 is coated with fluororesin or other lubricant materials to decrease a frictional force between the main surface 951 and the apex 355 of the plate spring 351. Consequently, even if the socket 300B is a push-push type socket, ejection performance of the SD memory card 900 is enhanced.

FIG. 13B schematically shows deformation of the detection mechanism 350, the connecting plate 360B and the second contact pin array 330 while the SD memory card 100A described in the context of the second embodiment is inserted into the socket 300B. Behavior of the detection mechanism 350, the connecting plate 360B and the second contact pin array 330 is described with reference to FIGS. 12B, 13A and 13B.

Positions of the SD memory card 100A shown in sections (a), (b) and (c) of FIG. 13B correspond to the positions of the conventional SD memory card 900 shown in sections (a), (b) and (c) of FIG. 13A, respectively. It should be noted that the second contact pin array 330 comes in contact with the second electrode array 130 at the position of the SD memory card 100A shown in section (c) of FIG. 13B.

As shown in FIG. 13B, the apex 355 of the plate spring 351 extending from the fixing mold 352 in the ejection direction slides on the flat leftmost and rightmost recesses 144A, 146A from when the SD memory card 100A is inserted into the socket 300B to when the second contact pin array 330 comes into contact with the second electrode array 130. Since the detection mechanism 350 does not displace the connecting plate 360B upward, the second contact pin array 330 comes into contact with the second electrode array 130 with the contact pressure CP1. Consequently, the connecting plate 360B may adjust a position of the second contact pin array 330 in the third direction D3 which is substantially orthogonal to the upper surface of the housing 110A or 910 in response to a shape of the housing 110A or 910 detected by the detection mechanism 350.

(Fifth Embodiment)

Figure 14:
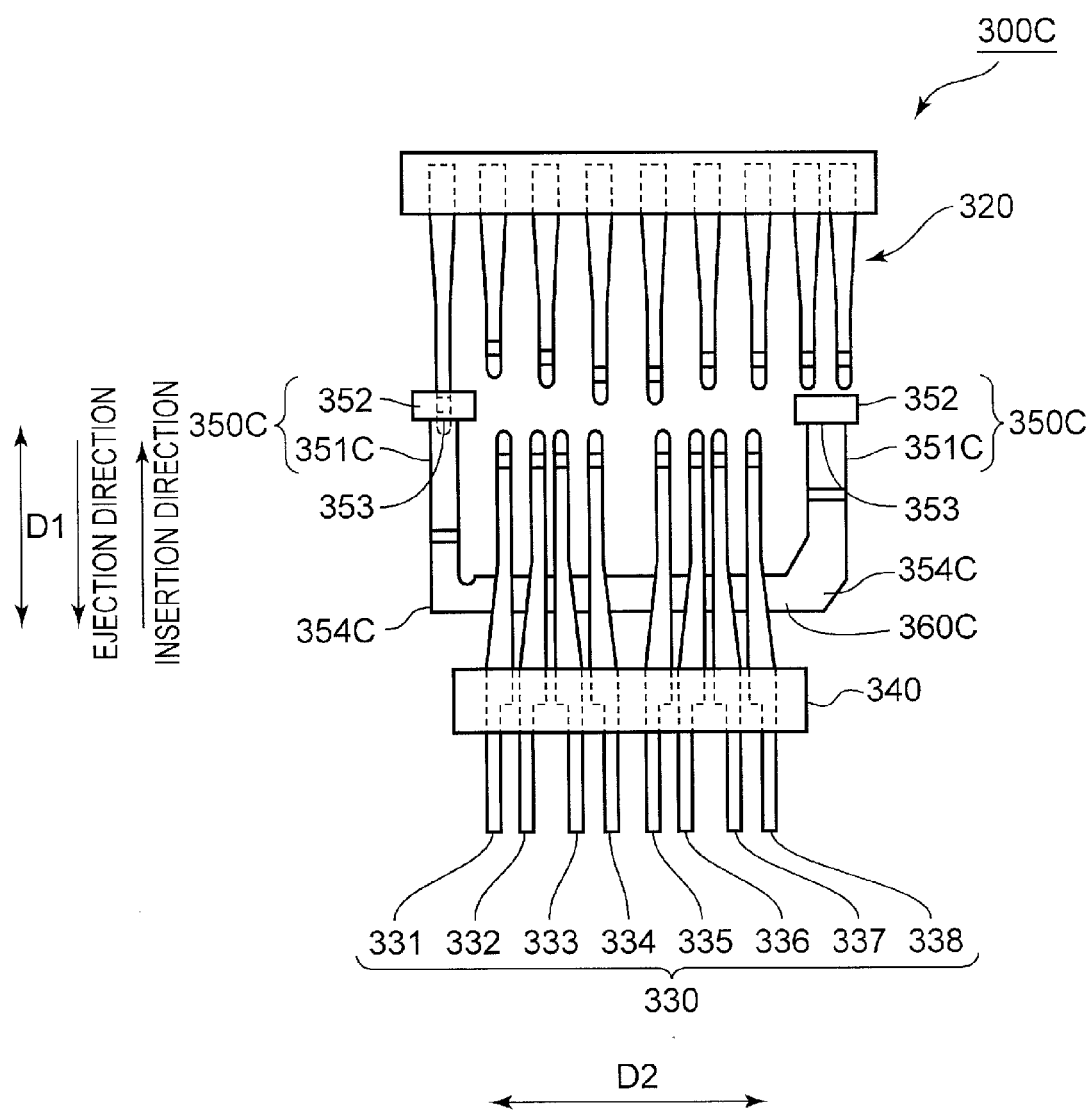
FIG. 14 is a schematic plan view of a socket according to the fifth embodiment.
Figure 15A:
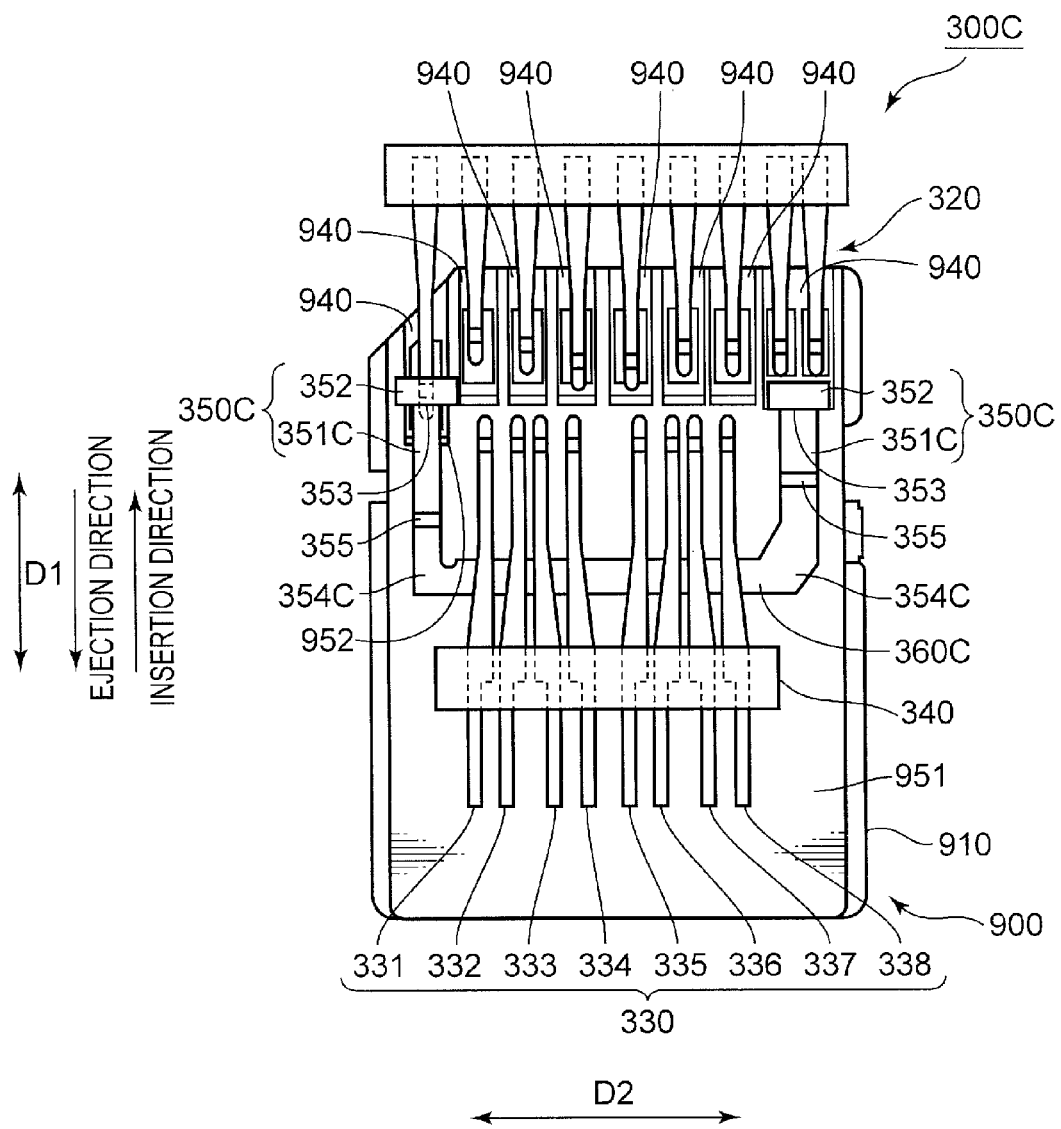
FIG. 15A is a schematic plan view of a conventional SD memory card inserted into the socket shown in FIG. 14.
Figure 15B:
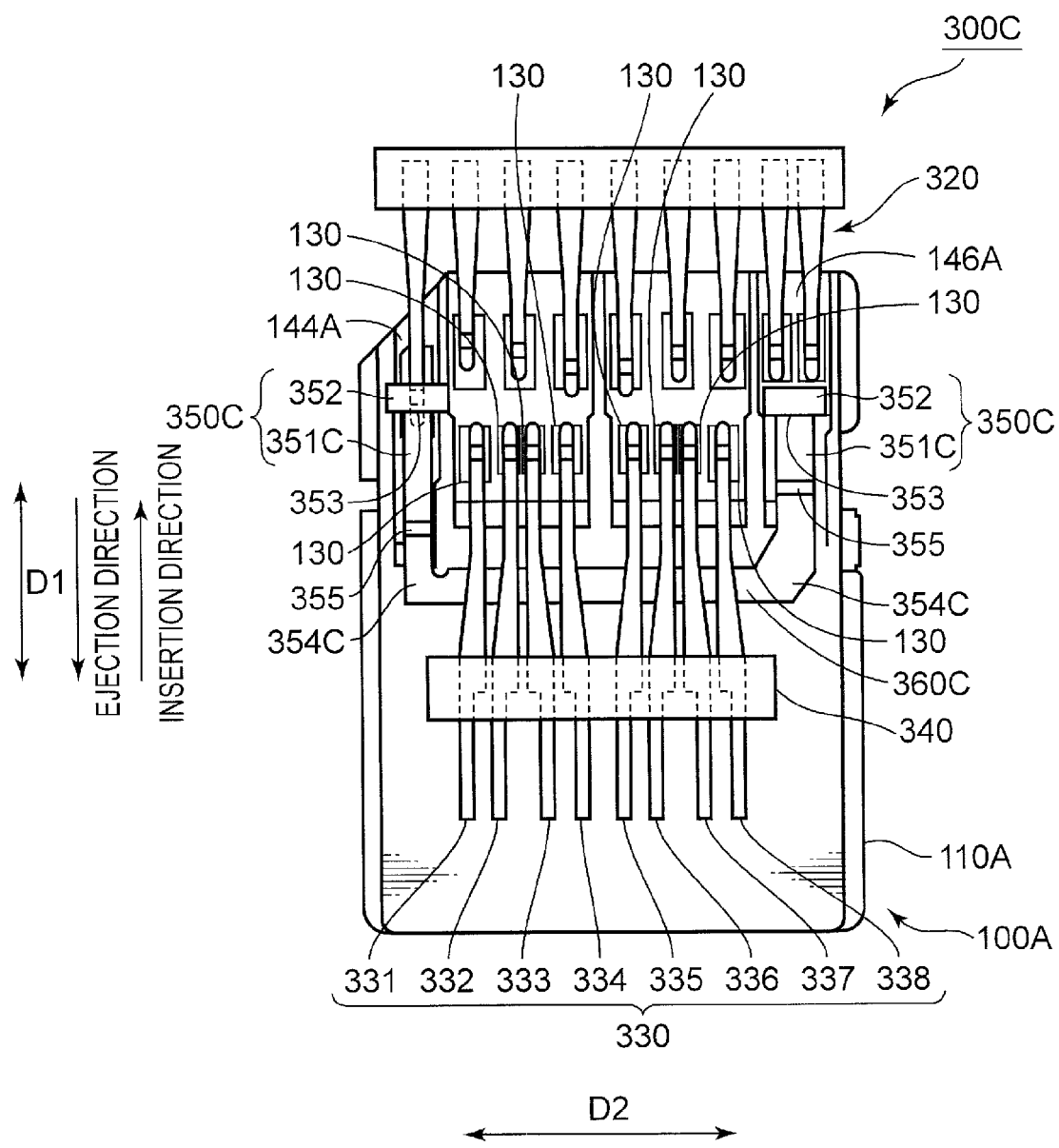
FIG. 15B is a schematic plan view of the SD memory card of the second embodiment inserted into the socket shown in FIG. 14.

FIG. 14 is a schematic plan view of the socket configured to selectively receive and eject the SD memory card 100A described in the context of the second embodiment and the conventional SD memory card 900. FIG. 15A is a schematic plan view of the conventional SD memory card 900 inserted into the socket of the fifth embodiment. FIG. 15B is a schematic plan view of the SD memory card 100A inserted into the socket of the fifth embodiment. The socket of the fifth embodiment is described with reference to FIGS. 14 to 15B.

In addition to the first and second contact pin arrays 320, 330 and the fixing member 340 like the socket 300A of the third embodiment, the socket 300C of the fifth embodiment includes a detection mechanism 350C and an arm member 360C which is integrally formed with the detection mechanism 350C. The arm member 360C adjusts a contact pressure, which is applied to the second contact pin array 330, in conjunction with the detection mechanism 350C, instead of the adjustment plate 360 described in the context of the third embodiment. Accordingly, the arm member 360C is exemplified as the adjuster in this embodiment.

As described above, the second contact pin array 330 includes the second pins 331 to 338, which are elastically deformable. Each of the second pins 331 to 338 extends in the first direction D1 (the insertion direction of the SD memory cards 100A, 900). The second pins 331 to 338 are aligned in the second direction D2. In this embodiment, the second pins 331 to 338 are exemplified as the elastic pins.

The detection mechanism 350C includes a plate spring 351C, which extends in the first direction D1 (the ejection direction of the SD memory cards 100A, 900), and the fixing mold 352, which fixes the plate spring 351C to a housing (not shown) of a host device (not shown). The plate spring 351C includes the proximal end 353, which is connected to the fixing mold 352, and a distal end 354C opposite to the proximal end 353.

The arm member 360C includes both ends which are integrally formed with the distal end 354C of the plate spring 351C to the left of the leftmost second pin 331 and the distal end 354C of the plate spring 351C to the right of the rightmost second pin 338. Consequently, the arm member 360C extends in the second direction D2 below the second contact pin array 330. As a result of the plate spring 351C and the arm member 360C, which are formed integrally, a number of components of the socket 300C may be reduced. In this embodiment, the arm member 360C is exemplified as the arm element.

FIG. 16A schematically shows deformation of the detection mechanism 350C, the arm member 360C and the second contact pin array 330 while the conventional SD memory card 900 is inserted into the socket 300C. The deformation of the detection mechanism 350C, the arm member 360C and the second contact pin array 330 is described with reference to FIGS. 15A and 16A.

Section (a) of FIG. 16A is a schematic cross section of the SD memory card 900 which reaches the apex 355 of the plate spring 351C. Section (b) of FIG. 16A is a schematic cross section of the SD memory card 900 which is inserted into the socket 300C more deeply. As shown in sections (a) and (b) of FIG. 16A, when the conventional SD memory card 900 is inserted into the socket 300C, the apex 355 slides on the upper surface of the leftmost and rightmost recesses 940.

The arm member 360C is integrally connected to the distal end 354C of the plate spring 351C as described above. Accordingly, upward deformation of the distal end 354 of the plate spring 351C is immediately transmitted to the arm member 360C.

Section (c) of FIG. 16A is a schematic cross section of the SD memory card 900 which is inserted into the socket 300C more deeply. As shown in section (c) of FIG. 16A, when the SD memory card 900 is inserted into the socket 300C more deeply, the apex 355 of the plate spring 351C runs upon the main surface 951 via the inclined surface 952.

As shown in section (c) of FIG. 16A, when the apex 355 of the plate spring 351C runs upon the main surface 951, the arm member 360C connected to the front end 354C of the plate spring 351C comes into contact with the second contact pin array 330, so that an upward force Fu works on the second contact pin array 330. Consequently, while the contact of the apex 355 of the plate spring 351C moves from the corresponding recess 940 to the main surface 951, the arm member 360C is displaced in the third direction D3. The arm member 360C displaced in the third direction D3 elastically deforms the second pins 331 to 338 of the second contact pin array 330.

In section (c) of FIG. 16A, the second contact pin array 330 under absence of the plate spring 351C and the arm member 360C is depicted with a broken line. As described in the context of the first embodiment, since the second contact pin array 330 comes into contact with the main surface 951 under absence of the plate spring 351C and the arm member 360C, each of the second pins 331 to 338 applies the contact pressure CP2 to the main surface 951. As described above, since the plate spring 351C and the arm member 360C separate the second contact pin array 330 from the main surface 951, the aforementioned various problems caused by the contact pressure CP2 (e.g., less reliable electrical connection of the second and/or first contact pin arrays 330, 320, damage to the housing 910, a failure in connection arisen from resultant sheds from scraping the surface of the housing 910) may be appropriately overcome.

In this embodiment, without contact between the second contact pin array 330 and the main surface 951, the apex 355 of the plate spring 351C comes into contact with the main surface 951. Accordingly, the plate spring 351C may apply the contact pressure CP3 to the main surface 951. Since the contact pressure CP3 working on the main surface 951 still remains, it is preferable that the surface of the apex 355 of the plate spring 351C which comes into contact with the main surface 951 is coated with fluororesin or other lubricant materials to decrease a frictional force between the main surface 951 and the apex 355 of the plate spring 351C. Consequently, even if the socket 300C is a push-push type socket, ejection performance of the SD memory card 900 may be enhanced.

FIG. 16B schematically shows deformation of the detection mechanism 350C, the arm member 360C and the second contact pin array 330 while the SD memory card 100A described in the context of the second embodiment is inserted into the socket 300C. Behavior of the detection mechanism 350C, the arm member 360C and the second contact pin array 330 is described with reference to FIGS. 15B, 16A and 16B.

Positions of the SD memory card 100A shown in sections (a), (b) and (c) of FIG. 16B corresponds to positions of the conventional SD memory card 900 shown in sections (a), (b) and (c) of FIG. 16A, respectively. It should be noted that the second contact pin array 330 comes in contact with the second electrode array 130 at the position of the SD memory card 100A shown in section (c) of FIG. 16B.

As shown in FIG. 16B, the apex 355 of the plate spring 351C extending from the fixing mold 352 in the ejection direction slides on the flat leftmost and rightmost recesses 144A, 146A from when the SD memory card 100A is inserted into the socket 300C to when the second contact pin array 330 comes into contact with the second electrode array 130. Since the detection mechanism 350C does not displace the arm member 360C upward, the second contact pin array 330 comes into contact with the second electrode array 130 with the contact pressure CP1. Consequently, the arm member 360C may adjust a position of the second contact pin array 330 in the third direction D3 which is substantially orthogonal to the upper surface of the housing 110A or 910 in response to a shape of the housing 110A or 910 detected by the detection mechanism 350C.

Sixth Embodiment

Figure 17B:
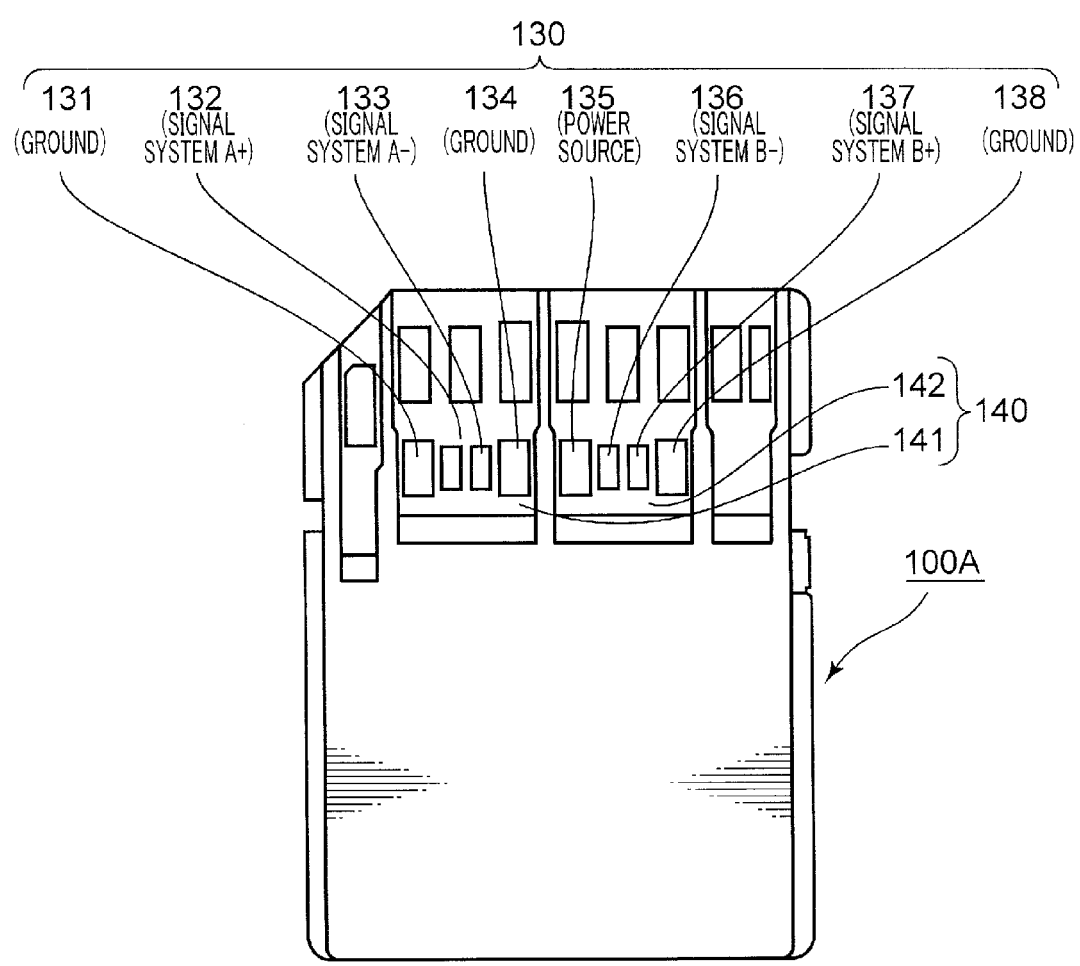
FIG. 17B is a schematic plan view showing pin assignment of the SD memory card shown in FIG. 6A.

FIG. 17A is a schematic plan view of the SD memory card 100 described in the context of the first embodiment. FIG. 17B is a schematic plan view of the SD memory card 100A described in the context of the second embodiment. Pin assignments of the SD memory cards 100, 100A are described with reference to FIGS. 17A, 17B and 27A.

As described above, each of the SD memory cards 100, 100A includes the second electrode array 130. The second electrodes 131, 134, 138 of the second electrode array 130 are used for grounding. The second electrode 135 is connected to the power source for supplying electrical power to the SD memory cards 100, 100A. The second electrodes 132, 133, 136, 137 are used for transmitting and receiving data signals.

The data signals are transmitted and received between the SD memory cards 100, 100A and a host device (not shown) through two signal systems (signal systems A, B). As described above, since the data signals are transmitted and received by a low-voltage differential input circuit, positive/negative inverted pattern electrodes are prepared. In this embodiment, the second electrodes 132, 133 situated in the left recess 141 of the central recess 140 correspond to the signal system A. The second electrode 132 is "positive" electrode. The second electrode 133 is "negative" electrode. The second electrodes 136, 137 situated in the right recess 142 of the central recess 140 correspond to the signal system B. The second electrode 136 is "negative" electrode. The second electrode 137 is "positive" electrode. Therefore, high-frequency signal transmission is achieved. Since "positive" and "negative" electrodes may be easily wired side by side, noise such as external electromagnetic waves may be the same in phase and level. Accordingly, such noise may be easily removed by a differential input circuit.

FIG. 18 is a schematic plan view of the SD memory cards 100A linked together. The connected SD memory cards 100A are described with reference to FIGS. 17B and 18.

In FIG. 18, a symbol of "100A(1)" is affixed to the SD memory card at a upstream position of the data transmission. A symbol of "100A(3)" is affixed to the SD memory card at a downstream position of the data transmission. A symbol of "100A(2)" is affixed to the SD memory card between the SD memory cards 100A(1), 100A(3).

For example, the signal system A may be exclusively used for input whereas the signal system B may be exclusively used for output. As shown in FIG. 18, the second electrodes 136, 137 of the signal system B of the upstream SD memory card 100A(1) may be connected to the second electrodes 133, 132 of the signal system A of the intermediate SD memory card 100A(2) while the second electrodes 136, 137 of the signal system B of the intermediate SD memory card 100A(2) may be connected to the second electrodes 133, 132 of the signal system A of the downstream SD memory card 100A(3). As a result of the aforementioned connection, the data signals are sequentially transmitted from the upstream SD memory card 100A(1) to the downstream SD memory card 100A(3).

Currently, the connection of insertable/removable memory cards is uncommon. In many cases, a built-in type module is used for data transmission. An insertable/removable memory card is used for a part of the data transmission. If an insertable/removable memory card is used for data transmission, the data transmission has to be achieved even if a conventional memory card (e.g., the aforementioned SD memory card 900) is used. If insertable/removable memory cards linked together are used for data transmission, connection and control of terminals of each memory card are required. This may impair inherent advantages.

However, several built-in type modules may be linked together. A few insertable/removable memory cards linked together may be incorporated into built-in type modules linked together to simply connect the modules. A conventional memory card with a single electrode array (e.g., the aforementioned SD memory card 900) and a memory card including an additional electrode array (e.g., the aforementioned SD memory cards 100, 100A) may be used in parallel. Data transmission according to performance of the conventional memory card or the memory card including an additional electrode array may be achieved.

In the data transmission system consisting of a group of SD memory cards 100A(1) to (3) shown in FIG. 18, for example, if the conventional SD memory card 900 is used instead of the SD memory card 100A(2), the data transmission system may become electrically disconnected so that functions of the overall data transmission system may be lost without some kind of switching operation in the data transmission circuit.

This embodiment shows a socket for overcoming the aforementioned problems.

Figure 19:
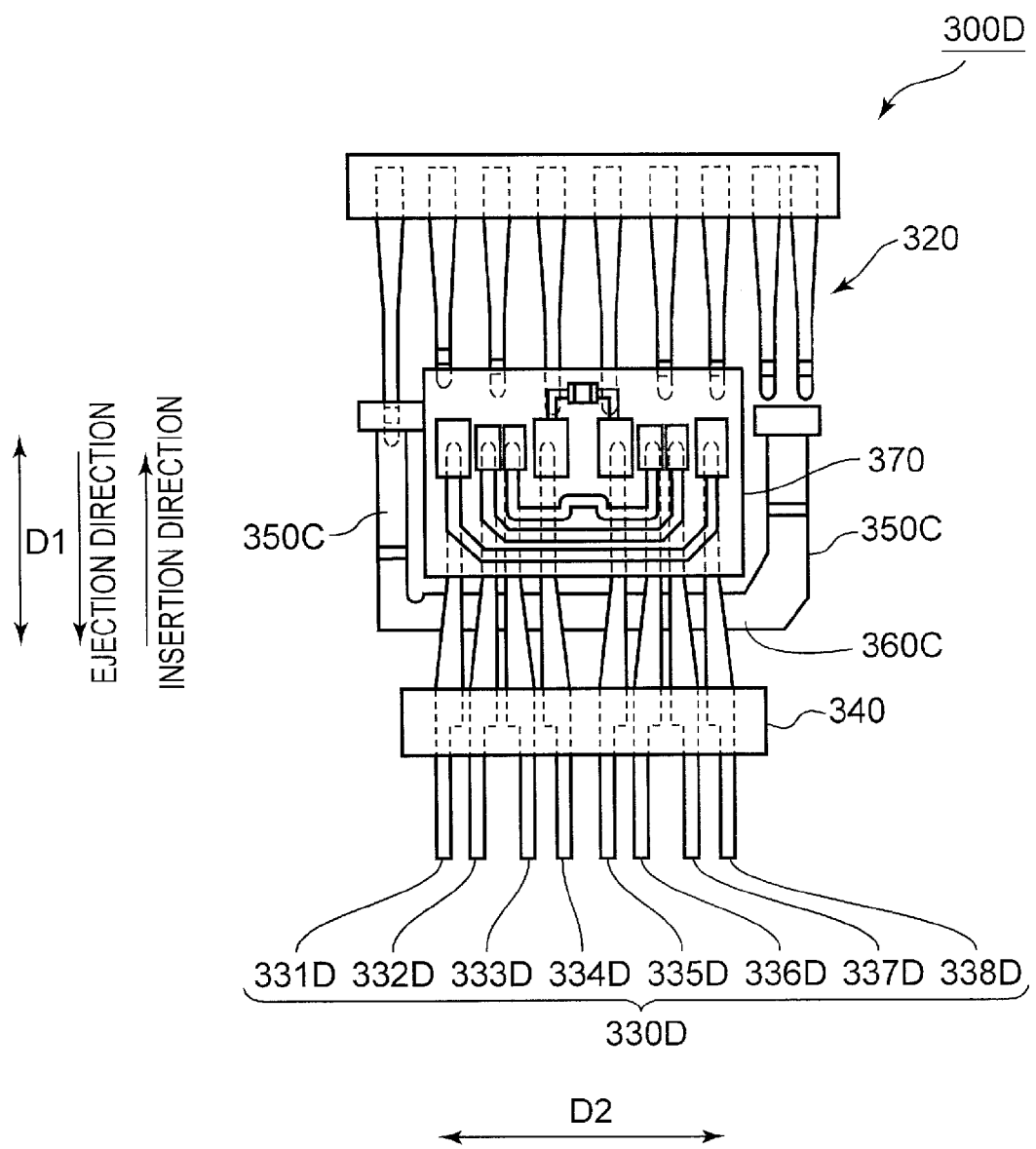
FIG. 19 is a schematic plan view of a socket according to the sixth embodiment.

FIG. 19 is a schematic plan view of the socket of the sixth embodiment. The socket is described with reference to FIG. 19.

The socket 300D of the sixth embodiment includes a second contact pin array 330D, and a short circuit 370 situated above the second contact pin array 330D, in addition to the first contact pin array 320, the fixing member 340, the detection mechanism 350C and the arm member 360C like the socket 300C of the fifth embodiment. The second contact pin array 330D includes second pins 331D to 338D extending in the first direction D1 (the insertion direction). The second pins 331D to 338D are aligned in the second direction D2.

Figure 20:
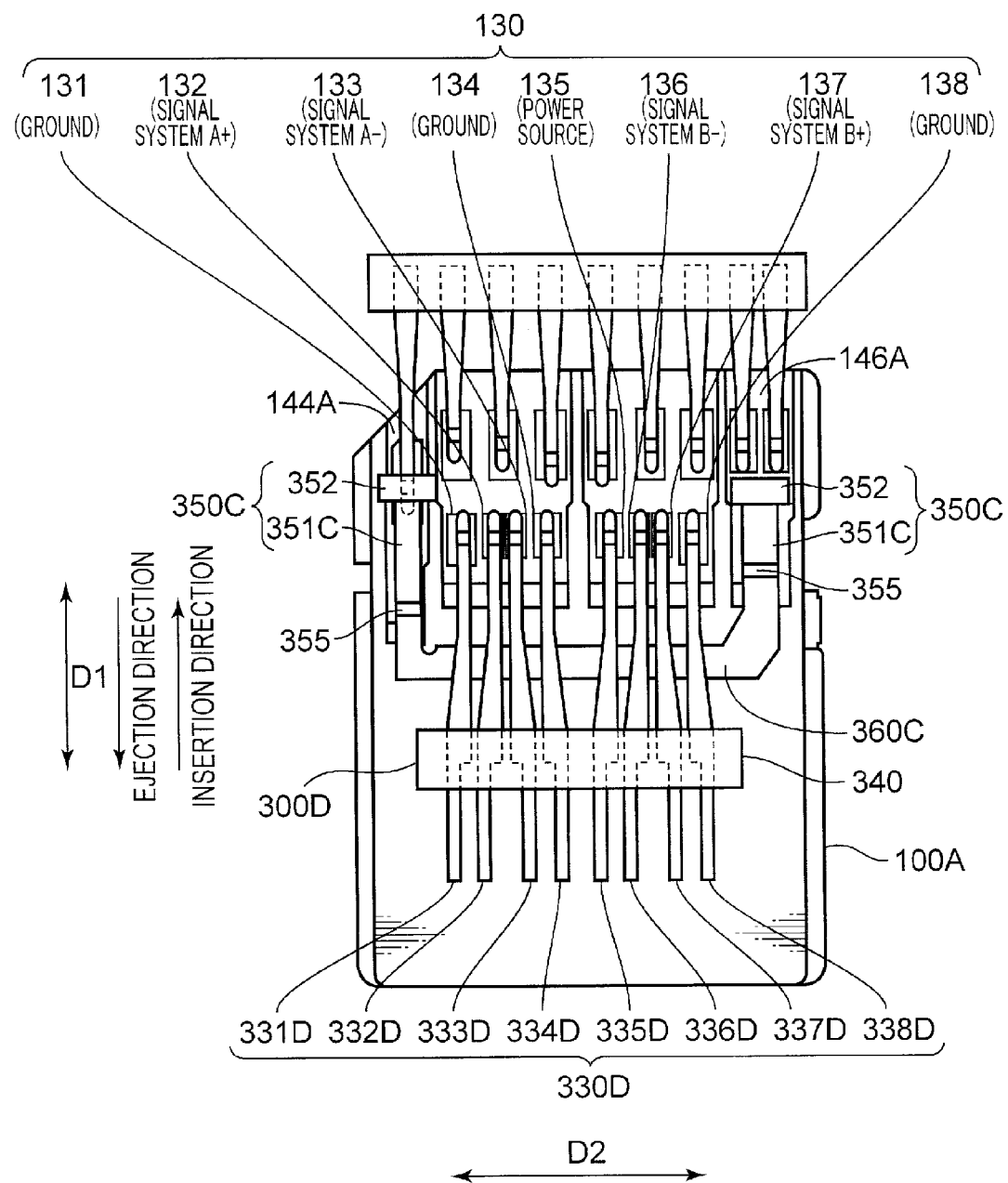
FIG. 20 is a schematic plan view of the SD memory card of the second embodiment inserted into the socket shown in FIG. 19.

FIG. 20 is a schematic plan view of the SD memory card 100A inserted into the socket 300D. It should be noted that FIG. 20 does not show the short circuit 370. The socket 300D is further described with reference to FIGS. 18 and 20.

The leftmost second pin 331D comes into contact with the second electrode 131 which is used for grounding. The second pin 332D to the right of the second pin 331D comes into contact with the second electrode 132 which is used as the positive electrode of the signal system A. The second pin 333D to the right of the second pin 332D comes into contact with the second electrode 133 which is used as the negative electrode of the signal system A. The second pin 334D to the right of the second pin 333D comes into contact with the second electrode 134 which is used for grounding. The second pin 335D to the right of the second pin 334D comes into contact with the second electrode 135 which is used for the power source. The second pin 336D to the right of the second pin 335D comes into contact with the second electrode 136 which is used as the negative electrode of the signal system B. The second pin 337D to the right of the second pin 336D comes into contact with the second electrode 137 which is used as the positive electrode of the signal system B. The second pin 338D to the right of the second pin 337D comes into contact with the second electrode 138 which is used for grounding.

As described with reference to FIG. 18, the signal system A is used for input whereas the signal system B is used for output. Accordingly, in this embodiment, the second pins 332D, 333D are exemplified as the input pin pair for inputting data signals. The second pins 336D, 337D are exemplified as the output pin pair for outputting data signals.

In this embodiment, the second electrode 135 of the second electrode array 130 is used as the power source electrode whereas the second electrode 134 is used as the ground electrode which is used for grounding. Accordingly, the second pin 335D connected to the second electrode 135 is exemplified as the power source pin. The second pin 334D connected to the second electrode 134 is exemplified as the ground pin.

Figure 21:
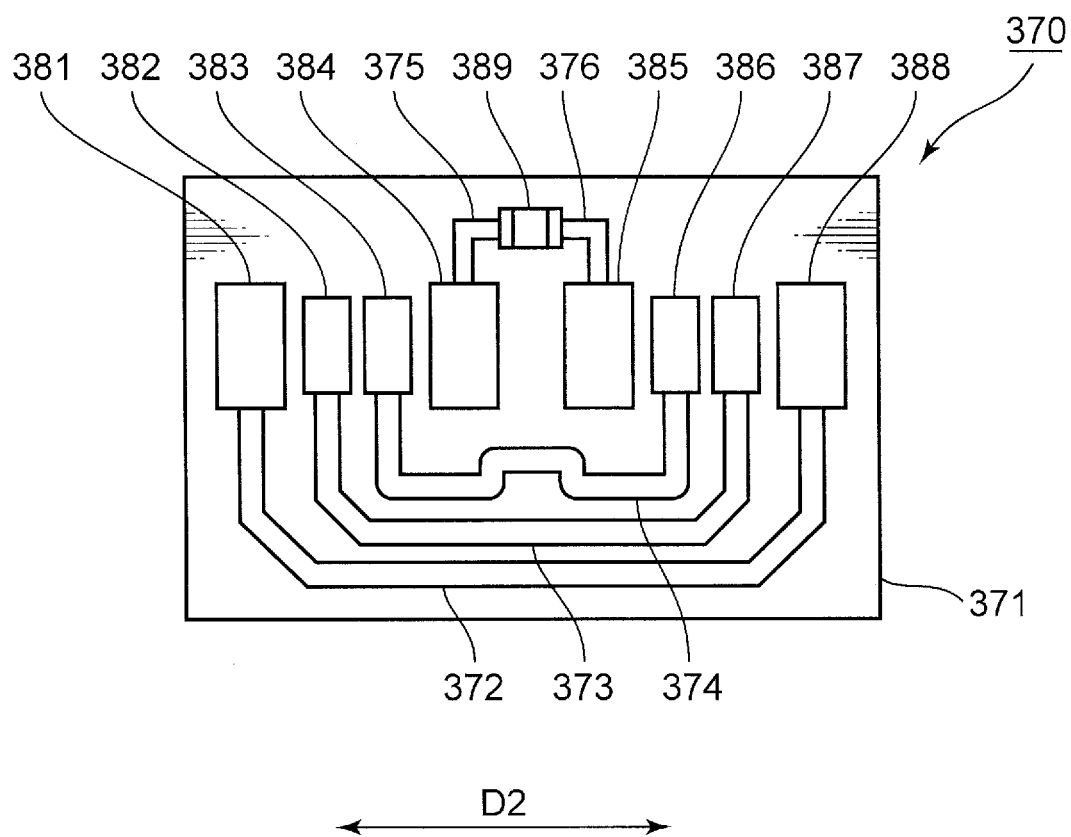
FIG. 21 is a schematic plan view of a short circuit of the socket shown in FIG. 19.

FIG. 21 is a schematic plan view of the short circuit 370. The short circuit 370 is described with reference to FIG. 21.

The short circuit 370 includes a substrate 371, and terminals 381 to 388 situated on the substrate 371. The terminals 381 to 388 are aligned in the second direction D2.

The short circuit 370 further includes a wire connection 372, which electrically connects the leftmost terminal 381 to the rightmost terminal 388, a wire connection 373, which electrically connects the terminal 382 to the right of the terminal 381 with the terminal 387 to the left of the terminal 388, and a wire connection 374, which electrically connects the terminal 383 to the right of the terminal 382 with the terminal 386 to the left of the terminal 387. The short circuit 370 further includes a capacitor 389, a wire connection 375, which electrically connects the capacitor 389 with the terminal 384 to the right of the terminal 383, and a wire connection 376, which electrically connects the capacitor 389 with the terminal 385 to the left of the terminal 386. In this embodiment, the capacitor 389 is exemplified as the capacitor element.

Figure 22:
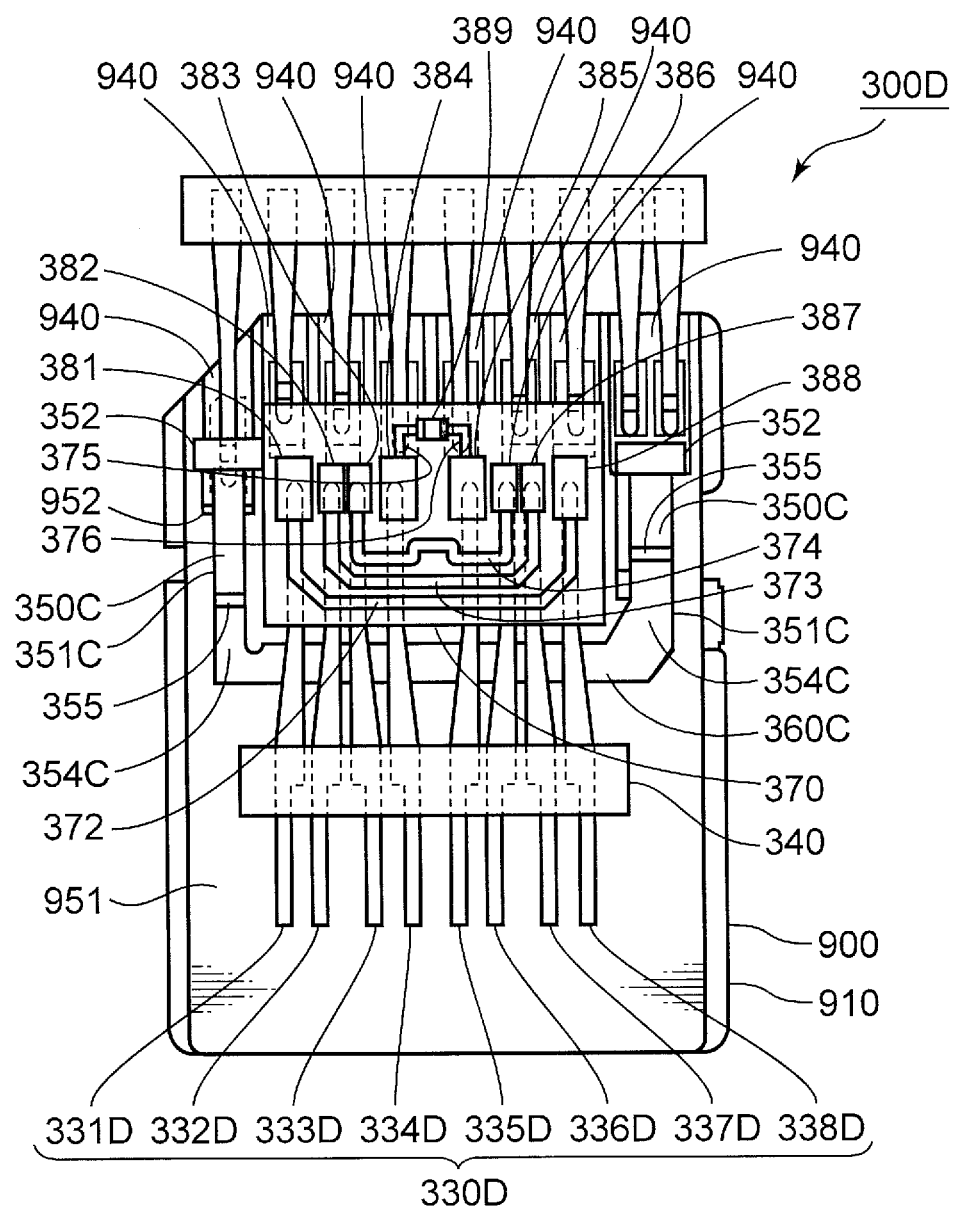
FIG. 22 is a schematic plan view of the conventional SD memory card inserted into the socket shown in FIG. 19.

FIG. 22 is a schematic plan view of the conventional SD memory card 900 inserted into the socket 300D. The socket 300D is described with reference to FIGS. 20 to 22.

When the SD memory card 900 is inserted into the socket 300D, the detection mechanism 350C and the arm member 360C separates the second contact pin array 330D from the main surface 951 of the housing 910 according to the principles described in the context of the fifth embodiment. The distal ends of the second pins 331D to 338D come into contact with the terminals 381 to 388, respectively. Consequently, short-circuit may occur between the terminals 381, 388, between the terminals 382, 387, between the terminals 383, 386, and between the terminals 384, 387.

In this embodiment, the terminals 382, 387 and the wire connection 373, which connects the terminal 382 to the terminal 387, are exemplified as the first short-circuit portion since they cause short-circuit between the second pin 332D used for inputting the data signals and the second pin 337D used for outputting the data signals. Likewise, the terminals 383, 386 and the wire connection 374, which connects the terminal 383 to the terminal 386, are exemplified as the first short-circuit portion since they cause short-circuit between the second pin 333D used for inputting the data signals and the second pin 336D used for outputting the data signals.

Since the voltage is different between the terminals 384, 385, it may be difficult to cause simple short-circuit between the terminals 384, 385. However, in this embodiment, the terminal 384 is electrically connected to the terminal 385 via the capacitor 389. Accordingly, high-frequency components are connected between the terminals 384, 385 at low impedance. In this embodiment, the terminal 385 corresponding to the second pin 335D is exemplified as the first contact portion. The terminal 384 corresponding to the second pin 334D is exemplified as the second contact portion. The terminals 384, 385, the capacitor 389 and the wire connections 375, 376 connecting the terminals 384, 385 with the capacitor 389 are exemplified as the second short-circuit portion.

FIG. 23A schematically shows deformation of the detection mechanism 350C, the arm member 360C and the second contact pin array 330D while the conventional SD memory card 900 is inserted into the socket 300D. The deformation of the detection mechanism 350C, the arm member 360C and the second contact pin array 330 is described with reference to FIGS. 22 and 23A.

Section (a) of FIG. 23A is a schematic cross section of the SD memory card 900 which reaches the apex 355 of the plate spring 351C. When the conventional SD memory card 900 is inserted into the socket 300D, the apex 355 slides on the upper surface of the leftmost and rightmost recesses 940.

The arm member 360C is integrally connected to the distal end 354C of the plate spring 351C as described above. Accordingly, upward deformation of the distal end 354 of the plate spring 351C is immediately transmitted to the arm member 360C.

Section (b) of FIG. 23A is a schematic cross section of the SD memory card 900 which is inserted into the socket 300D more deeply. As shown in section (b) of FIG. 23A, when the SD memory card 900 is inserted into the socket 300D more deeply, the apex 355 of the plate spring 351C runs upon the main surface 951 via the inclined surface 952.

As shown in section (b) of FIG. 23A, when the apex 355 of the plate spring 351C runs upon the main surface 951, the arm member 360C connected to the distal end 354C of the plate spring 351C comes into contact with the second contact pin array 330D, so that an upward force Fu works on the second contact pin array 330D. Consequently, while the contact of the apex 355 of the plate spring 351C moves from the corresponding recess 940 to the main surface 951, the arm member 360C is displaced in the third direction D3. The arm member 360C displaced in the third direction D3 elastically deforms the second pins 331D to 338D of the second contact pin array 330D.

Each of the second pins 331D to 338D of the second contact pin array 330D includes the horizontal portion 341 which extends substantially horizontally (the first direction D1: the insertion direction) from the fixing member 340, the elbow portion 342 which bends downward in a substantial V-shape from the horizontal portion 341, and a curved portion 345 which curves upward from a tip of the elbow portion 342. As shown in section (b) of FIG. 23A, when the second contact pin array 330D is displaced upward, the curved portion 345 of the second pin 331D comes into contact with the terminal 381 of the short circuit 370. The curved portion 345 of the second pin 332D comes into contact with the terminal 382 of the short circuit 370. The curved portion 345 of the second pin 333D comes into contact with the terminal 383 of the short circuit 370. The curved portion 345 of the second pin 334D comes into contact with the terminal 384 of the short circuit 370. The curved portion 345 of the second pin 335D comes into contact with the terminal 385 of the short circuit 370. The curved portion 345 of the second pin 336D comes into contact with the terminal 386 of the short circuit 370. The curved portion 345 of the second pin 337D comes into contact with the terminal 387 of the short circuit 370. The curved portion 345 of the second pin 338D comes into contact with the terminal 388 of the short circuit 370. Consequently, short-circuiting may be caused between the terminals 381, the terminal 388, between the terminals 382, 387, between the terminals 383, 386 and between the terminals 384, 387. In section (b) of FIG. 23A, a contact pressure between the curved portions 345 and the terminals 381 to 388 is shown with a symbol of "CP4".

In section (b) of FIG. 23A, the second contact pin array 330D under absence of the plate spring 351C and the arm member 360C is depicted with a broken line. As described in the context of the first embodiment, since the second contact pin array 330D comes into contact with the main surface 951 under absence of the plate spring 351C and the arm member 360C, each of the second pins 331D to 338D applies the contact pressure CP2 to the main surface 951. As described above, since the plate spring 351C and the arm member 360C separate the second contact pin array 330D from the main surface 951, the aforementioned various problems because of the contact pressure CP2 (e.g., less reliable electrical connection of the second and/or first contact pin arrays 330D, 320, damage to the housing 910, a failure in connection caused by resultant shed from scraping the surface of the housing 910) may be appropriately overcome.

In this embodiment, without contact between the second contact pin array 330D and the main surface 951, the apex 355 of the plate spring 351C comes into contact with the main surface 951. Accordingly, the plate spring 351C may apply the contact pressure CP3 to the main surface 951. Since the contact pressure CP3 working on the main surface 951 still remains, it may be preferable that the surface of the apex 355 of the plate spring 351C which comes into contact with the main surface 951 is coated with fluororesin or other lubricant materials to reduce a frictional force between the main surface 951 and the apex 355 of the plate spring 351C. Consequently, even if the socket 300D is a push-push type socket, ejection performance of the SD memory card 900 is enhanced.

FIG. 23B schematically shows deformation of the detection mechanism 350C, the arm member 360C and the second contact pin array 330D while the SD memory card 100A described in the context of the second embodiment is inserted into the socket 300D. Behavior of the detection mechanism 350C, the arm member 360C and the second contact pin array 330D is described with reference to FIGS. 20, 23A and 23B.

Positions of the SD memory card 100A shown in sections (a) and (b) of FIG. 23B correspond to positions of the conventional SD memory card 900 shown in sections (a) and (b) of FIG. 23A, respectively. It should be noted that the second contact pin array 330D comes in contact with the second electrode array 130 at the position of the SD memory card 100A shown in section (b) of FIG. 23B.

As shown in FIG. 23B, the apex 355 of the plate spring 351C extending from the fixing mold 352 in the ejection direction slides on the flat leftmost and rightmost recesses 144A, 146A from when the SD memory card 100A is inserted into the socket 300D to when the second contact pin array 330D comes into contact with the second electrode array 130. Since the detection mechanism 350C does not displace the arm member 360C upward, the second contact pin array 330D comes into contact with the second electrode array 130 with the contact pressure CP1. Consequently, the arm member 360C may adjust a position of the second contact pin array 330D in the third direction D3 which is substantially orthogonal to the upper surface of the housing 110A or 910 in response to a shape of the housing 110A or 910 detected by the detection mechanism 350C. Thus, while the SD memory card 100A is inserted into the socket 300D, the second contact pin array 330D may maintain electrical connection with the SD memory card 100A without coming into contact with the short circuit 370.

(Seventh Embodiment)

According to the principles of the sixth embodiment, when the SD memory card 100A is inserted into the socket 300D, the second contact pin array 330D is electrically disconnected from the short circuit 370. Accordingly, it is preferable that the insertion of the SD memory card 100A is detected on the basis of existence of the electrical connection between the second contact pin array 330D and the short circuit 370.

In the context of the seventh embodiment, a method for detecting the insertion of the SD memory card 100A on the basis of existence of the electrical connection between the second contact pin array 330D and the short circuit 370 is described.

Figure 24:
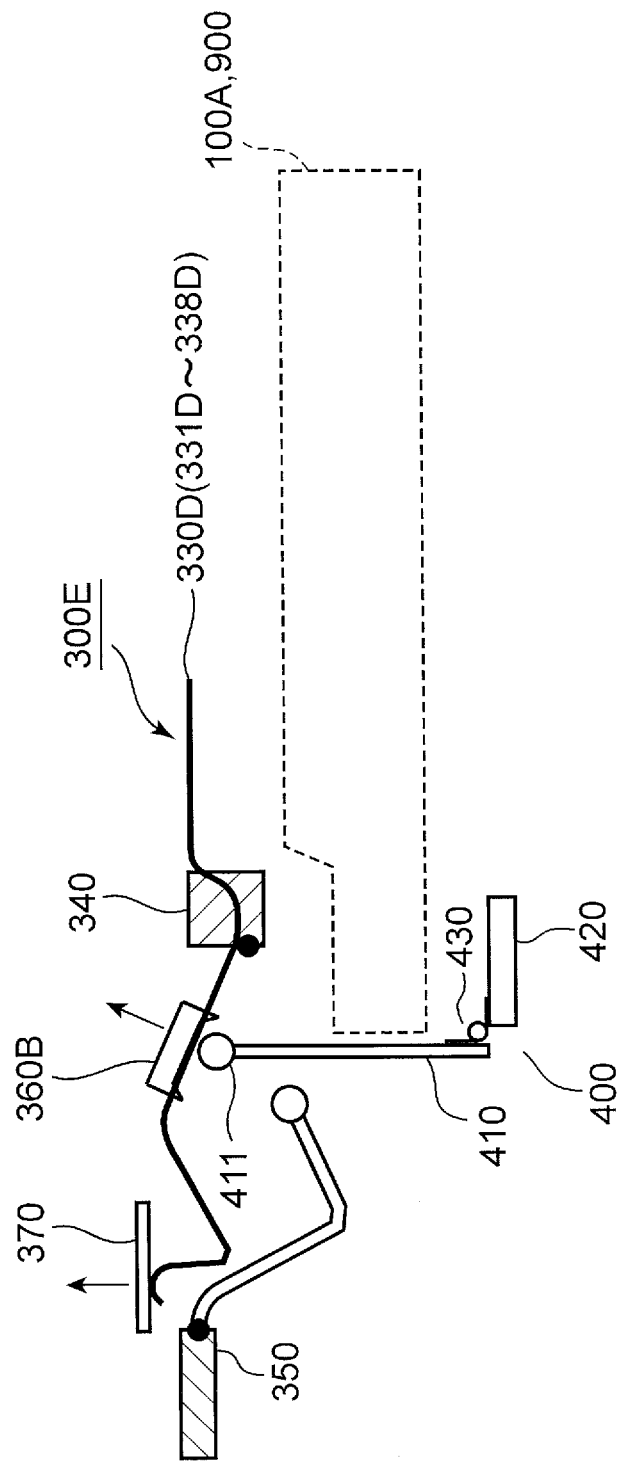
FIG. 24 is a schematic side view showing a socket according to the seventh embodiment.
Figure 25:
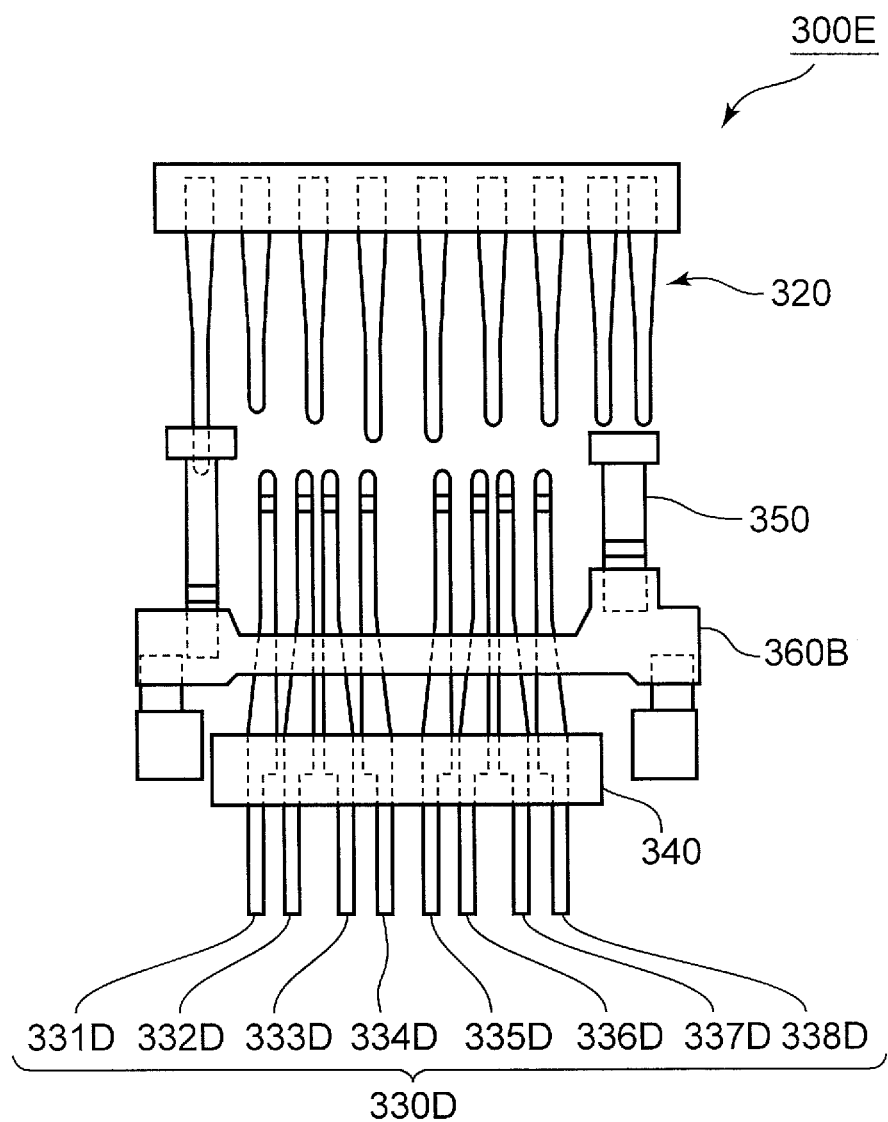
FIG. 25 is a schematic plan view of the socket shown in FIG. 24.

FIG. 24 is a schematic side view showing the socket of the seventh embodiment. FIG. 25 is a schematic plan view of the socket shown in FIG. 24. The socket of the seventh embodiment is described with reference to FIGS. 24 and 25.

The socket 300E of the seventh embodiment includes the first contact pin array 320, the fixing member 340, the second contact pin array 330D and the short circuit 370 like the socket 300D described in the context of the sixth embodiment. The socket 300E further includes the connecting plate 360B and the detection mechanism 350, which are described in the context of the fourth embodiment. The connecting plate 360B couples the second pins 331D to 338D of the second contact pin array 330D.

The socket 300E further includes a contact mechanism 400 which causes the second contact pin array 330D to come into contact with the short circuit 370 unless the SD memory cards 100A, 900 are inserted. The contact mechanism 400 includes a contact arm 410, which elastically deforms the second contact pin array 330D so that the second contact pin array 330D comes into contact with the short circuit 370, a holding plate 420, which holds the contact arm 410, and a hinge 430, which connects the contact arm 410 to the holding plate 420. For example, the hinge 430 may be a torsion coil spring.

The distal end 411 of the contact arm 410 shown in FIGS. 24 and 25 comes into contact with the connecting plate 360B, and pushes the second contact pin array 330D upward. Consequently, the second contact pin array 330D is elastically deformed and comes into contact with the short circuit 370. In the following description, the position of the contact arm 410 shown in FIGS. 24 and 25 (the upright position of the contact arm 410 with respect to the holding plate 420) is referred to as "first position". The hinge 430 biases the contact arm 410 toward the first position. Accordingly, the hinge 430 retains the contact arm 410 in the first position unless the SD memory cards 100A, 900 are inserted. In this embodiment, the hinge 430 is exemplified as the bias element.

FIG. 26 is a schematic side view of the socket 300E. The rotation of the contact arm 410 in response to insertion of the SD memory cards 100A, 900 is described with reference to FIGS. 23A, 23B and 26.

As shown in FIG. 26, the contact arm 410 stands up so as to traverse an insertion path of the SD memory cards 100A, 900. Accordingly, when the SD memory cards 100A, 900 are inserted into the socket 300E, the leading edges 111, 911 of the housings 110A, 910 of the SD memory cards 100A, 900 come into contact with the contact arm 410. Consequently, the distal end 411 of the contact arm 410 is turned against a biasing force of the hinge 430, and is separated from the connecting plate 360B (i.e., from the second contact pin array 330D) (c.f., section (b) of FIG. 26). In this embodiment, the position of the contact arm 411 shown in section (b) of FIG. 26 is exemplified as the second position.

As described in the context of the sixth embodiment, when the SD memory card 900 is inserted, the second contact pin array 330D is once again pushed upward in response to the shape of the housing 910 of the SD memory card 900, and comes into contact with the short circuit 370. When the SD memory card 100A is inserted, the second contact pin array 330D maintains the separated posture from the short circuit 370. Accordingly, when the short circuit 370 and the second contact pin array 330D are electrically disconnected, it is determined that the SD memory card 100A is not inserted into the socket 300E. When the short circuit 370 and the second contact pin array 330D are electrically connected, it is determined that the socket 300E is empty (i.e., neither of the SD memory cards 100A, 900 are inserted), or that the SD memory card 900 is inserted into the socket 300E. Accordingly, a host device with the socket 300E may determine that existence of the SD memory card 100E in the socket 300E on the basis of the existence of the electrical connection between the short circuit 370 and the second contact pin array 330D. In addition, the host device, which determines that the SD memory card 100E exists in the socket 300E, may perform switching operation to a signal processing circuit suitable for the SD memory card 100E and/or suitable signal processes for the SD memory card 100E.

According to a series of the aforementioned embodiments, it may be possible to appropriately overcome problems such as less reliable connection of contact pins, and a failure in connection caused by resultant sheds from damages or scratches on a surface of the card device. Accordingly, a socket to which the principles of a series of the aforementioned embodiments are applied may achieve smooth insertion and ejection of the card device even if the socket is, for example, a push-push type socket.

The principles of a series of the aforementioned embodiments may be applied to a socket which inputs and outputs data between several card devices or modules. For example, in a system which is electrically connected so that data from a specific card device are input to a downstream card device, the principles of the embodiments may provide functions of automatically switching electrical connection patterns in response to a card shape inserted into the socket.

In a series of the aforementioned embodiments, the SD memory card is exemplified as the card device. The socket corresponding to the SD memory card is described. Alternatively, the card device may be an SDIO card. The principles of a series of the aforementioned embodiments may be applied to a socket which is used together with an SDIO card.

The card device may be another device than an SD or SDIO memory card. The principles of a series of the aforementioned embodiments may be applied to, for instance, an arbitrary card device, which includes an integrated circuit, and a housing, which houses the integrated circuit. According to the principles of a series of the aforementioned embodiments, if a card device includes electrodes situated on a bottom surface in a concave region formed on the housing, a geometrical difference between housings may be identified on the basis of a length of the concave region. It may be preferable that additional electrodes are situated in an extended concave region to allow appropriate or high-speed data transmission.

The aforementioned embodiments mainly include the following features. Since the card device with the following features is unrestricted in an electrode alignment in the first direction, high frequency signal transmission may be suitably achieved. The socket with the following features may be suitably used with geometrically different card devices. Since the housing shape is appropriately detected, a contact pressure between the contact pin and the housing is appropriately set. Accordingly, friction between the housing and the contact pin is less likely to wear the housing and cause shreds. Therefore, it becomes less likely that there are problems such as bad connection to fail in communication between a host device and the card device. The structure configured to control the contact pressure between the contact pin and the housing according to the following features is relatively simplified, which results in inexpensive host devices.

The card device configured to be inserted into and ejected from a host device in a first direction according to one aspect of the aforementioned embodiments has a first housing including a leading edge, which is inserted into the host device on ahead, and a trailing edge opposite to the leading edge; a first electrode array including first electrodes aligned in a second direction along the leading edge; and a second electrode array including second electrodes aligned in the second direction between the first electrode array and the trailing edge. The second electrodes include an electrode shifted from the first electrodes in the second direction.

According to the aforementioned configuration, the card device is inserted into and ejected from a host device in the first direction. The first housing of the card device includes a leading edge, which is inserted into the host device on ahead, and a trailing edge opposite to the leading edge. The first electrode array of the card device includes first electrodes aligned in a second direction along the leading edge. The second electrode array of the card device includes second electrodes aligned in the second direction between the first electrode array and the trailing edge. Since the second electrodes include an electrode shifted from the first electrodes in the second direction, an arrangement of the second electrodes is determined so that high frequency signals are transmitted appropriately.

In the aforementioned configuration, the first housing may include a first concave region extending from the leading edge toward the trailing edge. The first and second electrode arrays may be situated in the first concave region. A number of the second electrodes situated in the first concave region may be different from a number of the first electrodes situated in the first concave region.

According to the aforementioned configuration, the first housing includes a first concave region extending from the leading edge toward the trailing edge. The first and second electrode arrays are situated in the first concave region. Since a number of second electrodes, which are situated in the first concave region, is different from a number of first electrodes situated in the first concave region, the number of second electrodes may be determined so that high frequency signals are transmitted appropriately.

In the aforementioned configuration, the first housing may include a second concave region adjacent to the first concave region. The second concave region may extend from the leading edge toward the trailing edge. The second concave region may include a first region, which is adjacent to the first electrodes in the first concave region, and a second region, which is adjacent to the second electrodes in the first concave region. The first electrodes may be situated in the first region. The second electrodes may not be situated in the second region.

According to the aforementioned configuration, the first housing may include a second concave region, which is adjacent to the first concave region and extends from the leading edge toward the trailing edge. The second concave region may include a first region, which is adjacent to the first electrodes in the first concave region, and a second region, which is adjacent to the second electrodes in the first concave region. Since the second electrodes may not be situated in the second region, the second region may be used to identify a shape of the first housing.

The socket for selectively receiving and ejecting the aforementioned card device and another card device including a second housing, which is geometrically different from the first housing, and a single electrode array situated on the second housing according to another aspect of the aforementioned embodiments includes a detector configured to detect a shape of the first and second housings; a first contact pin array configured to come into contact with the first or single electrode array; a second contact pin array configured to come into contact with the second electrode array; and an adjuster configured to adjust a contact pressure, which is applied to the second contact pin array, in response to the shape detected by the detector.

According to the aforementioned configuration, the aforementioned card device and another card device are selectively inserted into and ejected from the socket. The other card device includes a second housing, which is geometrically different from the aforementioned card device, and a single electrode array situated on the second housing. Accordingly, the socket may be used not only for the aforementioned card device but also for the other card device.

The detector of the socket detects a shape of the first and second housings. The first contact pin array comes into contact with the first or second electrode array. The second contact pin array comes into contact with the second electrode array. Since the adjuster adjusts a contact pressure applied to the second contact pin array in response to the shape detected by the detector, the first and second housings come into contact with the second contact pin array under an appropriately adjusted contact pressure.

In the aforementioned configuration, the second housing may include an arrangement surface on which the single electrode array is situated. The adjuster may adjust a position of the second contact pin array in a third direction across the arrangement surface in response to the shape detected by the detector.

According to the aforementioned configuration, the second housing may include an arrangement surface to which the single electrode array is situated. Since the adjuster adjusts a position of the second contact pin array in a third direction across the arrangement surface in response to the shape detected by the detector, a contact pressure applied to the second contact pin array may be adjusted appropriately.

The socket for selectively receiving and ejecting the aforementioned card device, and another card device including a second housing, which is geometrically different from the first housing, and a single electrode array situated on the second housing according to yet another aspect of the aforementioned embodiments includes a detector configured to detect a shape of the first and second housings; a first contact pin array configured to come into contact with the first or single electrode array; a second contact pin array configured to come into contact with the second electrode array; and an adjuster configured to adjust a contact pressure, which is applied to the second contact pin array, in response to the shape detected by the detector. The detector includes a plate spring which slides on the second concave region. The second housing may include a third concave region, which is slid by the plate spring, and a main surface, which is raised from the third concave region. The second concave region may be longer than the third concave region. The adjuster connected to the plate spring and the second contact pin array is displaced by the plate spring in a third direction away from the main surface to decrease the contact pressure of the second contact pin array while a contact of the plate spring with the second housing moves from the third concave region to the main surface.

According to the aforementioned configuration, the aforementioned card device and another card device are selectively inserted into and ejected from the socket. The other card device includes a second housing, which is geometrically different from the aforementioned card device, and a single electrode array situated on the second housing. Accordingly, the socket may be used with the other card device in addition to the aforementioned card device.

The detector of the socket detects a shape of the first and second housings. The first contact pin array comes into contact with the first or single electrode array. The second contact pin array comes into contact with the second electrode array. Since the adjuster adjusts the contact pressure applied to the second contact pin array in response to the shape detected by the detector, the first and second housings come into contact with the second contact pin array under an appropriately adjusted contact pressure.

The detector includes a plate spring which slides on the second concave region. The second housing includes a third concave region, which is slid by the plate spring, and a main surface, which is raised from the third concave region. Since the second concave region is longer than the third concave region, behavior of the plate spring when the first housing is inserted may be different from behavior of the plate spring when the second housing is inserted. Accordingly, the detector may appropriately detect a shape of the inserted housing.

The adjuster connected to the plate spring and the second contact pin array is displaced in a third direction away from the main surface by the plate spring while the contact of the plate spring with the second housing moves from the third concave region to the main surface. Accordingly, the contact pressure of the second contact pin array is reduced. Consequently, an excessive contact pressure of the contact pin array is less likely to occur on the second housing.

In the aforementioned configuration, the plate spring may include a surface treated to reduce a coefficient of friction against the main surface.

According to the aforementioned configuration, since the plate spring includes a surface treated to reduce a coefficient of friction against the main surface, the card device may be inserted and ejected smoothly.

In the aforementioned configuration, the socket may further include a fixing element configured to fix the second contact pin array. The adjuster may include an extension element which extends from the fixing element between the second contact pin array and the plate spring. The plate spring may displace the extension element toward the second contact pin array while the contact of the plate spring with the second housing moves from the third concave region to the main surface. The extension element displaced by the plate spring may displace the second contact pin array in the third direction.

According to the aforementioned configuration, the fixing element of the socket may fix the second contact pin array. The adjuster may include an extension element which extends from the fixing element between the second contact pin array and the plate spring. The plate spring displaces the extension element toward the second contact pin array while the contact of the plate spring with the second housing moves from the third concave region to the main surface. Since the extension element displaced by the plate spring displaces the second contact pin array in the third direction, an excessive contact pressure of the contact pin array to the second housing is less likely to occur.

In the aforementioned configuration, the socket may further include a fixing element configured to fix the second contact pin array. The second contact pin array may include a fixing portion connected to the fixing element and a contact portion configured to come into contact with the second electrode array. The adjuster may include a connection element connected to the second contact pin array between the fixing portion and the contact portion. The plate spring may displace the connection element in the third direction while the contact of the plate spring with the second housing moves from the third concave region to the main surface.

According to the aforementioned configuration, the fixing element of the socket may fix the second contact pin array. The second contact pin array may include a fixing portion, which is connected to the fixing element, and a contact portion, which comes into contact with the second electrode array. The adjuster may include a connection element connected to the second contact pin array between the fixing portion and the contact portion. Since the plate spring displaces the connection element in the third direction while the contact of the plate spring with the second housing moves from the third concave region to the main surface, an excessive contact pressure of the contact pin array to the second housing is less likely to occur.

In the aforementioned configuration, the second contact pin array may include an elastically deformable first elastic pin and a second elastic pin which is adjacent to the first elastic pin. The connection element may connect the first elastic pin to the second elastic pin.

According to the aforementioned configuration, the second contact pin array may include an elastically deformable first elastic pin, and a second elastic pin which is adjacent to the first elastic pin. Since the connection element connects the first elastic pin to the second elastic pin, the first and second elastic pins are elastically deformed in the third direction while the contact of the plate spring with the second housing moves from the third concave region to the main surface. Consequently, an excessive contact pressure of the contact pin array to the second housing is less likely to occur.

In the aforementioned configuration, the second contact pin array may include elastic pins extending in the first direction. The elastic pins may be arranged in the second direction. The adjuster may include an arm element extending from the plate spring in the second direction. The plate spring may displace the arm element in the third direction while the contact of the plate spring with the second housing moves from the third concave region to the main surface. The arm element deformed in the third direction may come into contact with the elastic pins to elastically deform the elastic pins.

According to the aforementioned configuration, the second contact pin array may include elastic pins extending in the first direction. The elastic pins may be arranged in the second direction. The adjuster may include an arm element extending from the plate spring in the second direction. The plate spring may displace the arm element in the third direction while the contact of the plate spring with the second housing moves from the third concave region to the main surface. Since the arm element deformed in the third direction comes into contact with the elastic pins to deform the elastic pins, an excessive contact pressure of the contact pin array to the second housing is less likely to occur.

In the aforementioned configuration, the second contact pin array may include an input pin pair for inputting signals through the second electrodes, and an output pin pair for outputting the signals through the second electrodes.

According to the aforementioned configuration, since the second contact pin array includes an input pin pair for inputting signals through the second electrodes, and an output pin pair for outputting signals through the second electrodes, the aforementioned card device may be appropriately communicated with a host device.

In the aforementioned configuration, the socket may further include a short-circuit element including a first short-circuit portion configured to short-circuit the input and output pin pairs. The adjuster displaced in the third direction by the plate spring while the contact of the plate spring with the second housing moves from the third concave region to the main surface may cause the input and output pin pairs to come into contact with the first short-circuit portion and trigger a short-circuit between the input and output pin pairs.

According to the aforementioned configuration, the short-circuit element of the socket may include a first short-circuit portion for short-circuiting the input and output pin pairs. Since the adjuster displaced in the third direction by the plate spring while the contact of the plate spring with the second housing moves from the third concave region to the main surface may cause the input and output pin pairs to come into contact with the first short-circuit portion, the input and output pin pairs may be short-circuited appropriately.

In the aforementioned configuration, the second electrode array may include a power source electrode, which is electrically connected to a power source for supplying electrical power, and a ground electrode, which is used for grounding the electrical power. The second contact pin array may include a power source pin, which is connected to the power source electrode, and a ground pin, which is connected to the ground electrode. The short-circuit element may include a second short-circuit portion for short-circuiting the power source pin and the ground pin. The second short-circuit portion may include a first contact portion corresponding to the power source pin, a second contact portion corresponding to the ground pin, and a capacitor element which is electrically connected to the first and second contact portions. The adjuster displaced in the third direction by the plate spring while the contact of the plate spring with the second housing moves from the third concave region to the main surface may cause the power source pin and the ground pin to come into contact with the first and second contact portions, respectively.

According to the aforementioned configuration, the second electrode array may include a power source electrode, which is electrically connected to a power source for supplying electrical power, and a ground electrode, which is used for grounding the electrical power. The second contact pin array may include a power source pin, which is connected to the power source electrode, and a ground pin, which is connected to the ground electrode. The short-circuit element may include a second short-circuit portion for short-circuiting the power source pin and the ground pin. The second short-circuit portion may include a first contact portion corresponding to the power source pin, a second contact portion corresponding to the ground pin, and a capacitor element which is electrically connected to the first and second contact portions. Since the adjuster displaced in the third direction by the plate spring while the contact of the plate spring with the second housing moves from the third concave region to the main surface causes the power source pin and the ground pin to come into contact with the first and second contact portions, respectively, the power source pin and the ground pin may be short-circuited appropriately.

In the aforementioned configuration, the socket may further include a contact mechanism configured to cause the second contact pin array to come into contact with the short-circuit element unless the first housing is inserted. The contact mechanism may include a contact arm which rotates between a first position where the second contact pin array is elastically deformed to come into contact with the short-circuit element and a second position where the contact arm is departed from the second contact pin array, and a bias element configured to bias the contact arm to the first position. Unless the first housing is inserted, the bias element retains the contact arm at the first position. If the first housing is inserted, the contact arm comes into contact with the first housing and rotates toward the second position.

According to the aforementioned configuration, the contact mechanism may cause the second contact pin array to come into contact with the short-circuit element unless the first housing is inserted. The contact arm of the contact mechanism may rotate between a first position where the second contact pin array is elastically deformed to come into contact with the short-circuit element, and a second position which the contact arm is departed from the second contact pin array. The bias element of the contact mechanism biases the contact arm to the first position. Accordingly, unless the first housing is inserted, the bias element retains the contact arm at the first position. If the first housing is inserted, the contact arm comes into contact with the first and second housings and rotates toward the second position. Accordingly, it may be determined in response to contact or non-contact between the second contact pin array and the short-circuit element whether there is the first housing in the socket.

Industrial Applicability

The principles of the aforementioned embodiments may be suitably applied to a card device such as a memory card, to which electrodes are added for high frequency signal transmission, and to a socket used for such a card device. The principles of the aforementioned embodiments may be applied to various devices capable of using a memory card for transmitting high frequency signals and a conventional memory card since it is possible to appropriately maintain compatibility of a conventionally used memory card with a single electrode array and a memory card with additional electrodes.

The invention claimed is:

1. A card device configured to be inserted into and ejected from a host device in a first direction, comprising:
    a first housing including a leading edge, which is inserted into the host device, a trailing edge opposite to the leading edge, a side edge extending between the leading edge and the trailing edge and concave regions formed on a surface surrounded by the leading edge, the trailing edge, and the side edge;
    a first electrode array including first electrodes linearly aligned in a second direction along the leading edge; and
    a second electrode array including second electrodes aligned in the second direction between the first electrode array and the trailing edge,
    wherein the second electrodes include an electrode shifted from the first electrodes in the second direction,
    wherein the concave regions include a first concave region extending from the leading edge toward the trailing edge, and a second concave region closest to the side edge among the concave regions,
    wherein the first and second electrode arrays are situated in the first concave region,
    wherein a number of the second electrodes situated in the first concave region is different from a number of the first electrodes situated in the first concave region,
    wherein the second concave region is adjacent to the first concave region and extends from the leading edge toward the trailing edge,
    wherein the second concave region includes a first region, which is adjacent to the first electrodes in the first concave region, and a second region, which is adjacent to the second electrodes in the first concave region,
    wherein at least one of the first electrodes of the first electrode array is situated in the first region of the second concave region, and
    wherein no electrodes are situated in the second region of the second concave region.

2. A socket for selectively receiving and ejecting a card device in a first direction, which includes (i) a first housing including a leading edge, which is inserted into the socket, and a trailing edge opposite to the leading edge, (ii) a first electrode array including first electrodes aligned in a second direction along the leading edge, and (iii) a second electrode array including second electrodes aligned in the second direction between the first electrode array and the trailing edge, the second electrodes including an electrode shifted from the first electrodes in the second direction, and another card device including a second housing, which is geometrically different from the first housing, and a single electrode array situated on the second housing, comprising:
- a detector configured to detect a shape of the first and second housings;
- a first contact pin array configured to come into contact with the first or single electrode array;
- a second contact pin array configured to come into contact with the second electrode array; and
- an adjuster configured to adjust a contact pressure, which is applied to the second contact pin array, in response to the shape detected by the detector.

3. The socket according to claim 2, wherein
the second housing includes an arrangement surface on which the single electrode array is situated, and
the adjuster adjusts a position of the second contact pin array in a third direction across the arrangement surface in response to the shape detected by the detector.

4. The socket according to claim 2,
wherein the first housing includes a first concave region extending from the leading edge toward the trailing edge and a second concave region adjacent to the first concave region, the second concave region extending from the leading edge toward the trailing edge,
wherein the first and second electrode arrays are situated in the first concave region,
wherein a number of the second electrodes situated in the first concave region is different from a number of the first electrodes situated in the first concave region,
wherein the second concave region includes a first region, which is adjacent to the first electrodes in the first concave region, and a second region, which is adjacent to the second electrodes in the first concave region,
wherein at least one of the first electrodes of the first electrode array are situated in the first region of the second concave region,
wherein no electrodes are situated in the second region of the second concave region,
wherein the detector includes a plate spring which slides on the second concave region,
wherein the second housing includes a third concave region, which is slid by the plate spring, and a main surface, which is raised from the third concave region,
wherein the second concave region is longer than the third concave region, and
wherein the adjuster connected to the plate spring and the second contact pin array is displaced by the plate spring in a third direction away from the main surface to decrease the contact pressure of the second contact pin array while a contact of the plate spring with the second housing moves from the third concave region to the main surface.

5. The socket according to claim 4, wherein the plate spring includes a surface treated to reduce a coefficient of friction against the main surface.

6. The socket according to claim 4, further comprising:
a fixing element configured to fix the second contact pin array, wherein
the adjuster includes an extension element which extends from the fixing element between the second contact pin array and the plate spring,
the plate spring displaces the extension element toward the second contact pin array while the contact of the plate spring with the second housing moves from the third concave region to the main surface, and
the extension element displaced by the plate spring displaces the second contact pin array in the third direction.

7. The socket according to claim 4, further comprising:
a fixing element configured to fix the second contact pin array, wherein
the second contact pin array includes a fixing portion connected to the fixing element, and a contact portion configured to come into contact with the second electrode array,
the adjuster includes a connection element connected to the second contact pin array between the fixing portion and the contact portion, and
the plate spring displaces the connection element in the third direction while the contact of the plate spring with the second housing moves from the third concave region to the main surface.

8. The socket according to claim 7, wherein
the second contact pin array includes an elastically deformable first elastic pin and a second elastic pin which is adjacent to the first elastic pin, and
the connection element connects the first elastic pin to the second elastic pin.

9. The socket according to claim 4, wherein
the second contact pin array includes elastic pins extending in the first direction,
the elastic pins are arranged in the second direction,
the adjuster includes an arm element extending from the plate spring in the second direction,
the plate spring displaces the arm element in the third direction while the contact of the plate spring with the second housing moves from the third concave region to the main surface, and
the arm element deformed in the third direction comes into contact with the elastic pins to elastically deform the elastic pins.

10. The socket according to any one of claims 4, wherein the second contact pin array includes an input pin pair for inputting signals through the second electrodes, and an output pin pair for outputting the signals through the second electrodes.

11. The socket according to claim 10, further comprising:
a short-circuit element including a first short-circuit portion configured to short-circuit the input and output pin pairs, wherein
the adjuster displaced in the third direction by the plate spring while the contact of the plate spring with the second housing moves from the third concave region to the main surface causes the input and output pin pairs to come into contact with the first short-circuit portion and triggers a short-circuit between the input and output pin pairs.

12. The socket according to claim 11, wherein
the second electrode array includes a power source electrode, which is electrically connected to a power source for supplying electrical power, and a ground electrode, which is used for grounding the electrical power, the second contact pin array includes a power source pin, which is connected to the power source electrode, and a ground pin, which is connected to the ground electrode, the short-circuit element includes a second short-circuit portion for short-circuiting the power source pin and the ground pin, the second short-circuit portion includes a first contact portion corresponding to the power source pin, a second contact portion corresponding to the ground pin, and a capacitor element which is electrically connected to the first and second contact portions, and the adjuster displaced in the third direction by the plate spring while the contact of the plate spring with the second housing moves from the third concave region to the main surface causes the power source pin and the ground pin to come into contact with the first and second contact portions, respectively.

13. The socket according to claim 11, further comprising:

a contact mechanism configured to cause the second contact pin array to come into contact with the short-circuit element unless the first housing is inserted, wherein the contact mechanism includes a contact arm which rotates between a first position where the second contact pin array is elastically deformed to come into contact with the short-circuit element and a second position where the contact arm is departed from the second contact pin array, and a bias element configured to bias the contact arm to the first position, unless the first housing is inserted, the bias element retains the contact arm at the first position, and if the first housing is inserted, the contact arm comes into contact with the first housing and rotates toward the second position.

* * * * *